(12) United States Patent  
Middleton et al.

(10) Patent No.: US 8,156,108 B2  
(45) Date of Patent: Apr. 10, 2012

(54) METHODS AND SYSTEMS FOR CREATION AND USE OF RAW-DATA DATASTORE

(75) Inventors: Nicholas L. Middleton, Cartersville, GA (US); Robert Leon Bass, II, Decatur, GA (US); Bryan Glenn Donaldson, Cumming, GA (US)

(73) Assignee: Intelliscience Corporation, Atlanta, GA (US)

( * ) Notice: Subject to any disclaimer, the term of this patent is extended or adjusted under 35 U.S.C. 154(b) by 311 days.

(21) Appl. No.: 12/405,982

(22) Filed: Mar. 17, 2009

(65) Prior Publication Data

US 2009/0240741 A1    Sep. 24, 2009

Related U.S. Application Data

(60) Provisional application No. 61/037,998, filed on Mar. 19, 2008.

(51) Int. Cl.
*G06F 17/00* (2006.01)

(52) U.S. Cl. ........ 707/713; 707/722; 707/736; 707/758; 707/781; 707/791

(58) Field of Classification Search ........... 707/600–831
See application file for complete search history.

(56) References Cited

U.S. PATENT DOCUMENTS

2007/0244844 A1   10/2007   Brinson et al.
2008/0013787 A1*   1/2008   Kobayashi .................... 382/103

\* cited by examiner

*Primary Examiner* — Isaac M Woo
(74) *Attorney, Agent, or Firm* — Lowe Graham Jones PLLC

(57) ABSTRACT

A raw-data datastore during data analysis and feature recognition abstracts away and/or reduces dependency upon typically required components of datastore training. The datastore functions to store the original data values of a data set selection, which can represent a known feature. In some embodiments, the original data set is retained as the raw data value set referenced by the raw-data datastore. The use of this raw-data datastore eliminates the need for continued manual retraining of the original data values and patterns, which can be associated with a particular known feature, each time the pluralities of evaluation algorithms and/or the target data area are altered, changed, modified, or reconfigured.

17 Claims, 36 Drawing Sheets

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 250 | 195 | 166 | 144 | 127 | 114 | 117 | 122 | 135 | 121 | 128 | 130 | 125 | 131 | 134 | 126 | 123 | 116 | 121 | 124 |
| 2 | 253 | 212 | 168 | 152 | 144 | 132 | 137 | 130 | 128 | 122 | 121 | 115 | 130 | 131 | 129 | 127 | 122 | 117 | 113 | 117 |
| 3 | 254 | 234 | 167 | 145 | 145 | 152 | 137 | 150 | 139 | 123 | 126 | 117 | 116 | 122 | 134 | 129 | 124 | 125 | 120 | 117 |
| 4 | 254 | 252 | 174 | 159 | 164 | 162 | 153 | 156 | 142 | 121 | 117 | 124 | 122 | 122 | 117 | 116 | 117 | 120 | 122 | 112 |
| 5 | 254 | 254 | 206 | 176 | 155 | 161 | 154 | 155 | 115 | 108 | 105 | 119 | 110 | 114 | 120 | 115 | 123 | 122 | 118 | 117 |
| 6 | 254 | 254 | 240 | 152 | 138 | 163 | 172 | 167 | 137 | 123 | 95 | 78 | 103 | 107 | 111 | 114 | 105 | 111 | 113 | 119 |
| 7 | 254 | 254 | 250 | 171 | 161 | 167 | 148 | 152 | 121 | 139 | 124 | 115 | 76 | 83 | 98 | 103 | 102 | 96 | 105 | 108 |
| 8 | 254 | 254 | 250 | 208 | 192 | 174 | 160 | 146 | 137 | 113 | 113 | 128 | 112 | 82 | 78 | 83 | 93 | 95 | 101 | 100 |
| 9 | 254 | 254 | 247 | 215 | 190 | 177 | 165 | 156 | 133 | 141 | 132 | 118 | 111 | 89 | 94 | 75 | 75 | 84 | 85 | 95 |
| 10 | 254 | 253 | 244 | 205 | 173 | 168 | 154 | 160 | 157 | 124 | 132 | 143 | 116 | 109 | 97 | 93 | 76 | 69 | 73 | 81 |
| 11 | 254 | 253 | 240 | 189 | 166 | 142 | 143 | 159 | 153 | 153 | 145 | 139 | 126 | 110 | 105 | 89 | 81 | 89 | 65 | 67 |
| 12 | 254 | 250 | 234 | 124 | 137 | 135 | 140 | 140 | 145 | 128 | 135 | 137 | 148 | 122 | 116 | 113 | 113 | 80 | 66 | 69 |
| 13 | 248 | 242 | 206 | 114 | 92 | 85 | 101 | 125 | 134 | 143 | 128 | 141 | 133 | 128 | 123 | 113 | 107 | 106 | 100 | 85 |
| 14 | 211 | 157 | 98 | 90 | 82 | 74 | 80 | 78 | 102 | 108 | 117 | 112 | 111 | 123 | 121 | 131 | 128 | 109 | 98 | 95 |
| 15 | 69 | 71 | 74 | 68 | 71 | 79 | 86 | 90 | 81 | 99 | 104 | 102 | 113 | 109 | 108 | 99 | 110 | 99 | 94 | 110 |
| 16 | 52 | 42 | 64 | 62 | 79 | 84 | 98 | 84 | 69 | 75 | 74 | 85 | 81 | 109 | 105 | 103 | 115 | 120 | 111 | 100 |
| 17 | 52 | 73 | 116 | 111 | 125 | 94 | 69 | 80 | 69 | 63 | 72 | 73 | 81 | 104 | 88 | 106 | 109 | 114 | 100 | 103 |
| 18 | 8 | 34 | 51 | 41 | 25 | 49 | 84 | 112 | 45 | 53 | 43 | 60 | 57 | 59 | 71 | 74 | 95 | 102 | 91 | 103 |
| 19 | 125 | 114 | 63 | 87 | 98 | 84 | 85 | 136 | 87 | 39 | 58 | 38 | 34 | 47 | 56 | 59 | 72 | 71 | 102 | 92 |
| 20 | 187 | 151 | 152 | 142 | 143 | 138 | 118 | 121 | 52 | 33 | 52 | 44 | 42 | 24 | 46 | 45 | 59 | 73 | 57 | 62 |

*FIG. 11*

|   | 1 | 2 | 3 | 4 | 5 | 6 | 7 |
|---|---|---|---|---|---|---|---|
| 1 | 41 | 42 | 43 | 44 | 45 | 46 | 47 |
| 2 | 40 | 20 | 21 | 22 | 23 | 24 | 48 |
| 3 | 39 | 19 | 7 | 8 | 9 | 25 | 49 |
| 4 | 38 | 18 | 6 | 1 | 2 | 10 | 26 |
| 5 | 37 | 17 | 5 | 4 | 3 | 11 | 27 |
| 6 | 36 | 16 | 15 | 14 | 13 | 12 | 28 |
| 7 | 35 | 34 | 33 | 32 | 31 | 30 | 29 |

*FIG. 12*

|   | 1 | 2 | 3 | 4 | 5 | 6 | 7 |
|---|---|---|---|---|---|---|---|
| 1 | 19 |   |   | 22 |   |   | 25 |
| 2 |   | 18 |   | 21 |   | 24 |   |
| 3 |   |   | 17 | 20 | 23 |   |   |
| 4 | 16 | 15 | 14 | 1 | 2 | 3 | 4 |
| 5 |   |   | 11 | 8 | 5 |   |   |
| 6 |   | 12 |   | 9 |   | 6 |   |
| 7 | 13 |   |   | 10 |   |   | 7 |

|   | 1 | 2 | 3 | 4 | 5 | 6 | 7 | 8 |
|---|---|---|---|---|---|---|---|---|
| 1 | 55 | 56 | 57 | 58 | 59 | 60 | 61 | 62 |
| 2 | 54 | 30 | 31 | 32 | 33 | 34 | 35 | 63 |
| 3 | 53 | 29 | 13 | 14 | 15 | 16 | 36 | 64 |
| 4 | 52 | 28 | 12 | 4 | 1 | 5 | 17 | 37 |
| 5 | 51 | 27 | 11 | 3 | 2 | 6 | 18 | 38 |
| 6 | 50 | 26 | 10 | 9 | 8 | 7 | 19 | 39 |
| 7 | 49 | 25 | 24 | 23 | 22 | 21 | 20 | 40 |
| 8 | 48 | 47 | 46 | 45 | 44 | 43 | 42 | 41 |

*FIG. 17*

|  | 1 | 2 | 3 | 4 | 5 | 6 | 7 |  |
|---|---|---|---|---|---|---|---|---|
|  | Radial 6 |  |  | Radial 7 |  |  | Radial 8 |  |
| 1 | Value 19 |  |  | Value 22 |  |  | Value 25 |  |
| 2 |  | Value 18 |  | Value 21 |  | Value 24 |  |  |
| 3 |  |  | Value 17 | Value 20 | Value 23 |  |  |  |
| 4 | Radial 5 | Value 16 | Value 15 | Value 14 | Value 1 | Value 2 | Value 3 | Value 4 | Radial 1 |
| 5 |  |  | Value 11 | Value 8 | Value 5 |  |  |  |
| 6 |  | Value 12 |  | Value 9 |  | Value 6 |  |  |
| 7 |  | Value 13 |  | Value 10 |  | Value 7 |  |  |
|  | Radial 4 |  |  | Radial 3 |  |  | Radial 2 |  |

*FIG. 18*

| TDE | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 |
|---|---|---|---|---|---|---|---|---|---|---|---|---|---|---|---|---|---|---|---|---|---|---|---|---|---|
| (4,4) | 159 | 164 | 162 | 153 | 155 | 163 | 148 | 176 | 152 | 171 | 206 | 254 | 254 | 174 | 252 | 254 | 167 | 212 | 250 | 145 | 152 | 144 | 145 | 132 | 117 |
| (5,4) | 164 | 162 | 153 | 156 | 161 | 172 | 152 | 155 | 138 | 161 | 176 | 240 | 254 | 159 | 174 | 252 | 145 | 168 | 195 | 145 | 144 | 127 | 152 | 137 | 122 |
| (6,4) | 162 | 153 | 156 | 142 | 154 | 167 | 121 | 161 | 163 | 167 | 155 | 152 | 250 | 164 | 159 | 174 | 145 | 152 | 166 | 152 | 132 | 114 | 137 | 130 | 135 |
| (7,4) | 153 | 156 | 142 | 121 | 155 | 137 | 139 | 154 | 172 | 148 | 161 | 138 | 171 | 162 | 164 | 159 | 152 | 144 | 144 | 137 | 137 | 117 | 150 | 128 | 121 |
| (8,4) | 156 | 142 | 121 | 117 | 115 | 123 | 124 | 155 | 167 | 152 | 154 | 163 | 161 | 153 | 162 | 164 | 137 | 132 | 127 | 150 | 130 | 122 | 139 | 122 | 128 |
| (9,4) | 142 | 121 | 117 | 124 | 108 | 95 | 115 | 115 | 137 | 121 | 155 | 172 | 167 | 156 | 153 | 162 | 150 | 137 | 114 | 139 | 128 | 135 | 123 | 121 | 130 |
| (10,4) | 121 | 117 | 124 | 122 | 105 | 78 | 76 | 108 | 123 | 139 | 115 | 167 | 148 | 142 | 156 | 153 | 139 | 130 | 117 | 123 | 122 | 121 | 126 | 115 | 125 |
| (11,4) | 117 | 124 | 122 | 122 | 119 | 103 | 83 | 105 | 95 | 124 | 108 | 137 | 152 | 121 | 142 | 156 | 123 | 128 | 122 | 126 | 121 | 128 | 117 | 130 | 131 |
| (12,4) | 124 | 122 | 122 | 117 | 110 | 107 | 98 | 119 | 78 | 115 | 105 | 123 | 121 | 117 | 121 | 142 | 126 | 122 | 135 | 117 | 115 | 130 | 116 | 131 | 134 |
| (13,4) | 122 | 122 | 117 | 116 | 114 | 111 | 103 | 110 | 103 | 76 | 119 | 95 | 139 | 124 | 117 | 121 | 117 | 121 | 121 | 116 | 130 | 125 | 122 | 129 | 126 |
| (14,4) | 122 | 117 | 116 | 117 | 120 | 114 | 102 | 114 | 107 | 83 | 110 | 78 | 124 | 122 | 124 | 117 | 116 | 115 | 128 | 122 | 131 | 131 | 134 | 127 | 123 |
| (15,4) | 117 | 116 | 117 | 120 | 115 | 105 | 96 | 120 | 111 | 98 | 114 | 103 | 115 | 122 | 122 | 124 | 122 | 130 | 130 | 134 | 129 | 134 | 129 | 122 | 116 |
| (16,4) | 116 | 117 | 120 | 122 | 123 | 111 | 105 | 115 | 114 | 103 | 120 | 107 | 76 | 117 | 122 | 122 | 134 | 131 | 125 | 129 | 127 | 126 | 124 | 117 | 121 |
| (17,4) | 117 | 120 | 122 | 112 | 122 | 113 | 108 | 123 | 105 | 102 | 115 | 111 | 83 | 116 | 117 | 122 | 129 | 129 | 131 | 124 | 122 | 123 | 125 | 113 | 124 |
| (4,5) | 176 | 155 | 161 | 154 | 138 | 167 | 160 | 152 | 171 | 208 | 240 | 254 | 254 | 206 | 254 | 254 | 174 | 234 | 250 | 159 | 145 | 152 | 164 | 152 | 137 |
| (5,5) | 155 | 161 | 154 | 155 | 163 | 148 | 146 | 138 | 161 | 192 | 152 | 250 | 254 | 176 | 206 | 254 | 159 | 167 | 195 | 164 | 145 | 144 | 162 | 137 | 130 |
| (6,5) | 161 | 154 | 155 | 115 | 172 | 152 | 137 | 163 | 167 | 174 | 138 | 171 | 250 | 155 | 176 | 206 | 164 | 145 | 166 | 162 | 152 | 132 | 153 | 150 | 128 |
| (7,5) | 154 | 155 | 115 | 108 | 167 | 121 | 113 | 172 | 148 | 160 | 163 | 161 | 208 | 161 | 155 | 176 | 162 | 145 | 145 | 153 | 137 | 132 | 156 | 139 | 122 |
| (8,5) | 155 | 115 | 108 | 105 | 137 | 139 | 113 | 167 | 152 | 146 | 172 | 167 | 192 | 154 | 161 | 155 | 153 | 152 | 127 | 156 | 150 | 130 | 142 | 123 | 121 |
| (9,5) | 115 | 108 | 105 | 119 | 123 | 124 | 128 | 137 | 121 | 137 | 167 | 148 | 174 | 155 | 154 | 161 | 156 | 137 | 114 | 142 | 139 | 128 | 121 | 126 | 115 |
| (10,5) | 108 | 105 | 119 | 110 | 95 | 115 | 112 | 123 | 139 | 113 | 137 | 152 | 160 | 115 | 155 | 154 | 142 | 150 | 117 | 121 | 123 | 122 | 117 | 117 | 130 |
| (11,5) | 105 | 119 | 110 | 114 | 78 | 76 | 82 | 95 | 124 | 113 | 123 | 121 | 146 | 108 | 115 | 155 | 121 | 139 | 122 | 117 | 126 | 121 | 124 | 116 | 131 |
| (12,5) | 119 | 110 | 114 | 120 | 103 | 83 | 78 | 78 | 115 | 128 | 95 | 139 | 137 | 105 | 108 | 115 | 117 | 123 | 135 | 124 | 117 | 115 | 122 | 122 | 129 |
| (13,5) | 110 | 114 | 120 | 115 | 107 | 98 | 83 | 103 | 76 | 112 | 78 | 124 | 113 | 119 | 105 | 108 | 124 | 126 | 121 | 122 | 116 | 130 | 122 | 134 | 127 |
| (14,5) | 114 | 120 | 115 | 123 | 111 | 103 | 93 | 107 | 83 | 82 | 103 | 115 | 113 | 110 | 119 | 105 | 122 | 117 | 128 | 122 | 122 | 131 | 117 | 129 | 122 |
| (15,5) | 120 | 115 | 123 | 122 | 114 | 102 | 95 | 111 | 98 | 78 | 107 | 76 | 128 | 114 | 110 | 119 | 122 | 116 | 130 | 117 | 134 | 129 | 116 | 124 | 117 |
| (16,5) | 115 | 123 | 122 | 118 | 105 | 96 | 101 | 114 | 103 | 83 | 111 | 83 | 112 | 120 | 114 | 110 | 117 | 122 | 125 | 116 | 129 | 127 | 117 | 125 | 113 |
| (17,5) | 123 | 122 | 118 | 117 | 111 | 105 | 100 | 105 | 102 | 93 | 114 | 98 | 82 | 115 | 120 | 114 | 116 | 134 | 131 | 117 | 124 | 122 | 120 | 120 | 117 |

*FIG. 19A*

| TDE | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 |
|---|---|---|---|---|---|---|---|---|---|---|---|---|---|---|---|---|---|---|---|---|---|---|---|---|---|
| (4,6) | 152 | 138 | 163 | 172 | 161 | 174 | 165 | 171 | 208 | 215 | 250 | 254 | 254 | 240 | 254 | 254 | 206 | 252 | 253 | 176 | 159 | 145 | 155 | 162 | 137 |
| (5,6) | 138 | 163 | 172 | 167 | 167 | 160 | 156 | 161 | 192 | 190 | 171 | 250 | 254 | 152 | 240 | 254 | 176 | 174 | 212 | 155 | 164 | 145 | 161 | 153 | 150 |
| (6,6) | 163 | 172 | 167 | 137 | 148 | 146 | 133 | 167 | 174 | 177 | 161 | 208 | 247 | 138 | 152 | 240 | 155 | 159 | 168 | 161 | 162 | 152 | 154 | 156 | 139 |
| (7,6) | 172 | 167 | 137 | 123 | 152 | 137 | 141 | 148 | 160 | 165 | 167 | 192 | 215 | 163 | 138 | 152 | 161 | 164 | 152 | 154 | 153 | 137 | 155 | 142 | 123 |
| (8,6) | 167 | 137 | 123 | 95 | 121 | 113 | 132 | 152 | 146 | 156 | 148 | 174 | 190 | 172 | 163 | 138 | 154 | 162 | 144 | 155 | 156 | 150 | 115 | 121 | 126 |
| (9,6) | 137 | 123 | 95 | 78 | 139 | 113 | 118 | 121 | 137 | 133 | 152 | 160 | 177 | 167 | 172 | 163 | 155 | 153 | 132 | 115 | 142 | 139 | 108 | 117 | 117 |
| (10,6) | 123 | 95 | 78 | 103 | 124 | 128 | 111 | 139 | 113 | 141 | 121 | 146 | 165 | 137 | 167 | 172 | 115 | 156 | 137 | 108 | 121 | 123 | 105 | 124 | 116 |
| (11,6) | 95 | 78 | 103 | 107 | 115 | 112 | 89 | 124 | 113 | 132 | 139 | 137 | 156 | 123 | 137 | 167 | 108 | 142 | 130 | 105 | 117 | 126 | 119 | 122 | 122 |
| (12,6) | 78 | 103 | 107 | 111 | 76 | 82 | 94 | 115 | 128 | 118 | 124 | 113 | 133 | 95 | 123 | 137 | 105 | 121 | 128 | 119 | 124 | 117 | 110 | 122 | 134 |
| (13,6) | 103 | 107 | 111 | 114 | 83 | 78 | 75 | 76 | 112 | 111 | 115 | 113 | 141 | 78 | 95 | 123 | 119 | 117 | 122 | 110 | 122 | 116 | 114 | 117 | 129 |
| (14,6) | 107 | 111 | 114 | 105 | 98 | 83 | 75 | 83 | 82 | 89 | 76 | 128 | 132 | 103 | 78 | 95 | 110 | 124 | 121 | 114 | 122 | 117 | 120 | 116 | 124 |
| (15,6) | 111 | 114 | 105 | 111 | 103 | 93 | 84 | 98 | 78 | 94 | 83 | 112 | 118 | 107 | 103 | 78 | 114 | 122 | 115 | 120 | 117 | 134 | 115 | 117 | 125 |
| (16,6) | 114 | 105 | 111 | 113 | 102 | 95 | 85 | 103 | 83 | 75 | 98 | 82 | 111 | 111 | 107 | 103 | 120 | 122 | 130 | 115 | 116 | 129 | 123 | 120 | 120 |
| (17,6) | 105 | 111 | 113 | 119 | 96 | 101 | 95 | 102 | 93 | 75 | 103 | 78 | 89 | 114 | 111 | 107 | 115 | 117 | 131 | 123 | 117 | 124 | 122 | 122 | 117 |
| (4,7) | 171 | 161 | 167 | 148 | 192 | 177 | 154 | 208 | 215 | 205 | 250 | 254 | 254 | 250 | 254 | 254 | 240 | 254 | 254 | 152 | 176 | 159 | 138 | 161 | 153 |
| (5,7) | 161 | 167 | 148 | 152 | 174 | 165 | 160 | 192 | 190 | 173 | 208 | 247 | 253 | 171 | 250 | 254 | 152 | 206 | 252 | 138 | 155 | 164 | 163 | 154 | 156 |
| (6,7) | 167 | 148 | 152 | 121 | 160 | 156 | 157 | 174 | 177 | 168 | 192 | 215 | 244 | 161 | 171 | 250 | 138 | 176 | 174 | 163 | 161 | 162 | 172 | 155 | 142 |
| (7,7) | 148 | 152 | 121 | 139 | 146 | 133 | 124 | 160 | 165 | 154 | 174 | 190 | 205 | 167 | 161 | 171 | 163 | 155 | 159 | 172 | 154 | 153 | 167 | 115 | 121 |
| (8,7) | 152 | 121 | 139 | 124 | 137 | 141 | 132 | 146 | 156 | 160 | 160 | 177 | 173 | 148 | 167 | 161 | 172 | 161 | 164 | 167 | 155 | 156 | 137 | 108 | 117 |
| (9,7) | 121 | 139 | 124 | 115 | 113 | 132 | 143 | 137 | 133 | 157 | 146 | 165 | 168 | 152 | 148 | 167 | 137 | 154 | 162 | 137 | 115 | 142 | 123 | 105 | 124 |
| (10,7) | 139 | 124 | 115 | 76 | 128 | 118 | 116 | 113 | 141 | 124 | 137 | 156 | 154 | 121 | 152 | 148 | 123 | 155 | 153 | 123 | 108 | 121 | 95 | 119 | 122 |
| (11,7) | 124 | 115 | 76 | 83 | 112 | 111 | 109 | 113 | 132 | 132 | 113 | 133 | 160 | 139 | 121 | 152 | 95 | 115 | 156 | 95 | 105 | 117 | 78 | 110 | 117 |
| (12,7) | 115 | 76 | 83 | 98 | 128 | 89 | 97 | 128 | 118 | 143 | 113 | 141 | 157 | 124 | 139 | 121 | 78 | 108 | 142 | 78 | 119 | 124 | 103 | 114 | 122 |
| (13,7) | 76 | 83 | 98 | 103 | 82 | 94 | 93 | 112 | 111 | 116 | 128 | 132 | 124 | 115 | 124 | 139 | 103 | 105 | 121 | 103 | 110 | 122 | 107 | 120 | 116 |
| (14,7) | 83 | 98 | 103 | 102 | 78 | 75 | 76 | 82 | 89 | 109 | 112 | 118 | 132 | 76 | 115 | 124 | 107 | 119 | 117 | 107 | 114 | 122 | 111 | 115 | 117 |
| (15,7) | 98 | 103 | 102 | 96 | 83 | 75 | 69 | 78 | 94 | 97 | 82 | 89 | 143 | 83 | 76 | 115 | 111 | 110 | 124 | 111 | 120 | 117 | 114 | 123 | 120 |
| (16,7) | 103 | 102 | 96 | 105 | 93 | 84 | 73 | 83 | 75 | 93 | 78 | 89 | 116 | 98 | 83 | 76 | 114 | 114 | 122 | 114 | 115 | 116 | 105 | 122 | 122 |
| (17,7) | 102 | 96 | 105 | 108 | 95 | 85 | 81 | 93 | 75 | 76 | 83 | 94 | 109 | 103 | 98 | 83 | 114 | 120 | 122 | 105 | 123 | 117 | 111 | 118 | 112 |

*FIG. 19B*

| TDE | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 |
|---|---|---|---|---|---|---|---|---|---|---|---|---|---|---|---|---|---|---|---|---|---|---|---|---|---|
| (4,8) | 208 | 192 | 174 | 160 | 190 | 168 | 143 | 215 | 205 | 189 | 247 | 253 | 254 | 250 | 254 | 254 | 250 | 254 | 254 | 171 | 152 | 176 | 161 | 163 | 154 |
| (5,8) | 192 | 174 | 160 | 146 | 177 | 154 | 159 | 190 | 173 | 166 | 215 | 244 | 253 | 208 | 250 | 254 | 171 | 240 | 254 | 161 | 138 | 155 | 167 | 172 | 155 |
| (6,8) | 174 | 160 | 146 | 137 | 165 | 160 | 153 | 177 | 168 | 142 | 190 | 205 | 240 | 192 | 208 | 250 | 161 | 152 | 206 | 167 | 163 | 161 | 148 | 167 | 115 |
| (7,8) | 160 | 146 | 137 | 113 | 156 | 157 | 153 | 165 | 154 | 143 | 177 | 173 | 189 | 174 | 192 | 208 | 167 | 138 | 176 | 148 | 172 | 154 | 152 | 137 | 108 |
| (8,8) | 146 | 137 | 113 | 113 | 133 | 124 | 145 | 156 | 160 | 159 | 165 | 168 | 166 | 160 | 174 | 192 | 148 | 163 | 155 | 152 | 167 | 155 | 121 | 123 | 105 |
| (9,8) | 137 | 113 | 113 | 128 | 141 | 132 | 139 | 133 | 157 | 153 | 156 | 154 | 142 | 146 | 160 | 174 | 152 | 172 | 161 | 121 | 137 | 115 | 139 | 95 | 119 |
| (10,8) | 113 | 113 | 128 | 112 | 132 | 143 | 126 | 141 | 124 | 153 | 133 | 160 | 143 | 137 | 146 | 160 | 121 | 167 | 154 | 139 | 123 | 108 | 124 | 78 | 110 |
| (11,8) | 113 | 128 | 112 | 82 | 118 | 116 | 110 | 132 | 132 | 145 | 141 | 157 | 159 | 113 | 137 | 146 | 139 | 137 | 155 | 124 | 95 | 105 | 115 | 103 | 114 |
| (12,8) | 128 | 112 | 82 | 78 | 111 | 109 | 105 | 118 | 143 | 139 | 132 | 124 | 153 | 113 | 113 | 137 | 124 | 123 | 115 | 115 | 78 | 119 | 76 | 107 | 120 |
| (13,8) | 112 | 82 | 78 | 83 | 89 | 97 | 89 | 111 | 116 | 126 | 118 | 132 | 153 | 128 | 113 | 113 | 115 | 95 | 108 | 76 | 103 | 110 | 83 | 111 | 115 |
| (14,8) | 82 | 78 | 83 | 93 | 94 | 93 | 81 | 89 | 109 | 110 | 111 | 143 | 145 | 112 | 128 | 113 | 76 | 78 | 105 | 83 | 107 | 114 | 98 | 114 | 123 |
| (15,8) | 78 | 83 | 93 | 95 | 75 | 76 | 89 | 94 | 97 | 105 | 89 | 116 | 139 | 82 | 112 | 128 | 83 | 103 | 119 | 98 | 111 | 120 | 103 | 105 | 122 |
| (16,8) | 83 | 93 | 95 | 101 | 75 | 69 | 65 | 75 | 93 | 89 | 94 | 109 | 126 | 78 | 82 | 112 | 98 | 107 | 110 | 103 | 114 | 115 | 102 | 111 | 118 |
| (17,8) | 93 | 95 | 101 | 100 | 84 | 73 | 67 | 75 | 76 | 81 | 75 | 97 | 110 | 83 | 78 | 82 | 103 | 111 | 114 | 102 | 105 | 123 | 96 | 113 | 117 |
| (4,9) | 215 | 190 | 177 | 165 | 173 | 142 | 140 | 205 | 189 | 124 | 244 | 253 | 254 | 247 | 254 | 254 | 250 | 254 | 254 | 208 | 171 | 152 | 192 | 167 | 172 |
| (5,9) | 190 | 177 | 165 | 156 | 168 | 143 | 140 | 173 | 166 | 137 | 205 | 240 | 250 | 215 | 247 | 254 | 208 | 250 | 254 | 192 | 161 | 138 | 174 | 148 | 167 |
| (6,9) | 177 | 165 | 156 | 133 | 154 | 159 | 145 | 168 | 142 | 135 | 173 | 189 | 234 | 190 | 215 | 247 | 192 | 171 | 240 | 174 | 167 | 163 | 160 | 152 | 137 |
| (7,9) | 165 | 156 | 133 | 141 | 160 | 153 | 128 | 154 | 143 | 140 | 168 | 166 | 124 | 177 | 190 | 215 | 174 | 161 | 152 | 160 | 148 | 172 | 146 | 121 | 123 |
| (8,9) | 156 | 133 | 141 | 132 | 157 | 153 | 135 | 160 | 159 | 140 | 154 | 142 | 137 | 165 | 177 | 190 | 160 | 167 | 138 | 146 | 152 | 167 | 137 | 139 | 95 |
| (9,9) | 133 | 141 | 132 | 118 | 124 | 145 | 137 | 157 | 153 | 145 | 160 | 143 | 135 | 156 | 165 | 177 | 146 | 148 | 163 | 137 | 121 | 137 | 113 | 124 | 78 |
| (10,9) | 141 | 132 | 118 | 111 | 132 | 139 | 148 | 124 | 153 | 128 | 157 | 159 | 140 | 133 | 156 | 165 | 137 | 152 | 172 | 113 | 139 | 123 | 113 | 115 | 103 |
| (11,9) | 132 | 118 | 111 | 89 | 143 | 126 | 122 | 132 | 145 | 135 | 124 | 153 | 140 | 141 | 133 | 156 | 113 | 121 | 167 | 113 | 124 | 95 | 128 | 76 | 107 |
| (12,9) | 118 | 111 | 89 | 94 | 116 | 110 | 116 | 143 | 139 | 137 | 132 | 153 | 145 | 132 | 141 | 133 | 113 | 139 | 137 | 128 | 115 | 78 | 112 | 83 | 111 |
| (13,9) | 111 | 89 | 94 | 75 | 109 | 105 | 113 | 116 | 126 | 148 | 143 | 145 | 128 | 118 | 132 | 141 | 128 | 124 | 123 | 112 | 76 | 103 | 82 | 98 | 114 |
| (14,9) | 89 | 94 | 75 | 75 | 97 | 89 | 80 | 109 | 110 | 122 | 116 | 139 | 135 | 111 | 118 | 132 | 112 | 115 | 95 | 82 | 83 | 107 | 78 | 103 | 105 |
| (15,9) | 94 | 75 | 75 | 84 | 93 | 81 | 66 | 97 | 105 | 116 | 109 | 126 | 137 | 89 | 111 | 118 | 82 | 76 | 78 | 78 | 98 | 111 | 83 | 102 | 111 |
| (16,9) | 75 | 75 | 84 | 85 | 76 | 89 | 69 | 93 | 89 | 113 | 97 | 110 | 148 | 94 | 89 | 111 | 78 | 83 | 103 | 83 | 103 | 114 | 93 | 96 | 113 |
| (17,9) | 75 | 84 | 85 | 95 | 69 | 65 | 69 | 76 | 81 | 113 | 93 | 105 | 122 | 75 | 94 | 89 | 83 | 98 | 107 | 93 | 102 | 105 | 95 | 105 | 119 |

*FIG. 19C*

| TDE | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 |
|---|---|---|---|---|---|---|---|---|---|---|---|---|---|---|---|---|---|---|---|---|---|---|---|---|---|
| (4,10) | 205 | 173 | 168 | 154 | 166 | 135 | 101 | 189 | 124 | 114 | 240 | 250 | 248 | 244 | 253 | 254 | 247 | 254 | 254 | 215 | 208 | 171 | 190 | 174 | 148 |
| (5,10) | 173 | 168 | 154 | 160 | 142 | 140 | 125 | 166 | 137 | 92 | 189 | 234 | 242 | 205 | 244 | 253 | 215 | 250 | 254 | 190 | 192 | 161 | 177 | 160 | 152 |
| (6,10) | 168 | 154 | 160 | 157 | 143 | 140 | 134 | 142 | 135 | 85 | 166 | 124 | 206 | 173 | 205 | 244 | 190 | 208 | 250 | 177 | 174 | 167 | 165 | 146 | 121 |
| (7,10) | 154 | 160 | 157 | 124 | 159 | 145 | 143 | 143 | 140 | 101 | 142 | 137 | 114 | 168 | 173 | 205 | 177 | 192 | 171 | 165 | 160 | 148 | 156 | 137 | 139 |
| (8,10) | 160 | 157 | 124 | 132 | 153 | 128 | 128 | 159 | 140 | 125 | 143 | 135 | 92 | 154 | 168 | 173 | 165 | 174 | 161 | 156 | 146 | 152 | 133 | 113 | 124 |
| (9,10) | 157 | 124 | 132 | 143 | 153 | 135 | 141 | 153 | 145 | 134 | 159 | 140 | 85 | 160 | 154 | 168 | 156 | 160 | 167 | 133 | 137 | 121 | 141 | 113 | 115 |
| (10,10) | 124 | 132 | 143 | 116 | 145 | 137 | 133 | 153 | 128 | 143 | 153 | 140 | 101 | 157 | 160 | 154 | 133 | 146 | 148 | 141 | 113 | 139 | 132 | 128 | 76 |
| (11,10) | 132 | 143 | 116 | 109 | 139 | 148 | 128 | 145 | 135 | 128 | 145 | 145 | 125 | 124 | 157 | 160 | 141 | 137 | 152 | 132 | 113 | 124 | 118 | 112 | 83 |
| (12,10) | 143 | 116 | 109 | 97 | 126 | 122 | 123 | 139 | 137 | 141 | 128 | 128 | 134 | 132 | 124 | 157 | 132 | 113 | 121 | 118 | 128 | 115 | 111 | 82 | 98 |
| (13,10) | 116 | 109 | 97 | 93 | 110 | 116 | 113 | 126 | 148 | 133 | 139 | 135 | 143 | 143 | 132 | 124 | 118 | 113 | 139 | 111 | 112 | 76 | 89 | 78 | 103 |
| (14,10) | 109 | 97 | 93 | 76 | 105 | 113 | 107 | 110 | 122 | 128 | 126 | 137 | 128 | 116 | 143 | 132 | 111 | 128 | 124 | 89 | 82 | 83 | 94 | 83 | 102 |
| (15,10) | 97 | 93 | 76 | 69 | 89 | 113 | 106 | 105 | 116 | 123 | 110 | 148 | 141 | 109 | 116 | 143 | 89 | 112 | 115 | 94 | 78 | 98 | 75 | 93 | 96 |
| (16,10) | 93 | 76 | 69 | 73 | 81 | 80 | 100 | 89 | 113 | 113 | 105 | 122 | 133 | 97 | 109 | 116 | 94 | 82 | 76 | 75 | 83 | 103 | 75 | 95 | 105 |
| (17,10) | 76 | 69 | 73 | 81 | 89 | 66 | 85 | 81 | 113 | 107 | 89 | 116 | 128 | 93 | 97 | 109 | 75 | 78 | 83 | 75 | 93 | 102 | 84 | 101 | 108 |
| (4,11) | 189 | 166 | 142 | 143 | 137 | 85 | 80 | 124 | 114 | 90 | 234 | 242 | 211 | 240 | 253 | 254 | 244 | 254 | 254 | 205 | 215 | 208 | 173 | 177 | 160 |
| (5,11) | 166 | 142 | 143 | 159 | 135 | 101 | 78 | 137 | 92 | 82 | 124 | 206 | 157 | 189 | 240 | 253 | 205 | 247 | 254 | 173 | 190 | 192 | 168 | 165 | 146 |
| (6,11) | 142 | 143 | 159 | 153 | 140 | 125 | 102 | 135 | 85 | 74 | 137 | 114 | 98 | 166 | 189 | 240 | 173 | 215 | 250 | 168 | 177 | 174 | 154 | 156 | 137 |
| (7,11) | 143 | 159 | 153 | 153 | 140 | 134 | 108 | 140 | 101 | 80 | 135 | 92 | 90 | 142 | 166 | 189 | 168 | 190 | 208 | 154 | 165 | 160 | 160 | 133 | 113 |
| (8,11) | 159 | 153 | 153 | 145 | 145 | 143 | 117 | 140 | 125 | 78 | 140 | 85 | 82 | 143 | 142 | 166 | 154 | 177 | 192 | 160 | 156 | 146 | 157 | 141 | 113 |
| (9,11) | 153 | 153 | 145 | 139 | 128 | 128 | 112 | 145 | 134 | 102 | 140 | 101 | 74 | 159 | 143 | 142 | 160 | 165 | 174 | 157 | 133 | 137 | 124 | 132 | 128 |
| (10,11) | 153 | 145 | 139 | 126 | 135 | 141 | 111 | 128 | 143 | 108 | 145 | 125 | 80 | 153 | 159 | 143 | 157 | 156 | 160 | 124 | 141 | 113 | 132 | 118 | 112 |
| (11,11) | 145 | 139 | 126 | 110 | 137 | 133 | 123 | 135 | 128 | 117 | 128 | 134 | 78 | 153 | 153 | 159 | 124 | 133 | 146 | 132 | 132 | 113 | 143 | 111 | 82 |
| (12,11) | 139 | 126 | 110 | 105 | 148 | 128 | 121 | 137 | 141 | 112 | 135 | 143 | 102 | 145 | 153 | 153 | 132 | 141 | 137 | 143 | 118 | 128 | 116 | 89 | 78 |
| (13,11) | 126 | 110 | 105 | 89 | 122 | 123 | 131 | 148 | 133 | 111 | 137 | 128 | 108 | 139 | 145 | 153 | 143 | 132 | 113 | 116 | 111 | 112 | 109 | 94 | 83 |
| (14,11) | 110 | 105 | 89 | 81 | 116 | 113 | 128 | 122 | 128 | 123 | 148 | 141 | 117 | 126 | 139 | 145 | 116 | 118 | 113 | 109 | 89 | 82 | 97 | 75 | 93 |
| (15,11) | 105 | 89 | 89 | 89 | 113 | 107 | 109 | 116 | 123 | 121 | 122 | 133 | 112 | 110 | 126 | 139 | 109 | 111 | 128 | 97 | 94 | 78 | 93 | 75 | 95 |
| (16,11) | 89 | 81 | 81 | 65 | 113 | 106 | 98 | 113 | 113 | 131 | 116 | 128 | 111 | 105 | 110 | 126 | 97 | 89 | 112 | 93 | 75 | 83 | 76 | 84 | 101 |
| (17,11) | 81 | 89 | 89 | 67 | 80 | 100 | 95 | 113 | 107 | 128 | 113 | 123 | 123 | 89 | 105 | 110 | 93 | 94 | 82 | 76 | 75 | 93 | 69 | 85 | 100 |

*FIG. 19D*

| TDE | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 |
|---|---|---|---|---|---|---|---|---|---|---|---|---|---|---|---|---|---|---|---|---|---|---|---|---|---|
| (4,12) | 124 | 137 | 135 | 140 | 92 | 74 | 86 | 114 | 90 | 68 | 206 | 157 | 69 | 234 | 250 | 254 | 240 | 253 | 254 | 189 | 205 | 215 | 166 | 168 | 165 |
| (5,12) | 137 | 135 | 140 | 140 | 85 | 80 | 90 | 92 | 82 | 71 | 114 | 98 | 71 | 124 | 234 | 250 | 189 | 244 | 254 | 166 | 173 | 190 | 142 | 154 | 156 |
| (6,12) | 135 | 140 | 140 | 145 | 101 | 78 | 81 | 85 | 74 | 79 | 92 | 90 | 74 | 137 | 124 | 234 | 166 | 205 | 247 | 142 | 168 | 177 | 143 | 160 | 133 |
| (7,12) | 140 | 140 | 145 | 128 | 125 | 102 | 99 | 101 | 80 | 86 | 85 | 82 | 68 | 135 | 137 | 124 | 142 | 173 | 215 | 143 | 154 | 165 | 159 | 157 | 141 |
| (8,12) | 140 | 145 | 128 | 135 | 134 | 108 | 104 | 125 | 78 | 90 | 101 | 74 | 71 | 140 | 135 | 137 | 143 | 168 | 190 | 159 | 160 | 156 | 153 | 124 | 132 |
| (9,12) | 145 | 128 | 135 | 137 | 143 | 117 | 102 | 134 | 102 | 81 | 125 | 80 | 79 | 140 | 140 | 135 | 159 | 154 | 177 | 153 | 157 | 133 | 153 | 132 | 118 |
| (10,12) | 128 | 135 | 137 | 148 | 128 | 112 | 113 | 143 | 108 | 99 | 134 | 78 | 86 | 145 | 140 | 140 | 153 | 160 | 165 | 153 | 124 | 141 | 145 | 143 | 111 |
| (11,12) | 135 | 137 | 148 | 122 | 141 | 111 | 109 | 128 | 117 | 104 | 143 | 102 | 90 | 128 | 145 | 140 | 153 | 157 | 156 | 145 | 132 | 132 | 139 | 116 | 89 |
| (12,12) | 137 | 148 | 122 | 116 | 133 | 123 | 108 | 141 | 112 | 102 | 128 | 108 | 81 | 135 | 128 | 145 | 145 | 124 | 133 | 139 | 143 | 118 | 126 | 109 | 94 |
| (13,12) | 148 | 122 | 116 | 113 | 128 | 121 | 99 | 133 | 111 | 113 | 141 | 117 | 99 | 137 | 135 | 128 | 139 | 132 | 141 | 126 | 116 | 111 | 110 | 97 | 75 |
| (14,12) | 122 | 116 | 113 | 113 | 123 | 131 | 110 | 128 | 123 | 109 | 133 | 112 | 104 | 148 | 137 | 135 | 126 | 143 | 132 | 110 | 109 | 89 | 105 | 93 | 75 |
| (15,12) | 116 | 113 | 113 | 80 | 113 | 128 | 99 | 123 | 121 | 108 | 128 | 111 | 102 | 122 | 148 | 137 | 110 | 116 | 118 | 105 | 97 | 94 | 89 | 76 | 84 |
| (16,12) | 113 | 113 | 80 | 66 | 107 | 109 | 94 | 113 | 131 | 99 | 123 | 123 | 113 | 116 | 122 | 148 | 105 | 109 | 111 | 89 | 93 | 75 | 81 | 69 | 85 |
| (17,12) | 113 | 80 | 66 | 69 | 106 | 98 | 110 | 107 | 128 | 110 | 113 | 121 | 109 | 113 | 116 | 122 | 89 | 97 | 89 | 81 | 76 | 75 | 89 | 73 | 95 |
| (4,13) | 114 | 92 | 85 | 101 | 82 | 79 | 98 | 90 | 68 | 62 | 98 | 71 | 52 | 206 | 242 | 248 | 234 | 253 | 254 | 124 | 189 | 205 | 137 | 142 | 154 |
| (5,13) | 92 | 85 | 101 | 125 | 74 | 86 | 84 | 82 | 71 | 79 | 90 | 74 | 42 | 114 | 206 | 242 | 124 | 240 | 253 | 137 | 166 | 173 | 135 | 143 | 160 |
| (6,13) | 85 | 101 | 125 | 134 | 80 | 90 | 69 | 74 | 79 | 84 | 82 | 68 | 64 | 92 | 114 | 206 | 137 | 189 | 244 | 135 | 142 | 168 | 140 | 159 | 157 |
| (7,13) | 101 | 125 | 134 | 143 | 78 | 81 | 75 | 80 | 86 | 98 | 74 | 71 | 62 | 85 | 92 | 114 | 135 | 166 | 205 | 140 | 143 | 154 | 140 | 153 | 124 |
| (8,13) | 125 | 134 | 143 | 128 | 102 | 99 | 74 | 78 | 90 | 84 | 80 | 79 | 79 | 101 | 85 | 92 | 140 | 142 | 173 | 140 | 159 | 160 | 145 | 153 | 132 |
| (9,13) | 134 | 143 | 128 | 141 | 108 | 104 | 85 | 102 | 81 | 69 | 78 | 86 | 84 | 125 | 101 | 85 | 140 | 143 | 168 | 145 | 153 | 157 | 128 | 145 | 143 |
| (10,13) | 143 | 128 | 141 | 133 | 117 | 102 | 81 | 108 | 99 | 75 | 102 | 90 | 98 | 134 | 125 | 101 | 145 | 159 | 154 | 128 | 153 | 124 | 135 | 139 | 116 |
| (11,13) | 128 | 141 | 133 | 128 | 112 | 113 | 109 | 117 | 104 | 74 | 108 | 81 | 84 | 143 | 134 | 125 | 128 | 153 | 160 | 135 | 145 | 132 | 137 | 126 | 109 |
| (12,13) | 141 | 133 | 128 | 123 | 111 | 109 | 105 | 112 | 102 | 85 | 117 | 99 | 69 | 128 | 143 | 134 | 135 | 153 | 157 | 137 | 139 | 143 | 148 | 110 | 97 |
| (13,13) | 133 | 128 | 123 | 113 | 123 | 108 | 103 | 111 | 113 | 81 | 112 | 104 | 75 | 141 | 128 | 143 | 137 | 145 | 124 | 148 | 126 | 116 | 122 | 105 | 93 |
| (14,13) | 128 | 123 | 113 | 107 | 121 | 99 | 115 | 123 | 109 | 109 | 111 | 102 | 74 | 133 | 141 | 128 | 148 | 139 | 132 | 122 | 110 | 109 | 116 | 89 | 76 |
| (15,13) | 123 | 113 | 107 | 106 | 131 | 110 | 120 | 121 | 108 | 105 | 123 | 113 | 85 | 128 | 133 | 141 | 122 | 126 | 143 | 116 | 105 | 97 | 113 | 81 | 69 |
| (16,13) | 113 | 107 | 106 | 100 | 128 | 99 | 111 | 131 | 99 | 103 | 121 | 109 | 81 | 123 | 128 | 133 | 116 | 110 | 116 | 113 | 89 | 93 | 113 | 89 | 73 |
| (17,13) | 107 | 106 | 100 | 85 | 109 | 94 | 100 | 128 | 110 | 115 | 131 | 108 | 109 | 113 | 123 | 128 | 113 | 105 | 109 | 113 | 81 | 76 | 80 | 65 | 81 |

*FIG. 19E*

| TDE | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 |
|---|---|---|---|---|---|---|---|---|---|---|---|---|---|---|---|---|---|---|---|---|---|---|---|---|---|
| (4,14) | 90 | 82 | 74 | 80 | 71 | 84 | 69 | 90 | 62 | 111 | 74 | 42 | 52 | 98 | 157 | 211 | 206 | 250 | 254 | 114 | 124 | 189 | 92 | 135 | 143 |
| (5,14) | 82 | 74 | 80 | 78 | 79 | 98 | 80 | 82 | 79 | 125 | 68 | 64 | 73 | 90 | 98 | 157 | 114 | 234 | 253 | 92 | 137 | 166 | 85 | 140 | 159 |
| (6,14) | 74 | 80 | 78 | 102 | 86 | 84 | 69 | 74 | 84 | 94 | 71 | 62 | 116 | 82 | 90 | 98 | 92 | 124 | 240 | 85 | 135 | 142 | 101 | 140 | 153 |
| (7,14) | 80 | 78 | 102 | 108 | 90 | 69 | 63 | 80 | 98 | 69 | 79 | 79 | 111 | 74 | 82 | 90 | 85 | 137 | 189 | 101 | 140 | 143 | 125 | 145 | 153 |
| (8,14) | 78 | 102 | 108 | 117 | 81 | 75 | 72 | 78 | 84 | 80 | 86 | 84 | 125 | 80 | 74 | 82 | 101 | 135 | 166 | 125 | 140 | 159 | 134 | 128 | 145 |
| (9,14) | 102 | 108 | 117 | 112 | 99 | 74 | 73 | 102 | 69 | 69 | 90 | 98 | 94 | 78 | 80 | 74 | 125 | 140 | 142 | 134 | 145 | 153 | 143 | 135 | 139 |
| (10,14) | 108 | 117 | 112 | 111 | 104 | 85 | 81 | 108 | 75 | 63 | 81 | 84 | 69 | 102 | 78 | 80 | 134 | 140 | 143 | 143 | 128 | 153 | 128 | 137 | 126 |
| (11,14) | 117 | 112 | 111 | 123 | 102 | 81 | 104 | 117 | 74 | 72 | 99 | 69 | 80 | 108 | 102 | 78 | 143 | 145 | 159 | 128 | 135 | 145 | 141 | 148 | 110 |
| (12,14) | 112 | 111 | 123 | 121 | 113 | 109 | 88 | 112 | 85 | 73 | 104 | 75 | 69 | 117 | 108 | 102 | 128 | 128 | 153 | 141 | 137 | 139 | 133 | 122 | 105 |
| (13,14) | 111 | 123 | 121 | 131 | 109 | 105 | 106 | 111 | 81 | 81 | 102 | 74 | 63 | 112 | 117 | 108 | 141 | 135 | 153 | 133 | 148 | 126 | 128 | 116 | 89 |
| (14,14) | 123 | 121 | 131 | 128 | 108 | 103 | 109 | 123 | 109 | 104 | 113 | 85 | 72 | 111 | 112 | 117 | 133 | 137 | 145 | 128 | 122 | 110 | 123 | 113 | 81 |
| (15,14) | 121 | 131 | 128 | 109 | 99 | 115 | 114 | 121 | 105 | 88 | 109 | 81 | 73 | 123 | 111 | 112 | 128 | 148 | 139 | 123 | 116 | 105 | 113 | 113 | 89 |
| (16,14) | 131 | 128 | 109 | 98 | 110 | 120 | 100 | 131 | 103 | 106 | 108 | 109 | 81 | 121 | 123 | 111 | 123 | 122 | 126 | 113 | 113 | 89 | 107 | 80 | 65 |
| (17,14) | 128 | 109 | 98 | 95 | 99 | 111 | 103 | 128 | 115 | 109 | 99 | 105 | 104 | 131 | 121 | 123 | 113 | 116 | 110 | 107 | 114 | 81 | 106 | 66 | 67 |
| (4,15) | 68 | 71 | 79 | 86 | 79 | 94 | 84 | 62 | 111 | 41 | 64 | 73 | 8 | 74 | 71 | 69 | 98 | 242 | 254 | 90 | 114 | 124 | 82 | 85 | 140 |
| (5,15) | 71 | 79 | 86 | 90 | 84 | 69 | 112 | 79 | 125 | 25 | 62 | 116 | 34 | 68 | 74 | 71 | 90 | 206 | 250 | 82 | 92 | 137 | 74 | 101 | 140 |
| (6,15) | 79 | 86 | 90 | 81 | 98 | 80 | 45 | 84 | 94 | 49 | 79 | 111 | 51 | 71 | 68 | 74 | 82 | 114 | 234 | 74 | 85 | 135 | 80 | 125 | 145 |
| (7,15) | 86 | 90 | 81 | 99 | 84 | 69 | 53 | 98 | 69 | 84 | 84 | 125 | 41 | 79 | 71 | 68 | 74 | 92 | 124 | 80 | 101 | 140 | 78 | 134 | 128 |
| (8,15) | 90 | 81 | 99 | 104 | 69 | 63 | 43 | 84 | 80 | 112 | 98 | 94 | 25 | 86 | 79 | 71 | 80 | 85 | 137 | 78 | 125 | 140 | 102 | 143 | 135 |
| (9,15) | 81 | 99 | 104 | 102 | 75 | 72 | 60 | 69 | 69 | 45 | 84 | 69 | 49 | 90 | 86 | 79 | 78 | 101 | 135 | 102 | 134 | 145 | 108 | 128 | 137 |
| (10,15) | 99 | 104 | 102 | 113 | 74 | 73 | 57 | 75 | 63 | 53 | 69 | 80 | 84 | 81 | 90 | 86 | 102 | 125 | 140 | 108 | 143 | 128 | 117 | 141 | 148 |
| (11,15) | 104 | 102 | 113 | 109 | 85 | 81 | 59 | 74 | 72 | 43 | 75 | 69 | 112 | 99 | 81 | 90 | 108 | 134 | 140 | 117 | 128 | 135 | 112 | 133 | 122 |
| (12,15) | 102 | 113 | 109 | 108 | 81 | 104 | 71 | 85 | 73 | 60 | 74 | 63 | 45 | 104 | 99 | 81 | 117 | 143 | 145 | 112 | 141 | 137 | 111 | 128 | 116 |
| (13,15) | 113 | 109 | 108 | 99 | 109 | 88 | 74 | 81 | 81 | 57 | 85 | 72 | 53 | 102 | 104 | 99 | 112 | 128 | 128 | 111 | 133 | 148 | 123 | 123 | 113 |
| (14,15) | 109 | 108 | 99 | 110 | 105 | 106 | 95 | 109 | 104 | 59 | 81 | 73 | 43 | 113 | 102 | 104 | 111 | 141 | 135 | 123 | 128 | 122 | 121 | 113 | 113 |
| (15,15) | 108 | 99 | 110 | 99 | 103 | 109 | 102 | 105 | 88 | 71 | 109 | 81 | 60 | 109 | 113 | 102 | 123 | 133 | 137 | 121 | 123 | 116 | 131 | 107 | 80 |
| (16,15) | 99 | 110 | 99 | 94 | 115 | 114 | 91 | 103 | 106 | 74 | 105 | 104 | 57 | 108 | 109 | 113 | 121 | 128 | 148 | 131 | 113 | 113 | 128 | 106 | 66 |
| (17,15) | 110 | 99 | 94 | 110 | 120 | 100 | 103 | 115 | 109 | 95 | 103 | 88 | 59 | 99 | 108 | 109 | 131 | 123 | 122 | 128 | 107 | 113 | 109 | 100 | 69 |

*FIG. 19F*

| TDE | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 |
|---|---|---|---|---|---|---|---|---|---|---|---|---|---|---|---|---|---|---|---|---|---|---|---|---|---|
| (4,16) | 62 | 79 | 84 | 98 | 125 | 49 | 85 | 111 | 41 | 87 | 116 | 34 | 125 | 64 | 42 | 52 | 74 | 157 | 248 | 68 | 90 | 114 | 71 | 74 | 101 |
| (5,16) | 79 | 84 | 98 | 84 | 94 | 84 | 136 | 125 | 25 | 98 | 111 | 51 | 114 | 62 | 64 | 42 | 68 | 98 | 242 | 71 | 82 | 92 | 79 | 80 | 125 |
| (6,16) | 84 | 98 | 84 | 69 | 69 | 112 | 87 | 94 | 49 | 84 | 125 | 41 | 63 | 79 | 62 | 64 | 71 | 90 | 206 | 79 | 74 | 85 | 86 | 78 | 134 |
| (7,16) | 98 | 84 | 69 | 75 | 80 | 45 | 39 | 69 | 84 | 85 | 94 | 25 | 87 | 84 | 79 | 62 | 79 | 82 | 114 | 86 | 80 | 101 | 90 | 102 | 143 |
| (8,16) | 84 | 69 | 75 | 74 | 69 | 53 | 58 | 80 | 112 | 136 | 69 | 49 | 98 | 98 | 84 | 79 | 86 | 74 | 92 | 90 | 78 | 125 | 81 | 108 | 128 |
| (9,16) | 69 | 75 | 74 | 85 | 63 | 43 | 38 | 69 | 45 | 87 | 80 | 84 | 84 | 84 | 98 | 84 | 90 | 80 | 85 | 81 | 102 | 134 | 99 | 117 | 141 |
| (10,16) | 75 | 74 | 85 | 81 | 72 | 60 | 34 | 63 | 53 | 39 | 69 | 112 | 85 | 69 | 84 | 98 | 81 | 78 | 101 | 99 | 108 | 143 | 104 | 112 | 133 |
| (11,16) | 74 | 85 | 81 | 109 | 73 | 57 | 47 | 72 | 43 | 58 | 63 | 45 | 136 | 75 | 69 | 84 | 99 | 102 | 125 | 104 | 117 | 128 | 102 | 111 | 128 |
| (12,16) | 85 | 81 | 109 | 105 | 81 | 59 | 56 | 73 | 60 | 38 | 72 | 53 | 87 | 74 | 75 | 69 | 104 | 108 | 134 | 102 | 112 | 141 | 113 | 123 | 123 |
| (13,16) | 81 | 109 | 105 | 103 | 104 | 71 | 59 | 81 | 57 | 34 | 73 | 43 | 39 | 85 | 74 | 75 | 102 | 117 | 143 | 113 | 111 | 133 | 109 | 121 | 113 |
| (14,16) | 109 | 105 | 103 | 115 | 88 | 74 | 72 | 104 | 59 | 47 | 81 | 60 | 58 | 81 | 85 | 74 | 113 | 112 | 128 | 109 | 123 | 128 | 108 | 131 | 107 |
| (15,16) | 105 | 103 | 115 | 120 | 106 | 95 | 71 | 88 | 71 | 56 | 104 | 57 | 38 | 109 | 81 | 85 | 109 | 111 | 141 | 108 | 121 | 123 | 99 | 128 | 106 |
| (16,16) | 103 | 115 | 120 | 111 | 109 | 102 | 102 | 106 | 74 | 59 | 88 | 59 | 34 | 105 | 109 | 81 | 108 | 123 | 133 | 99 | 131 | 113 | 110 | 109 | 100 |
| (17,16) | 115 | 120 | 111 | 100 | 114 | 91 | 92 | 109 | 95 | 72 | 106 | 71 | 47 | 103 | 105 | 109 | 99 | 121 | 128 | 110 | 128 | 107 | 99 | 98 | 85 |
| (4,17) | 111 | 125 | 94 | 69 | 25 | 84 | 118 | 41 | 87 | 142 | 51 | 114 | 187 | 116 | 73 | 52 | 64 | 71 | 211 | 62 | 68 | 90 | 79 | 79 | 80 |
| (5,17) | 125 | 94 | 69 | 80 | 49 | 85 | 121 | 25 | 98 | 143 | 41 | 63 | 151 | 111 | 116 | 73 | 62 | 74 | 157 | 79 | 71 | 82 | 84 | 86 | 78 |
| (6,17) | 94 | 69 | 80 | 69 | 84 | 136 | 52 | 49 | 84 | 138 | 25 | 87 | 152 | 125 | 111 | 116 | 79 | 68 | 98 | 84 | 79 | 74 | 98 | 90 | 102 |
| (7,17) | 69 | 80 | 69 | 63 | 112 | 87 | 33 | 84 | 85 | 118 | 49 | 98 | 142 | 94 | 125 | 111 | 84 | 71 | 90 | 98 | 86 | 80 | 84 | 81 | 108 |
| (8,17) | 80 | 69 | 63 | 72 | 45 | 39 | 52 | 112 | 136 | 121 | 84 | 84 | 143 | 69 | 94 | 125 | 98 | 79 | 82 | 84 | 90 | 78 | 69 | 99 | 117 |
| (9,17) | 69 | 63 | 72 | 73 | 53 | 58 | 44 | 45 | 87 | 52 | 112 | 85 | 138 | 80 | 69 | 94 | 84 | 86 | 74 | 69 | 81 | 102 | 75 | 104 | 112 |
| (10,17) | 63 | 72 | 73 | 81 | 43 | 38 | 42 | 53 | 39 | 33 | 45 | 136 | 118 | 69 | 80 | 69 | 69 | 90 | 80 | 75 | 99 | 108 | 74 | 102 | 111 |
| (11,17) | 72 | 73 | 81 | 104 | 60 | 34 | 24 | 43 | 58 | 52 | 53 | 87 | 121 | 63 | 69 | 80 | 75 | 81 | 78 | 74 | 104 | 117 | 85 | 113 | 123 |
| (12,17) | 73 | 81 | 104 | 88 | 57 | 47 | 46 | 60 | 38 | 44 | 43 | 39 | 52 | 72 | 63 | 69 | 74 | 99 | 102 | 85 | 102 | 112 | 81 | 109 | 121 |
| (13,17) | 81 | 104 | 88 | 106 | 59 | 56 | 45 | 57 | 34 | 42 | 60 | 58 | 33 | 73 | 72 | 63 | 85 | 104 | 108 | 81 | 113 | 111 | 109 | 108 | 131 |
| (14,17) | 104 | 88 | 106 | 109 | 71 | 59 | 59 | 59 | 47 | 24 | 57 | 38 | 52 | 73 | 73 | 72 | 81 | 102 | 117 | 109 | 109 | 123 | 105 | 99 | 128 |
| (15,17) | 88 | 106 | 109 | 114 | 74 | 72 | 73 | 71 | 56 | 46 | 59 | 34 | 44 | 81 | 73 | 73 | 109 | 113 | 112 | 105 | 108 | 121 | 103 | 110 | 109 |
| (16,17) | 106 | 109 | 114 | 100 | 95 | 71 | 57 | 74 | 59 | 45 | 71 | 47 | 42 | 104 | 104 | 81 | 105 | 109 | 111 | 103 | 99 | 131 | 115 | 99 | 98 |
| (17,17) | 109 | 114 | 100 | 103 | 102 | 102 | 62 | 95 | 72 | 59 | 74 | 56 | 24 | 106 | 88 | 104 | 103 | 108 | 123 | 115 | 110 | 128 | 120 | 94 | 95 |

*FIG. 19G*

| DE Loc Ref | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 | KF Ct |
|---|---|---|---|---|---|---|---|---|---|---|---|---|---|---|---|---|---|---|---|---|---|---|---|---|---|---|
| (4,4) | 159 | 164 | 162 | 153 | 155 | 163 | 148 | 176 | 152 | 171 | 206 | 254 | 254 | 174 | 252 | 254 | 167 | 212 | 250 | 145 | 152 | 144 | 145 | 132 | 117 | 1 |
| (5,4) | 164 | 162 | 153 | 156 | 161 | 172 | 152 | 155 | 138 | 161 | 176 | 240 | 254 | 159 | 174 | 252 | 145 | 168 | 195 | 145 | 144 | 127 | 152 | 137 | 122 | 1 |
| (6,4) | 162 | 153 | 156 | 142 | 154 | 167 | 121 | 161 | 163 | 167 | 155 | 152 | 250 | 164 | 159 | 174 | 145 | 152 | 166 | 152 | 132 | 114 | 137 | 130 | 135 | 1 |
| (7,4) | 153 | 156 | 142 | 121 | 155 | 137 | 139 | 154 | 172 | 148 | 161 | 138 | 171 | 162 | 164 | 159 | 152 | 144 | 144 | 137 | 137 | 117 | 150 | 128 | 121 | 1 |
| (8,4) | 156 | 142 | 121 | 117 | 115 | 123 | 124 | 155 | 167 | 152 | 154 | 163 | 161 | 153 | 162 | 164 | 137 | 132 | 127 | 150 | 130 | 122 | 139 | 122 | 128 | 1 |
| (9,4) | 142 | 121 | 117 | 124 | 108 | 95 | 115 | 115 | 137 | 121 | 155 | 172 | 167 | 156 | 153 | 162 | 150 | 137 | 114 | 139 | 128 | 135 | 123 | 121 | 130 | 1 |
| (10,4) | 121 | 117 | 124 | 122 | 105 | 78 | 76 | 108 | 123 | 139 | 115 | 167 | 148 | 142 | 156 | 153 | 139 | 130 | 117 | 123 | 122 | 121 | 126 | 115 | 125 | 1 |
| (4,5) | 176 | 155 | 161 | 154 | 138 | 167 | 160 | 152 | 171 | 208 | 240 | 254 | 254 | 206 | 254 | 254 | 174 | 234 | 250 | 159 | 145 | 152 | 164 | 152 | 137 | 1 |
| (5,5) | 155 | 161 | 154 | 155 | 163 | 148 | 146 | 138 | 161 | 192 | 152 | 250 | 254 | 176 | 206 | 254 | 159 | 167 | 195 | 164 | 145 | 144 | 162 | 137 | 130 | 1 |
| (6,5) | 161 | 154 | 155 | 115 | 172 | 152 | 137 | 163 | 167 | 174 | 138 | 171 | 250 | 155 | 176 | 206 | 164 | 145 | 166 | 162 | 152 | 132 | 153 | 150 | 128 | 1 |
| (7,5) | 154 | 155 | 115 | 108 | 167 | 121 | 113 | 172 | 148 | 160 | 163 | 161 | 208 | 161 | 155 | 176 | 162 | 145 | 144 | 153 | 137 | 137 | 156 | 139 | 122 | 1 |
| (8,5) | 155 | 115 | 108 | 105 | 137 | 139 | 113 | 167 | 152 | 146 | 172 | 167 | 192 | 154 | 161 | 155 | 153 | 152 | 127 | 156 | 150 | 130 | 142 | 123 | 121 | 1 |
| (9,5) | 115 | 108 | 105 | 119 | 123 | 124 | 128 | 137 | 121 | 137 | 167 | 148 | 174 | 155 | 154 | 161 | 156 | 137 | 114 | 142 | 139 | 128 | 121 | 126 | 115 | 1 |
| (10,5) | 108 | 105 | 119 | 110 | 95 | 115 | 112 | 123 | 139 | 113 | 137 | 152 | 160 | 115 | 155 | 154 | 142 | 150 | 117 | 121 | 123 | 122 | 117 | 117 | 130 | 1 |
| (4,6) | 152 | 138 | 163 | 172 | 161 | 174 | 165 | 171 | 208 | 215 | 250 | 254 | 254 | 240 | 254 | 254 | 206 | 252 | 253 | 176 | 159 | 145 | 155 | 162 | 137 | 1 |
| (5,6) | 138 | 163 | 172 | 167 | 167 | 160 | 156 | 161 | 192 | 190 | 171 | 250 | 254 | 152 | 240 | 254 | 176 | 174 | 212 | 155 | 164 | 145 | 161 | 153 | 150 | 1 |
| (6,6) | 163 | 172 | 167 | 137 | 148 | 146 | 133 | 167 | 174 | 177 | 161 | 208 | 247 | 138 | 152 | 240 | 155 | 159 | 168 | 161 | 162 | 152 | 154 | 156 | 139 | 1 |
| (7,6) | 172 | 167 | 137 | 123 | 152 | 137 | 141 | 148 | 160 | 165 | 167 | 192 | 215 | 163 | 138 | 152 | 161 | 164 | 152 | 154 | 153 | 137 | 155 | 142 | 123 | 1 |
| (8,6) | 167 | 137 | 123 | 95 | 121 | 113 | 132 | 152 | 146 | 156 | 148 | 174 | 190 | 172 | 163 | 138 | 154 | 162 | 144 | 155 | 156 | 150 | 115 | 121 | 126 | 1 |
| (9,6) | 137 | 123 | 95 | 78 | 139 | 113 | 118 | 121 | 137 | 133 | 152 | 160 | 177 | 167 | 172 | 163 | 155 | 153 | 132 | 115 | 142 | 139 | 108 | 117 | 117 | 1 |
| (10,6) | 123 | 95 | 78 | 103 | 124 | 128 | 111 | 139 | 113 | 141 | 121 | 146 | 165 | 137 | 167 | 172 | 115 | 156 | 137 | 108 | 121 | 123 | 105 | 124 | 116 | 1 |
| (4,7) | 171 | 161 | 167 | 148 | 192 | 177 | 154 | 208 | 215 | 205 | 250 | 254 | 254 | 250 | 254 | 254 | 240 | 254 | 254 | 152 | 176 | 159 | 138 | 161 | 153 | 1 |
| (5,7) | 161 | 167 | 148 | 152 | 174 | 165 | 160 | 192 | 190 | 173 | 208 | 247 | 253 | 171 | 250 | 254 | 152 | 206 | 252 | 138 | 155 | 164 | 163 | 154 | 156 | 1 |
| (6,7) | 167 | 148 | 152 | 121 | 160 | 156 | 157 | 174 | 177 | 168 | 192 | 215 | 244 | 161 | 171 | 250 | 138 | 176 | 174 | 163 | 161 | 162 | 172 | 155 | 142 | 1 |
| (7,7) | 148 | 152 | 121 | 139 | 146 | 133 | 124 | 160 | 165 | 154 | 174 | 190 | 205 | 167 | 161 | 171 | 250 | 155 | 159 | 172 | 154 | 153 | 167 | 115 | 121 | 1 |
| (8,7) | 152 | 121 | 139 | 124 | 137 | 141 | 132 | 146 | 156 | 160 | 160 | 177 | 173 | 148 | 167 | 161 | 164 | 161 | 164 | 167 | 155 | 156 | 137 | 108 | 117 | 1 |
| (9,7) | 121 | 139 | 124 | 115 | 113 | 132 | 143 | 137 | 133 | 157 | 146 | 165 | 168 | 152 | 148 | 167 | 172 | 154 | 162 | 137 | 115 | 142 | 123 | 105 | 124 | 1 |
| (10,7) | 139 | 124 | 115 | 76 | 113 | 118 | 116 | 113 | 141 | 124 | 137 | 156 | 154 | 121 | 152 | 148 | 137 | 155 | 153 | 123 | 108 | 121 | 95 | 119 | 122 | 1 |

*FIG. 20A*

| TDE Loc Ref | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 | KF Ct |
|---|---|---|---|---|---|---|---|---|---|---|---|---|---|---|---|---|---|---|---|---|---|---|---|---|---|---|
| (4,8) | 208 | 192 | 174 | 160 | 190 | 168 | 143 | 215 | 205 | 189 | 247 | 253 | 254 | 250 | 254 | 254 | 250 | 254 | 254 | 171 | 152 | 176 | 161 | 163 | 154 | 1 |
| (5,8) | 192 | 174 | 160 | 146 | 177 | 154 | 159 | 190 | 173 | 166 | 215 | 244 | 253 | 208 | 250 | 254 | 171 | 240 | 254 | 161 | 138 | 155 | 167 | 172 | 155 | 1 |
| (6,8) | 174 | 160 | 146 | 137 | 165 | 160 | 153 | 177 | 168 | 142 | 190 | 205 | 240 | 192 | 208 | 250 | 161 | 152 | 206 | 167 | 163 | 161 | 148 | 167 | 115 | 1 |
| (7,8) | 160 | 146 | 137 | 113 | 156 | 157 | 153 | 165 | 154 | 143 | 177 | 173 | 189 | 174 | 192 | 208 | 167 | 138 | 176 | 148 | 172 | 154 | 152 | 137 | 108 | 1 |
| (8,8) | 146 | 137 | 113 | 113 | 133 | 124 | 145 | 156 | 160 | 159 | 165 | 168 | 166 | 160 | 174 | 192 | 148 | 163 | 155 | 152 | 167 | 155 | 121 | 123 | 105 | 1 |
| (9,8) | 137 | 113 | 113 | 128 | 141 | 132 | 139 | 133 | 157 | 153 | 156 | 154 | 142 | 146 | 160 | 174 | 152 | 172 | 161 | 121 | 137 | 115 | 139 | 95 | 119 | 1 |
| (10,8) | 113 | 113 | 128 | 112 | 132 | 143 | 126 | 141 | 124 | 153 | 133 | 160 | 143 | 137 | 146 | 160 | 121 | 167 | 154 | 139 | 123 | 108 | 124 | 78 | 110 | 1 |
| (4,9) | 215 | 190 | 177 | 165 | 173 | 142 | 140 | 205 | 189 | 124 | 244 | 253 | 254 | 247 | 254 | 254 | 250 | 254 | 254 | 208 | 171 | 152 | 192 | 167 | 172 | 1 |
| (5,9) | 190 | 177 | 165 | 156 | 168 | 143 | 140 | 173 | 166 | 137 | 205 | 240 | 250 | 215 | 247 | 254 | 208 | 250 | 254 | 192 | 161 | 138 | 174 | 148 | 167 | 1 |
| (6,9) | 177 | 165 | 156 | 133 | 154 | 159 | 145 | 168 | 142 | 135 | 173 | 189 | 234 | 190 | 215 | 247 | 192 | 171 | 240 | 174 | 167 | 163 | 160 | 152 | 137 | 1 |
| (7,9) | 165 | 156 | 133 | 141 | 160 | 153 | 128 | 154 | 143 | 140 | 168 | 166 | 124 | 177 | 190 | 215 | 174 | 161 | 152 | 160 | 148 | 172 | 146 | 121 | 123 | 1 |
| (8,9) | 156 | 133 | 141 | 132 | 157 | 153 | 135 | 160 | 159 | 140 | 154 | 142 | 137 | 165 | 177 | 190 | 160 | 167 | 138 | 146 | 152 | 167 | 137 | 139 | 95 | 1 |
| (9,9) | 133 | 141 | 132 | 118 | 124 | 145 | 137 | 157 | 153 | 145 | 160 | 143 | 135 | 156 | 165 | 177 | 146 | 148 | 163 | 137 | 121 | 137 | 113 | 124 | 78 | 1 |
| (10,9) | 141 | 132 | 118 | 111 | 132 | 139 | 148 | 124 | 153 | 128 | 157 | 159 | 140 | 133 | 156 | 165 | 137 | 152 | 172 | 113 | 139 | 123 | 113 | 115 | 103 | 1 |
| (4,10) | 205 | 173 | 168 | 154 | 166 | 135 | 101 | 189 | 124 | 114 | 240 | 250 | 248 | 244 | 253 | 254 | 247 | 254 | 254 | 215 | 208 | 171 | 190 | 174 | 148 | 1 |
| (5,10) | 173 | 168 | 154 | 160 | 142 | 140 | 125 | 166 | 137 | 92 | 189 | 234 | 242 | 205 | 244 | 253 | 215 | 250 | 254 | 190 | 192 | 161 | 177 | 160 | 152 | 1 |
| (6,10) | 168 | 154 | 160 | 157 | 143 | 140 | 134 | 142 | 135 | 85 | 166 | 124 | 206 | 173 | 205 | 244 | 190 | 208 | 250 | 177 | 174 | 167 | 165 | 146 | 121 | 1 |
| (7,10) | 154 | 160 | 157 | 124 | 159 | 145 | 143 | 143 | 140 | 101 | 142 | 137 | 114 | 168 | 173 | 205 | 177 | 192 | 171 | 165 | 160 | 148 | 156 | 137 | 139 | 1 |
| (8,10) | 160 | 157 | 124 | 132 | 153 | 128 | 128 | 159 | 140 | 125 | 143 | 135 | 92 | 154 | 168 | 173 | 165 | 174 | 161 | 156 | 146 | 152 | 133 | 113 | 124 | 1 |
| (9,10) | 157 | 124 | 132 | 143 | 153 | 135 | 141 | 153 | 145 | 134 | 159 | 140 | 85 | 160 | 154 | 168 | 156 | 160 | 167 | 133 | 137 | 121 | 141 | 113 | 115 | 1 |
| (10,10) | 124 | 132 | 143 | 116 | 145 | 137 | 133 | 153 | 128 | 143 | 153 | 140 | 101 | 157 | 160 | 154 | 133 | 146 | 148 | 141 | 113 | 139 | 132 | 128 | 76 | 1 |
| (11,11) | 145 | 139 | 126 | 110 | 137 | 133 | 123 | 135 | 128 | 117 | 128 | 134 | 78 | 153 | 153 | 159 | 124 | 133 | 146 | 132 | 132 | 113 | 143 | 111 | 82 | 2 |
| (12,11) | 139 | 126 | 110 | 105 | 148 | 128 | 121 | 137 | 141 | 112 | 135 | 143 | 102 | 145 | 153 | 153 | 132 | 141 | 137 | 143 | 118 | 128 | 116 | 89 | 78 | 2 |
| (13,11) | 126 | 110 | 105 | 89 | 122 | 123 | 131 | 148 | 133 | 111 | 137 | 128 | 108 | 139 | 145 | 153 | 143 | 132 | 113 | 116 | 111 | 112 | 109 | 94 | 83 | 2 |
| (14,11) | 110 | 105 | 89 | 81 | 116 | 113 | 128 | 122 | 128 | 123 | 148 | 141 | 117 | 126 | 139 | 145 | 116 | 118 | 113 | 109 | 89 | 82 | 97 | 75 | 93 | 2 |
| (15,11) | 105 | 89 | 89 | 89 | 113 | 107 | 109 | 116 | 123 | 121 | 122 | 133 | 112 | 110 | 126 | 139 | 109 | 111 | 128 | 97 | 94 | 78 | 93 | 75 | 95 | 2 |
| (16,11) | 89 | 81 | 89 | 65 | 113 | 106 | 98 | 113 | 113 | 131 | 116 | 128 | 111 | 105 | 110 | 126 | 97 | 89 | 112 | 93 | 75 | 83 | 76 | 84 | 101 | 2 |
| (17,11) | 81 | 89 | 65 | 67 | 80 | 100 | 95 | 113 | 107 | 128 | 113 | 123 | 123 | 89 | 105 | 110 | 93 | 94 | 82 | 76 | 75 | 93 | 69 | 85 | 100 | 2 |

*FIG. 20B*

| TDE Loc Ref | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 | KF Ct |
|---|---|---|---|---|---|---|---|---|---|---|---|---|---|---|---|---|---|---|---|---|---|---|---|---|---|---|
| (11,12) | 135 | 137 | 148 | 122 | 141 | 111 | 109 | 128 | 117 | 104 | 143 | 102 | 90 | 128 | 145 | 140 | 153 | 157 | 156 | 145 | 132 | 132 | 139 | 116 | 89 | 2 1 |
| (12,12) | 137 | 148 | 122 | 116 | 133 | 123 | 108 | 141 | 112 | 102 | 128 | 108 | 81 | 135 | 128 | 145 | 145 | 124 | 133 | 139 | 143 | 118 | 126 | 109 | 94 | 2 1 |
| (13,12) | 148 | 122 | 116 | 113 | 128 | 121 | 99 | 133 | 111 | 113 | 141 | 117 | 99 | 137 | 135 | 128 | 139 | 132 | 141 | 126 | 116 | 111 | 110 | 97 | 75 | 2 1 |
| (14,12) | 122 | 116 | 113 | 113 | 123 | 131 | 110 | 128 | 123 | 109 | 133 | 112 | 104 | 148 | 137 | 135 | 126 | 143 | 132 | 110 | 109 | 89 | 105 | 93 | 75 | 2 1 |
| (15,12) | 116 | 113 | 113 | 80 | 113 | 128 | 99 | 123 | 121 | 108 | 128 | 111 | 102 | 122 | 148 | 137 | 110 | 116 | 118 | 105 | 97 | 94 | 89 | 76 | 84 | 2 1 |
| (16,12) | 113 | 113 | 80 | 66 | 107 | 109 | 94 | 113 | 131 | 99 | 123 | 123 | 113 | 116 | 122 | 148 | 105 | 109 | 111 | 89 | 93 | 75 | 89 | 69 | 85 | 2 1 |
| (17,12) | 113 | 80 | 66 | 69 | 106 | 98 | 110 | 107 | 128 | 110 | 113 | 121 | 109 | 113 | 116 | 122 | 89 | 97 | 89 | 81 | 76 | 75 | 81 | 73 | 95 | 2 1 |
| (11,13) | 128 | 141 | 133 | 128 | 112 | 113 | 109 | 117 | 104 | 74 | 108 | 81 | 84 | 143 | 134 | 125 | 128 | 153 | 160 | 135 | 145 | 132 | 137 | 126 | 109 | 2 1 |
| (12,13) | 141 | 133 | 128 | 123 | 111 | 109 | 105 | 112 | 102 | 85 | 117 | 99 | 69 | 128 | 143 | 134 | 135 | 153 | 157 | 137 | 139 | 143 | 148 | 110 | 97 | 2 1 |
| (13,13) | 133 | 128 | 123 | 113 | 123 | 108 | 103 | 111 | 113 | 81 | 112 | 104 | 75 | 141 | 128 | 143 | 137 | 145 | 153 | 133 | 148 | 126 | 122 | 105 | 93 | 2 1 |
| (14,13) | 128 | 123 | 113 | 107 | 121 | 99 | 115 | 123 | 109 | 109 | 111 | 102 | 74 | 133 | 141 | 128 | 148 | 139 | 145 | 128 | 126 | 116 | 116 | 89 | 76 | 2 1 |
| (15,13) | 123 | 113 | 107 | 106 | 131 | 110 | 120 | 121 | 108 | 105 | 123 | 113 | 85 | 128 | 133 | 141 | 122 | 126 | 139 | 123 | 110 | 109 | 113 | 81 | 69 | 2 1 |
| (16,13) | 113 | 107 | 106 | 100 | 128 | 99 | 111 | 131 | 99 | 103 | 121 | 109 | 81 | 123 | 128 | 133 | 116 | 110 | 116 | 113 | 89 | 97 | 113 | 89 | 73 | 2 1 |
| (17,13) | 107 | 106 | 100 | 85 | 109 | 94 | 100 | 128 | 110 | 115 | 131 | 108 | 109 | 113 | 123 | 128 | 113 | 105 | 109 | 107 | 81 | 93 | 80 | 65 | 81 | 2 1 |
| (11,14) | 117 | 112 | 111 | 123 | 102 | 81 | 104 | 117 | 74 | 72 | 99 | 69 | 80 | 108 | 102 | 78 | 143 | 145 | 159 | 128 | 135 | 145 | 141 | 148 | 110 | 2 1 |
| (12,14) | 112 | 111 | 123 | 121 | 113 | 109 | 88 | 112 | 85 | 73 | 104 | 75 | 69 | 117 | 108 | 102 | 128 | 128 | 153 | 141 | 137 | 139 | 133 | 122 | 105 | 2 1 |
| (13,14) | 111 | 123 | 121 | 131 | 109 | 105 | 106 | 111 | 81 | 60 | 102 | 74 | 63 | 112 | 117 | 108 | 141 | 135 | 153 | 133 | 148 | 126 | 128 | 116 | 89 | 2 1 |
| (14,14) | 123 | 121 | 131 | 128 | 108 | 103 | 109 | 123 | 109 | 104 | 113 | 85 | 72 | 111 | 112 | 117 | 133 | 137 | 145 | 128 | 122 | 110 | 123 | 113 | 81 | 2 1 |
| (15,14) | 121 | 131 | 128 | 109 | 99 | 115 | 114 | 121 | 105 | 88 | 109 | 81 | 73 | 123 | 111 | 112 | 128 | 148 | 139 | 123 | 116 | 105 | 113 | 113 | 89 | 2 1 |
| (16,14) | 131 | 128 | 109 | 98 | 110 | 120 | 100 | 131 | 103 | 106 | 108 | 109 | 81 | 121 | 123 | 111 | 123 | 122 | 126 | 113 | 113 | 89 | 107 | 80 | 65 | 2 1 |
| (17,14) | 128 | 109 | 98 | 95 | 99 | 111 | 103 | 128 | 115 | 109 | 99 | 105 | 104 | 131 | 121 | 123 | 113 | 116 | 110 | 107 | 113 | 81 | 106 | 66 | 67 | 2 1 |
| (11,15) | 104 | 102 | 113 | 109 | 85 | 81 | 59 | 74 | 72 | 43 | 75 | 69 | 112 | 99 | 81 | 90 | 108 | 134 | 140 | 117 | 128 | 135 | 112 | 133 | 122 | 2 1 |
| (12,15) | 102 | 113 | 109 | 108 | 81 | 104 | 71 | 85 | 73 | 60 | 74 | 63 | 45 | 104 | 99 | 81 | 117 | 143 | 145 | 112 | 141 | 137 | 111 | 128 | 116 | 2 1 |
| (13,15) | 113 | 109 | 108 | 99 | 109 | 88 | 74 | 81 | 81 | 57 | 85 | 72 | 53 | 102 | 104 | 99 | 112 | 128 | 133 | 111 | 133 | 148 | 123 | 123 | 113 | 2 1 |
| (14,15) | 109 | 108 | 99 | 110 | 105 | 106 | 95 | 109 | 104 | 59 | 81 | 73 | 43 | 113 | 102 | 104 | 111 | 141 | 135 | 123 | 128 | 122 | 121 | 113 | 113 | 2 1 |
| (15,15) | 108 | 99 | 110 | 99 | 103 | 109 | 102 | 105 | 88 | 71 | 109 | 81 | 60 | 109 | 113 | 102 | 123 | 133 | 137 | 121 | 123 | 116 | 131 | 107 | 80 | 2 1 |
| (16,15) | 99 | 110 | 99 | 94 | 115 | 114 | 91 | 103 | 106 | 74 | 105 | 104 | 57 | 108 | 109 | 113 | 121 | 128 | 148 | 131 | 113 | 113 | 128 | 106 | 66 | 2 1 |
| (17,15) | 110 | 99 | 94 | 110 | 120 | 100 | 103 | 115 | 109 | 95 | 103 | 88 | 59 | 99 | 108 | 109 | 131 | 123 | 122 | 128 | 107 | 113 | 109 | 100 | 69 | 2 1 |

*FIG. 20C*

| TDE Loc Ref | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 | KF | Cl |
|---|---|---|---|---|---|---|---|---|---|---|---|---|---|---|---|---|---|---|---|---|---|---|---|---|---|---|---|
| (11,16) | 74 | 85 | 81 | 109 | 73 | 57 | 47 | 72 | 43 | 58 | 63 | 45 | 136 | 75 | 69 | 84 | 99 | 102 | 125 | 104 | 117 | 128 | 102 | 111 | 128 | 2 | 1 |
| (12,16) | 85 | 81 | 109 | 105 | 81 | 59 | 56 | 73 | 60 | 38 | 72 | 53 | 87 | 74 | 75 | 69 | 104 | 108 | 134 | 102 | 112 | 141 | 113 | 123 | 123 | 2 | 1 |
| (13,16) | 81 | 109 | 105 | 103 | 104 | 71 | 59 | 81 | 57 | 34 | 73 | 43 | 39 | 85 | 74 | 75 | 102 | 117 | 143 | 113 | 111 | 133 | 109 | 121 | 113 | 2 | 1 |
| (14,16) | 109 | 105 | 103 | 115 | 88 | 74 | 72 | 104 | 59 | 47 | 81 | 60 | 58 | 81 | 85 | 74 | 113 | 112 | 128 | 109 | 123 | 128 | 108 | 131 | 107 | 2 | 1 |
| (15,16) | 105 | 103 | 115 | 120 | 106 | 95 | 71 | 88 | 71 | 56 | 104 | 57 | 38 | 109 | 81 | 85 | 109 | 111 | 141 | 108 | 121 | 123 | 99 | 128 | 106 | 2 | 1 |
| (16,16) | 103 | 115 | 120 | 111 | 109 | 102 | 102 | 106 | 74 | 59 | 88 | 59 | 34 | 105 | 109 | 81 | 108 | 123 | 133 | 99 | 131 | 113 | 110 | 109 | 100 | 2 | 1 |
| (11,17) | 115 | 120 | 111 | 100 | 114 | 91 | 92 | 109 | 95 | 72 | 106 | 71 | 47 | 103 | 105 | 109 | 99 | 121 | 128 | 110 | 128 | 107 | 99 | 98 | 85 | 2 | 1 |
| (12,17) | 72 | 73 | 81 | 104 | 60 | 34 | 24 | 43 | 58 | 52 | 53 | 87 | 121 | 63 | 69 | 80 | 75 | 81 | 78 | 74 | 104 | 117 | 85 | 113 | 123 | 2 | 1 |
| (13,17) | 73 | 81 | 104 | 88 | 57 | 47 | 46 | 60 | 38 | 44 | 43 | 39 | 52 | 72 | 63 | 69 | 74 | 99 | 102 | 85 | 102 | 112 | 81 | 109 | 121 | 2 | 1 |
| (14,17) | 81 | 104 | 88 | 106 | 59 | 56 | 45 | 57 | 34 | 42 | 60 | 58 | 33 | 73 | 72 | 63 | 85 | 104 | 108 | 81 | 113 | 111 | 109 | 108 | 131 | 2 | 1 |
| (15,17) | 88 | 106 | 109 | 71 | 59 | 59 | 71 | 47 | 24 | 57 | 38 | 52 | 81 | 73 | 72 | 81 | 102 | 117 | 109 | 123 | 105 | 99 | 128 | 2 | 1 |
| (16,17) | 106 | 109 | 114 | 74 | 72 | 73 | 71 | 56 | 46 | 59 | 34 | 44 | 104 | 81 | 73 | 109 | 113 | 112 | 105 | 108 | 121 | 103 | 115 | 99 | 110 | 2 | 1 |
| (17,17) | 109 | 114 | 100 | 103 | 102 | 102 | 62 | 95 | 72 | 59 | 74 | 56 | 24 | 106 | 88 | 104 | 103 | 108 | 123 | 115 | 110 | 128 | 120 | 94 | 95 | 2 | 1 |

*FIG. 20D*

| Radial Number | TDE Reference Location | Value | Position from TDE (1 is closest, 3 is farthest) | Data Element Reference Location | Value | Data Element Value of First-nearest Difference | Radial Distribution (1=16, 2=8, 3=4) |
|---|---|---|---|---|---|---|---|
| 1 | (4, 4) | 159 | 1 | (5, 4) | 164 | 164 | 16 |
|   |        |     | 2 | (6, 4) | 162 |     |    |
|   |        |     | 3 | (7, 4) | 153 |     |    |
| 2 | (4, 4) | 159 | 1 | (5, 5) | 155 | 155 | 16 |
|   |        |     | 2 | (6, 6) | 163 |     |    |
|   |        |     | 3 | (7, 7) | 148 |     |    |
| 3 | (4, 4) | 159 | 1 | (4, 5) | 176 | 176 | 16 |
|   |        |     | 2 | (4, 6) | 152 |     |    |
|   |        |     | 3 | (4, 7) | 171 |     |    |
| 4 | (4, 4) | 159 | 1 | (3, 5) | 206 | 206 | 16 |
|   |        |     | 2 | (2, 6) | 254 |     |    |
|   |        |     | 3 | (1, 7) | 254 |     |    |
| 5 | (4, 4) | 159 | 1 | (3, 4) | 174 | 174 | 16 |
|   |        |     | 2 | (2, 4) | 252 |     |    |
|   |        |     | 3 | (1, 4) | 254 |     |    |
| 6 | (4, 4) | 159 | 1 | (3, 3) | 167 | 167 | 16 |
|   |        |     | 2 | (2, 2) | 212 |     |    |
|   |        |     | 3 | (1, 1) | 250 |     |    |
| 7 | (4, 4) | 159 | 1 | (4, 3) | 145 | 145 | 16 |
|   |        |     | 2 | (4, 2) | 152 |     |    |
|   |        |     | 3 | (4, 1) | 144 |     |    |
| 8 | (4, 4) | 159 | 1 | (5, 3) | 145 | 145 | 16 |
|   |        |     | 2 | (6, 2) | 132 |     |    |
|   |        |     | 3 | (7, 1) | 117 |     |    |

*FIG. 21*

| Radial Number | TDE Ref Loc | TDE Value | Position from TDE (1 is closest, 3 is farthest) | Data Element Reference Location | Value | Data Element Value of First-nearest Difference | Absolute Difference (between entry value and nearest different) | First Non-zero Deviation |
|---|---|---|---|---|---|---|---|---|
| 1 | (4, 4) | 159 | 1 | (5, 4) | 164 | 164 | \|164-159\| | 5 |
|   |        |     | 2 | (6, 4) | 162 |     |            |   |
|   |        |     | 3 | (7, 4) | 153 |     |            |   |
| 2 | (4, 4) | 159 | 1 | (5, 5) | 155 | 155 | \|155-159\| | 4 |
|   |        |     | 2 | (6, 6) | 163 |     |            |   |
|   |        |     | 3 | (7, 7) | 148 |     |            |   |
| 3 | (4, 4) | 159 | 1 | (4, 5) | 176 | 176 | \|176-159\| | 17 |
|   |        |     | 2 | (4, 6) | 152 |     |            |   |
|   |        |     | 3 | (4, 7) | 171 |     |            |   |
| 4 | (4, 4) | 159 | 1 | (3, 5) | 206 | 206 | \|206-159\| | 47 |
|   |        |     | 2 | (2, 6) | 254 |     |            |   |
|   |        |     | 3 | (1, 7) | 254 |     |            |   |
| 5 | (4, 4) | 159 | 1 | (3, 4) | 174 | 174 | \|174-159\| | 15 |
|   |        |     | 2 | (2, 4) | 252 |     |            |   |
|   |        |     | 3 | (1, 4) | 254 |     |            |   |
| 6 | (4, 4) | 159 | 1 | (3, 3) | 167 | 167 | \|167-159\| | 8 |
|   |        |     | 2 | (2, 2) | 212 |     |            |   |
|   |        |     | 3 | (1, 1) | 250 |     |            |   |
| 7 | (4, 4) | 159 | 1 | (4, 3) | 145 | 145 | \|145-159\| | 14 |
|   |        |     | 2 | (4, 2) | 152 |     |            |   |
|   |        |     | 3 | (4, 1) | 144 |     |            |   |
| 8 | (4, 4) | 159 | 1 | (5, 3) | 145 | 145 | \|145-159\| | 14 |
|   |        |     | 2 | (6, 2) | 132 |     |            |   |
|   |        |     | 3 | (7, 1) | 117 |     |            |   |

*FIG. 22*

| TDE Loc Ref | ALG 1 | Ct | ALG 2 | Ct | KF | TDE Loc Ref | ALG 1 | Ct | ALG 2 | Ct | KF | TDE Loc Ref | ALG 1 | Ct | ALG 2 | Ct | KF |
|---|---|---|---|---|---|---|---|---|---|---|---|---|---|---|---|---|---|
| (4,4) | 128 | 1 | 124 | 1 | 1 | (9,8) | 128 | 1 | 93 | 1 | 1 | (14,13) | 128 | 1 | 77 | 1 | 2 |
| (5,4) | 128 | 1 | 81 | 1 | 1 | (10,8) | 120 | 1 | 151 | 1 | 1 | (15,13) | 120 | 1 | 53 | 1 | 2 |
| (6,4) | 128 | 1 | 79 | 1 | 1 | (4,9) | 128 | 1 | 203 | 1 | 1 | (16,13) | 112 | 1 | 108 | 1 | 2 |
| (7,4) | 128 | 1 | 43 | 1 | 1 | (5,9) | 128 | 1 | 128 | 1 | 1 | (17,13) | 128 | 1 | 93 | 1 | 2 |
| (8,4) | 128 | 1 | 103 | 1 | 1 | (6,9) | 128 | 1 | 96 | 1 | 1 | (11,14) | 128 | 1 | 121 | 1 | 2 |
| (9,4) | 128 | 1 | 139 | 1 | 1 | (7,9) | 128 | 1 | 73 | 1 | 1 | (12,14) | 128 | 1 | 91 | 1 | 2 |
| (10,4) | 128 | 1 | 85 | 1 | 1 | (8,9) | 128 | 1 | 72 | 1 | 1 | (13,14) | 128 | 1 | 95 | 1 | 2 |
| (4,5) | 128 | 1 | 208 | 1 | 1 | (9,9) | 128 | 1 | 128 | 1 | 1 | (14,14) | 120 | 1 | 78 | 1 | 2 |
| (5,5) | 128 | 1 | 75 | 1 | 1 | (10,9) | 128 | 1 | 119 | 1 | 1 | (15,14) | 128 | 1 | 76 | 1 | 2 |
| (6,5) | 128 | 1 | 61 | 1 | 1 | (4,10) | 128 | 1 | 228 | 1 | 1 | (16,14) | 128 | 1 | 139 | 1 | 2 |
| (7,5) | 128 | 1 | 59 | 1 | 1 | (5,10) | 128 | 1 | 154 | 1 | 1 | (17,14) | 128 | 1 | 156 | 1 | 2 |
| (8,5) | 128 | 1 | 104 | 1 | 1 | (6,10) | 128 | 1 | 106 | 1 | 1 | (11,15) | 128 | 1 | 110 | 1 | 2 |
| (9,5) | 128 | 1 | 203 | 1 | 1 | (7,10) | 128 | 1 | 84 | 1 | 1 | (12,15) | 128 | 1 | 113 | 1 | 2 |
| (10,5) | 128 | 1 | 123 | 1 | 1 | (8,10) | 128 | 1 | 70 | 1 | 1 | (13,15) | 128 | 1 | 92 | 1 | 2 |
| (4,6) | 128 | 1 | 309 | 1 | 1 | (9,10) | 128 | 1 | 87 | 1 | 1 | (14,15) | 120 | 1 | 70 | 1 | 2 |
| (5,6) | 128 | 1 | 202 | 1 | 1 | (10,10) | 128 | 1 | 154 | 1 | 1 | (15,15) | 128 | 1 | 70 | 1 | 2 |
| (6,6) | 128 | 1 | 74 | 1 | 1 | (11,11) | 128 | 1 | 85 | 1 | 2 | (16,15) | 128 | 1 | 129 | 1 | 2 |
| (7,6) | 128 | 1 | 109 | 1 | 1 | (12,11) | 128 | 1 | 68 | 1 | 2 | (17,15) | 128 | 1 | 84 | 1 | 2 |
| (8,6) | 128 | 1 | 192 | 1 | 1 | (13,11) | 128 | 1 | 110 | 1 | 2 | (11,16) | 128 | 1 | 109 | 1 | 2 |
| (9,6) | 128 | 1 | 146 | 1 | 1 | (14,11) | 128 | 1 | 97 | 1 | 2 | (12,16) | 128 | 1 | 108 | 1 | 2 |
| (10,6) | 128 | 1 | 102 | 1 | 1 | (15,11) | 128 | 1 | 81 | 1 | 2 | (13,16) | 120 | 1 | 168 | 1 | 2 |
| (4,7) | 128 | 1 | 347 | 1 | 1 | (16,11) | 128 | 1 | 124 | 1 | 2 | (14,16) | 120 | 1 | 105 | 1 | 2 |
| (5,7) | 128 | 1 | 141 | 1 | 1 | (17,11) | 128 | 1 | 110 | 1 | 2 | (15,16) | 128 | 1 | 38 | 1 | 2 |
| (6,7) | 128 | 1 | 102 | 1 | 1 | (11,12) | 128 | 1 | 62 | 1 | 2 | (16,16) | 128 | 1 | 54 | 1 | 2 |
| (7,7) | 128 | 1 | 121 | 1 | 1 | (12,12) | 128 | 1 | 51 | 1 | 2 | (17,16) | 128 | 1 | 70 | 1 | 2 |
| (8,7) | 128 | 1 | 114 | 1 | 1 | (13,12) | 128 | 1 | 148 | 1 | 2 | (11,17) | 128 | 1 | 88 | 1 | 2 |
| (9,7) | 128 | 1 | 162 | 1 | 1 | (14,12) | 128 | 1 | 83 | 1 | 2 | (12,17) | 128 | 1 | 89 | 1 | 2 |
| (10,7) | 128 | 1 | 149 | 1 | 1 | (15,12) | 128 | 1 | 75 | 1 | 2 | (13,17) | 120 | 1 | 162 | 1 | 2 |
| (4,8) | 128 | 1 | 248 | 1 | 1 | (16,12) | 112 | 1 | 134 | 1 | 2 | (14,17) | 128 | 1 | 193 | 1 | 2 |
| (5,8) | 128 | 1 | 151 | 1 | 1 | (17,12) | 112 | 1 | 137 | 1 | 2 | (15,17) | 128 | 1 | 147 | 1 | 2 |
| (6,8) | 128 | 1 | 106 | 1 | 1 | (11,13) | 120 | 1 | 116 | 1 | 2 | (16,17) | 128 | 1 | 112 | 1 | 2 |
| (7,8) | 128 | 1 | 81 | 1 | 1 | (12,13) | 128 | 1 | 121 | 1 | 2 | (17,17) | 128 | 1 | 87 | 1 | 2 |
| (8,8) | 128 | 1 | 98 | 1 | 1 | (13,13) | 128 | 1 | 96 | 1 | 2 | | | | | | |

*FIG. 23*

| TDE Loc Ref | ALG 3 | Ct | ALG 4 | Ct | KF | TDE Loc Ref | ALG 3 | Ct | ALG 4 | Ct | KF | TDE Loc Ref | ALG 3 | Ct | ALG 4 | Ct | KF |
|---|---|---|---|---|---|---|---|---|---|---|---|---|---|---|---|---|---|
| (4,4) | 167 | 1 | 0 | 1 | 1 | (9,8) | 138 | 1 | 0 | 1 | 1 | (14,13) | 99 | 1 | 0 | 1 | 2 |
| (5,4) | 157 | 1 | 0 | 1 | 1 | (10,8) | 130 | 1 | 0 | 1 | 1 | (15,13) | 95 | 1 | 0 | 1 | 2 |
| (6,4) | 153 | 1 | 0 | 1 | 1 | (4,9) | 214 | 1 | 0 | 1 | 1 | (16,13) | 89 | 1 | 0 | 1 | 2 |
| (7,4) | 153 | 1 | 0 | 1 | 1 | (5,9) | 189 | 1 | 0 | 1 | 1 | (17,13) | 85 | 1 | 0 | 1 | 2 |
| (8,4) | 143 | 1 | 0 | 1 | 1 | (6,9) | 172 | 1 | 0 | 1 | 1 | (11,14) | 96 | 1 | 0 | 1 | 2 |
| (9,4) | 133 | 1 | 0 | 1 | 1 | (7,9) | 162 | 1 | 0 | 1 | 1 | (12,14) | 94 | 1 | 0 | 1 | 2 |
| (10,4) | 122 | 1 | 0 | 1 | 1 | (8,9) | 152 | 1 | 0 | 1 | 1 | (13,14) | 96 | 1 | 0 | 1 | 2 |
| (4,5) | 174 | 1 | 0 | 1 | 1 | (9,9) | 142 | 1 | 0 | 1 | 1 | (14,14) | 97 | 1 | 0 | 1 | 2 |
| (5,5) | 159 | 1 | 0 | 1 | 1 | (10,9) | 130 | 1 | 0 | 1 | 1 | (15,14) | 96 | 1 | 0 | 1 | 2 |
| (6,5) | 158 | 1 | 0 | 1 | 1 | (4,10) | 208 | 1 | 0 | 1 | 1 | (16,14) | 93 | 1 | 0 | 1 | 2 |
| (7,5) | 161 | 1 | 0 | 1 | 1 | (5,10) | 182 | 1 | 0 | 1 | 1 | (17,14) | 91 | 1 | 0 | 1 | 2 |
| (8,5) | 150 | 1 | 0 | 1 | 1 | (6,10) | 164 | 1 | 0 | 1 | 1 | (11,15) | 88 | 1 | 0 | 1 | 2 |
| (9,5) | 139 | 1 | 0 | 1 | 1 | (7,10) | 159 | 1 | 0 | 1 | 1 | (12,15) | 93 | 1 | 0 | 1 | 2 |
| (10,5) | 119 | 1 | 0 | 1 | 1 | (8,10) | 153 | 1 | 0 | 1 | 1 | (13,15) | 92 | 1 | 0 | 1 | 2 |
| (4,6) | 187 | 1 | 0 | 1 | 1 | (9,10) | 147 | 1 | 0 | 1 | 1 | (14,15) | 95 | 1 | 0 | 1 | 2 |
| (5,6) | 163 | 1 | 0 | 1 | 1 | (10,10) | 143 | 1 | 0 | 1 | 1 | (15,15) | 92 | 1 | 0 | 1 | 2 |
| (6,6) | 157 | 1 | 0 | 1 | 1 | (11,11) | 136 | 1 | 0 | 1 | 2 | (16,15) | 95 | 1 | 0 | 1 | 2 |
| (7,6) | 158 | 1 | 0 | 1 | 1 | (12,11) | 135 | 1 | 0 | 1 | 2 | (17,15) | 91 | 1 | 0 | 1 | 2 |
| (8,6) | 144 | 1 | 0 | 1 | 1 | (13,11) | 128 | 1 | 0 | 1 | 2 | (11,16) | 70 | 1 | 0 | 1 | 2 |
| (9,6) | 135 | 1 | 0 | 1 | 1 | (14,11) | 117 | 1 | 0 | 1 | 2 | (12,16) | 76 | 1 | 0 | 1 | 2 |
| (10,6) | 118 | 1 | 0 | 1 | 1 | (15,11) | 106 | 1 | 0 | 1 | 2 | (13,16) | 75 | 1 | 0 | 1 | 2 |
| (4,7) | 199 | 1 | 0 | 1 | 1 | (16,11) | 99 | 1 | 0 | 1 | 2 | (14,16) | 82 | 1 | 0 | 1 | 2 |
| (5,7) | 171 | 1 | 0 | 1 | 1 | (17,11) | 90 | 1 | 0 | 1 | 2 | (15,16) | 81 | 1 | 0 | 1 | 2 |
| (6,7) | 164 | 1 | 0 | 1 | 1 | (11,12) | 139 | 1 | 0 | 1 | 2 | (16,16) | 87 | 1 | 0 | 1 | 2 |
| (7,7) | 163 | 1 | 0 | 1 | 1 | (12,12) | 137 | 1 | 0 | 1 | 2 | (17,16) | 88 | 1 | 0 | 1 | 2 |
| (8,7) | 149 | 1 | 0 | 1 | 1 | (13,12) | 130 | 1 | 0 | 1 | 2 | (11,17) | 73 | 1 | 0 | 1 | 2 |
| (9,7) | 139 | 1 | 0 | 1 | 1 | (14,12) | 124 | 1 | 0 | 1 | 2 | (12,17) | 64 | 1 | 0 | 1 | 2 |
| (10,7) | 120 | 1 | 0 | 1 | 1 | (15,12) | 113 | 1 | 0 | 1 | 2 | (13,17) | 70 | 1 | 0 | 1 | 2 |
| (4,8) | 210 | 1 | 0 | 1 | 1 | (16,12) | 106 | 1 | 0 | 1 | 2 | (14,17) | 67 | 1 | 0 | 1 | 2 |
| (5,8) | 183 | 1 | 0 | 1 | 1 | (17,12) | 97 | 1 | 0 | 1 | 2 | (15,17) | 72 | 1 | 0 | 1 | 2 |
| (6,8) | 170 | 1 | 0 | 1 | 1 | (11,13) | 128 | 1 | 0 | 1 | 2 | (16,17) | 74 | 1 | 0 | 1 | 2 |
| (7,8) | 161 | 1 | 0 | 1 | 1 | (12,13) | 128 | 1 | 0 | 1 | 2 | (17,17) | 76 | 1 | 0 | 1 | 2 |
| (8,8) | 147 | 1 | 0 | 1 | 1 | (13,13) | 128 | 1 | 0 | 1 | 2 | | | | | | |

*FIG. 24*

| TDE Loc Ref | ALG 5 | Ct | ALG 6 | Ct | ALG 3 | Ct | KF | TDE Loc Ref | ALG 5 | Ct | ALG 6 | Ct | ALG 3 | Ct | KF |
|---|---|---|---|---|---|---|---|---|---|---|---|---|---|---|---|
| (4,4) | 10 | 1 | 31 | 1 | 165 | 1 | 1 | (9,8) | 11 | 1 | 33 | 1 | 128 | 1 | 1 |
| (5,4) | 5 | 1 | 17 | 1 | 155 | 1 | 1 | (10,8) | 10 | 1 | 28 | 1 | 133 | 1 | 1 |
| (6,4) | 5 | 1 | 12 | 1 | 158 | 1 | 1 | (4,9) | 17 | 1 | 57 | 1 | 213 | 1 | 1 |
| (7,4) | 8 | 1 | 25 | 1 | 152 | 1 | 1 | (5,9) | 14 | 1 | 42 | 1 | 189 | 1 | 1 |
| (8,4) | 4 | 1 | 13 | 1 | 150 | 1 | 1 | (6,9) | 8 | 1 | 25 | 1 | 174 | 1 | 1 |
| (9,4) | 15 | 1 | 41 | 1 | 133 | 1 | 1 | (7,9) | 8 | 1 | 23 | 1 | 162 | 1 | 1 |
| (10,4) | 10 | 1 | 34 | 1 | 123 | 1 | 1 | (8,9) | 12 | 1 | 32 | 1 | 151 | 1 | 1 |
| (4,5) | 19 | 1 | 54 | 1 | 168 | 1 | 1 | (9,9) | 9 | 1 | 20 | 1 | 148 | 1 | 1 |
| (5,5) | 11 | 1 | 38 | 1 | 160 | 1 | 1 | (10,9) | 7 | 1 | 20 | 1 | 126 | 1 | 1 |
| (6,5) | 4 | 1 | 9 | 1 | 159 | 1 | 1 | (4,10) | 24 | 1 | 71 | 1 | 205 | 1 | 1 |
| (7,5) | 6 | 1 | 19 | 1 | 160 | 1 | 1 | (5,10) | 15 | 1 | 39 | 1 | 182 | 1 | 1 |
| (8,5) | 17 | 1 | 52 | 1 | 148 | 1 | 1 | (6,10) | 14 | 1 | 35 | 1 | 162 | 1 | 1 |
| (9,5) | 14 | 1 | 47 | 1 | 136 | 1 | 1 | (7,10) | 8 | 1 | 25 | 1 | 159 | 1 | 1 |
| (10,5) | 6 | 1 | 18 | 1 | 116 | 1 | 1 | (8,10) | 2 | 1 | 5 | 1 | 157 | 1 | 1 |
| (4,6) | 29 | 1 | 102 | 1 | 181 | 1 | 1 | (9,10) | 14 | 1 | 36 | 1 | 143 | 1 | 1 |
| (5,6) | 4 | 1 | 11 | 1 | 158 | 1 | 1 | (10,10) | 9 | 1 | 25 | 1 | 146 | 1 | 1 |
| (6,6) | 11 | 1 | 34 | 1 | 160 | 1 | 1 | (11,11) | 7 | 1 | 21 | 1 | 140 | 1 | 2 |
| (7,6) | 7 | 1 | 19 | 1 | 158 | 1 | 1 | (12,11) | 6 | 1 | 19 | 1 | 138 | 1 | 2 |
| (8,6) | 10 | 1 | 35 | 1 | 154 | 1 | 1 | (13,11) | 15 | 1 | 38 | 1 | 128 | 1 | 2 |
| (9,6) | 18 | 1 | 52 | 1 | 132 | 1 | 1 | (14,11) | 9 | 1 | 21 | 1 | 116 | 1 | 2 |
| (10,6) | 18 | 1 | 44 | 1 | 120 | 1 | 1 | (15,11) | 10 | 1 | 27 | 1 | 103 | 1 | 2 |
| (4,7) | 36 | 1 | 98 | 1 | 193 | 1 | 1 | (16,11) | 11 | 1 | 32 | 1 | 98 | 1 | 2 |
| (5,7) | 15 | 1 | 54 | 1 | 167 | 1 | 1 | (17,11) | 11 | 1 | 37 | 1 | 92 | 1 | 2 |
| (6,7) | 7 | 1 | 26 | 1 | 162 | 1 | 1 | (11,12) | 7 | 1 | 17 | 1 | 135 | 1 | 2 |
| (7,7) | 7 | 1 | 20 | 1 | 163 | 1 | 1 | (12,12) | 4 | 1 | 13 | 1 | 141 | 1 | 2 |
| (8,7) | 12 | 1 | 46 | 1 | 146 | 1 | 1 | (13,12) | 6 | 1 | 15 | 1 | 130 | 1 | 2 |
| (9,7) | 5 | 1 | 15 | 1 | 141 | 1 | 1 | (14,12) | 13 | 1 | 38 | 1 | 126 | 1 | 2 |
| (10,7) | 4 | 1 | 11 | 1 | 120 | 1 | 1 | (15,12) | 7 | 1 | 18 | 1 | 116 | 1 | 2 |
| (4,8) | 26 | 1 | 79 | 1 | 207 | 1 | 1 | (16,12) | 9 | 1 | 27 | 1 | 108 | 1 | 2 |
| (5,8) | 16 | 1 | 47 | 1 | 183 | 1 | 1 | (17,12) | 15 | 1 | 33 | 1 | 95 | 1 | 2 |
| (6,8) | 11 | 1 | 32 | 1 | 174 | 1 | 1 | (11,13) | 9 | 1 | 26 | 1 | 134 | 1 | 2 |
| (7,8) | 11 | 1 | 28 | 1 | 158 | 1 | 1 | (12,13) | 8 | 1 | 25 | 1 | 128 | 1 | 2 |
| (8,8) | 7 | 1 | 23 | 1 | 151 | 1 | 1 | (13,13) | 13 | 1 | 37 | 1 | 132 | 1 | 2 |

*FIG. 25A*

| TDE Loc Ref | ALG 5 | Ct | ALG 6 | Ct | ALG 3 | Ct | KF |
|---|---|---|---|---|---|---|---|
| (14,13) | 4 | 1 | 11 | 1 | 125 | 1 | 2 |
| (15,13) | 5 | 1 | 15 | 1 | 120 | 1 | 2 |
| (16,13) | 9 | 1 | 24 | 1 | 119 | 1 | 2 |
| (17,13) | 7 | 1 | 22 | 1 | 115 | 1 | 2 |
| (11,14) | 6 | 1 | 20 | 1 | 116 | 1 | 2 |
| (12,14) | 10 | 1 | 30 | 1 | 120 | 1 | 2 |
| (13,14) | 8 | 1 | 22 | 1 | 120 | 1 | 2 |
| (14,14) | 5 | 1 | 17 | 1 | 121 | 1 | 2 |
| (15,14) | 3 | 1 | 10 | 1 | 125 | 1 | 2 |
| (16,14) | 6 | 1 | 18 | 1 | 123 | 1 | 2 |
| (17,14) | 11 | 1 | 24 | 1 | 119 | 1 | 2 |
| (11,15) | 12 | 1 | 43 | 1 | 98 | 1 | 2 |
| (12,15) | 9 | 1 | 28 | 1 | 104 | 1 | 2 |
| (13,15) | 10 | 1 | 30 | 1 | 101 | 1 | 2 |
| (14,15) | 5 | 1 | 15 | 1 | 113 | 1 | 2 |
| (15,15) | 7 | 1 | 22 | 1 | 109 | 1 | 2 |
| (16,15) | 9 | 1 | 28 | 1 | 113 | 1 | 2 |
| (17,15) | 11 | 1 | 29 | 1 | 110 | 1 | 2 |
| (11,16) | 11 | 1 | 32 | 1 | 84 | 1 | 2 |
| (12,16) | 10 | 1 | 29 | 1 | 83 | 1 | 2 |
| (13,16) | 14 | 1 | 32 | 1 | 97 | 1 | 2 |
| (14,16) | 9 | 1 | 28 | 1 | 100 | 1 | 2 |
| (15,16) | 7 | 1 | 21 | 1 | 102 | 1 | 2 |
| (16,16) | 4 | 1 | 16 | 1 | 106 | 1 | 2 |
| (17,16) | 5 | 1 | 17 | 1 | 111 | 1 | 2 |
| (11,17) | 10 | 1 | 31 | 1 | 63 | 1 | 2 |
| (12,17) | 9 | 1 | 25 | 1 | 75 | 1 | 2 |
| (13,17) | 14 | 1 | 47 | 1 | 79 | 1 | 2 |
| (14,17) | 14 | 1 | 50 | 1 | 84 | 1 | 2 |
| (15,17) | 13 | 1 | 35 | 1 | 97 | 1 | 2 |
| (16,17) | 13 | 1 | 35 | 1 | 94 | 1 | 2 |
| (17,17) | 7 | 1 | 20 | 1 | 108 | 1 | 2 |

FIG. 25B

|   | 1 | 2 | 3 |
|---|---|---|---|
| 1 | 1 | 3 | 4 |
| 2 | 2 | 4 | 4 |
| 3 | 3 | 3 | 5 |

FIG. 26A

|    | 21 | 22 | 23 |
|----|----|----|----|
| 21 | 1  | 3  | 4  |
| 22 | 2  | 4  | 4  |
| 23 | 3  | 3  | 5  |

FIG. 26B

|   | 4 | 5 | 6 |
|---|---|---|---|
| 4 | 1 | 4 | 2 |
| 5 | 2 | 2 | 5 |
| 6 | 4 | 3 | 3 |

FIG. 27A

|    | 24 | 25 | 26 |
|----|----|----|----|
| 24 | 3  | 3  | 3  |
| 25 | 3  | 3  | 3  |
| 26 | 3  | 3  | 3  |

FIG. 27B

| Data Set | TDE Loc Ref | Val 1 | Val 2 | Val 3 | Val 4 | Val 5 | Val 6 | Val 7 | Val 8 | Val 9 | Val 10 | Val 11 | Val 12 | Val 13 | Val 14 | Val 15 | Val 16 | Val 17 | Val 18 | Val 19 | Val 20 | Val 21 | Val 22 | Val 23 | Val 24 | Val 25 | KF |
|---|---|---|---|---|---|---|---|---|---|---|---|---|---|---|---|---|---|---|---|---|---|---|---|---|---|---|---|
| 1 | V | 159 | 164 | 162 | 153 | 155 | 163 | 148 | 176 | 152 | 171 | 206 | 254 | 254 | 174 | 252 | 254 | 167 | 212 | 250 | 145 | 152 | 144 | 145 | 132 | 117 | 5 |
| 1 | W | 164 | 162 | 153 | 156 | 161 | 172 | 152 | 155 | 138 | 161 | 176 | 240 | 254 | 159 | 174 | 252 | 145 | 168 | 195 | 145 | 144 | 127 | 152 | 137 | 122 | 5 |
| 1 | X | 162 | 153 | 156 | 142 | 154 | 167 | 121 | 161 | 163 | 167 | 155 | 152 | 250 | 164 | 159 | 174 | 145 | 152 | 166 | 152 | 132 | 114 | 137 | 130 | 135 | 5 |
| 1 | Y | 153 | 156 | 142 | 121 | 155 | 137 | 139 | 154 | 172 | 148 | 161 | 138 | 171 | 162 | 164 | 159 | 152 | 144 | 144 | 137 | 137 | 117 | 150 | 128 | 121 | 5 |
| 1 | Z | 156 | 142 | 121 | 117 | 115 | 123 | 124 | 155 | 167 | 152 | 154 | 163 | 161 | 153 | 162 | 164 | 137 | 132 | 127 | 150 | 130 | 122 | 139 | 122 | 128 | 5 |
| 1 | Z | 156 | 142 | 121 | 117 | 115 | 123 | 124 | 155 | 167 | 152 | 154 | 163 | 161 | 153 | 162 | 164 | 137 | 132 | 127 | 150 | 130 | 122 | 139 | 122 | 128 | 6 |
| 1 | A | 142 | 121 | 117 | 124 | 108 | 95 | 115 | 115 | 137 | 121 | 155 | 172 | 167 | 156 | 153 | 162 | 150 | 137 | 114 | 139 | 128 | 135 | 123 | 121 | 130 | 6 |
| 1 | B | 121 | 117 | 124 | 122 | 105 | 78 | 76 | 108 | 123 | 139 | 115 | 167 | 148 | 142 | 156 | 153 | 139 | 130 | 117 | 123 | 122 | 121 | 126 | 115 | 125 | 6 |
| 1 | C | 117 | 124 | 122 | 122 | 119 | 103 | 83 | 105 | 95 | 124 | 108 | 137 | 152 | 121 | 142 | 156 | 123 | 128 | 122 | 126 | 121 | 128 | 117 | 130 | 131 | 6 |
| 1 | D | 124 | 122 | 122 | 117 | 110 | 107 | 98 | 119 | 78 | 115 | 105 | 123 | 121 | 117 | 121 | 142 | 126 | 122 | 135 | 117 | 115 | 130 | 116 | 131 | 134 | 6 |

*FIG. 28*

| Data Set | TDE Loc Ref | Alg A | Alg B | Alg C | Alg D | Alg E | KF |
|---|---|---|---|---|---|---|---|
| 2 | Q | 122 | 117 | 116 | 117 | 120 | 7 |
| 2 | R | 117 | 116 | 117 | 120 | 115 | 7 |
| 2 | S | 116 | 117 | 120 | 122 | 123 | 7 |
| 2 | T | 117 | 120 | 122 | 112 | 122 | 7 |
| 2 | U | 176 | 155 | 161 | 154 | 138 | 7 |
| 3 | E | 176 | 155 | 161 | 154 | 138 | 8 |
| 3 | F | 155 | 161 | 154 | 155 | 163 | 8 |
| 3 | G | 161 | 154 | 155 | 115 | 172 | 8 |
| 3 | H | 154 | 155 | 115 | 108 | 167 | 8 |
| 3 | I | 155 | 115 | 108 | 105 | 137 | 8 |

*FIG. 29*

METHODS AND SYSTEMS FOR CREATION AND USE OF RAW-DATA DATASTORE

PRIORITY CLAIM

This application claims the benefit of U.S. Provisional Application Ser. No. 61/037,998 filed Mar. 19, 2008, contents of which are incorporated herein.

FIELD OF THE INVENTION

The present invention, in various embodiments, relates generally to the fields of data analysis and feature recognition and more particularly to refinement of said systems for the purpose of improving training methods and algorithm design.

BACKGROUND OF THE INVENTION

Data analysis and feature recognition systems, such as described by Brinson, et al., in U.S. patent application 2007/0244844, which is incorporated by reference in its entirety herein, or any user-specified, preset, or automatically determined application or engine engaged for use in the same or a similar manner, afford users the capability and capacity to perform data analysis of, feature recognition within, and/or data transformation of the representative data of a given data set selection(s), regardless of the medium or data type, modality, submodality, etc., in an effort to extract useful or meaningful information from what otherwise may be hollow or enigmatic data, to provide visualization alternatives, and/or to aid in the formulation of hypotheses or conclusions relating to or derived from the original data. The processes used by such a system vary by application use, genre pertinence, user specifications, system requirements, and the like but generally invoke the system to recognize the unique data values and patterns characteristic of a particular target feature(s) of interest (hereafter "known feature(s)") within a given data set and subsequently distinguish these associated data values and patterns upon evaluation of succeeding data sets containing the previously identified known feature(s).

For example, a user desires to identify areas of deforestation in imagery of a South American rain forest. Using evaluation algorithms and a sampling area of data (i.e., any collection of data elements surrounding or associated with one or pluralities of centralized data elements) (hereafter "target data area"), a data analysis and feature recognition system is employed to analyze a selection of data, which is known by the user to contain the known feature of interest "Deforestation," from the original data set. In an alternate embodiment, pluralities of evaluation algorithms and the target data area (TDA) are used to evaluate the original data set in its entirety. Ultimately, the algorithmically ascertained data values and patterns, which are crucial to the definitive recognition of the inherent characteristics of "Deforestation," are then stored, or trained, into a previously established data storage structure, such as an algorithm datastore or any user-specified, preset, or automatically determined storage device (e.g., a data array, database, data output overlay, value cache, datastore) capable of at least temporarily storing data, as the newly identified known feature "Deforestation."

In the aforementioned example, "Deforestation" is uniquely identified from other features in the data set selection by the distinct combinations of calculated algorithm values and patterns obtained from analysis of the original data set selection using the intentionally selected and ordered pluralities of evaluation algorithms and/or the specifically chosen TDA. Accordingly, future attempts to positively identify "Deforestation" within subsequent imagery of the South American rain forest using this previously trained algorithm datastore require the use of the same pluralities of evaluation algorithms and the same TDA as were used to train the algorithm datastore in the first place. This ensures proper comparison and correlation of the uniquely identified data values and patterns, which are associated with "Deforestation" and stored in the algorithm datastore, with the newly procured and analyzed data of subsequent imagery.

Such a data analysis and feature recognition system as described previously is often plagued by system, data, ground truth, and/or algorithm inadequacies that can make successful user interaction with the system problematic. The inherent deficiencies of such a system are examined forthwith.

Assume a user has trained a data analysis and feature recognition system to recognize the data values and patterns of the known feature "Deforestation" using specific pluralities of evaluation algorithms and a given TDA. Afterwards, the user discovers that slightly or even heavily modified pluralities of evaluation algorithms, which can include several additional algorithms not originally included or previously available, are actually better suited for delimiting "Deforestation" in subsequent imagery. If the user processes the subsequent imagery using these modified, yet more pertinent, pluralities of evaluation algorithms with the ultimate intent being the identification of "Deforestation" within the imagery, all historical training becomes inapplicable thus resulting in recognition of few or potentially no data values and patterns associated with "Deforestation." This is because a change in the algorithm set results in the calculation of different data values and patterns so that even when "Deforestation" exists in subsequent imagery, the system is unable to recognize or reveal it. Once more, since all historical training of "Deforestation" is irrelevant when the pluralities of evaluation algorithms are altered, the situation demands that the known feature "Deforestation" either be retrained, which can be time or cost prohibitive, using the original data set and the new pluralities of evaluation algorithms or the subsequent imagery must continue to be evaluated using the original pluralities of evaluation algorithms, which can be inaccurate or flawed.

Similarly, in an alternate instance, the user realizes that the TDA used to evaluate a given data set is ineffective or deficient and chooses to alter the TDA in order to achieve improved analysis results. As described previously, all historical training of the known feature "Deforestation" is lost if the TDA used to evaluate subsequent imagery is different from the TDA used in the assessment of the original data set. This is because a change in the TDA results in the calculation of algorithm values on different data and patterns thereby preventing correlation of the previously trained data with the newly trained data.

A second difficulty, which tends to be prevalent in many data analysis and feature recognition systems on the market today, is a situation most aptly described as "algorithm confusion." Simply, algorithm confusion is the inability of the evaluation algorithms, which operate on a given TDA, to correctly distinguish between different sets of data values and patterns that have been previously trained and stored in a datastore as a different known feature(s). This feature misidentification is compounded when the algorithm datastore is queried to identify the previously trained, unique known feature in a subsequent data set. In such a situation, the evaluation algorithms are unable to definitively distinguish between different known features, which exist within the same data set but possess distinct data values and patterns.

Thirdly, a typical data analysis and feature recognition system may be unable to correctly distinguish between individually trained known features as a result of "data confusion," which describes a scenario wherein identical data values and patterns within a given data set are trained as more than one different known feature. Data confusion can result from two primary causes: (1) during training, the user makes a mistake, such as overlapping a portion(s) of the training selection areas for the affected known features; or (2) the resultant data values of the given TDA are identical to those at a different location(s) due to a lack of sensor resolution or sensitivity in the data recording mechanism. This is especially problematic because, in the case of data confusion, erroneous information is introduced at the training stage of data analysis, and this misinformation can persist as long as the training is being used. Once the system is in use, there is no functionality available to allow the user or the system to go back and review the training selections made during earlier stages of algorithm datastore construction.

Complicating matters further is that use of the standard methods of algorithm datastore training for the purpose of feature identification does not commonly enlighten the user as to whether conflicting or erroneous datastore training is due to ambiguous source data (i.e., data confusion), faulty data selections during training (i.e., data confusion), inadequacy with regard to the TDA selected for use to solve the problem at hand (i.e., data confusion), scantiness of the evaluation algorithms employed to distinguish between the data values and patterns representing the different known features (i.e., algorithm confusion), or another unidentified problem.

SUMMARY OF THE INVENTION

The methods and systems for the creation and use of a raw-data datastore during data analysis and feature recognition are disclosed herein. In the preferred embodiment, the present invention abstracts away and/or reduces dependency upon typically required components of datastore training; these include, inter alia, the original data source(s), data set (s), or media stream and/or processing selections or regions of interest. Moreover, an algorithm datastore does not need to be manually retrained each time the series of evaluation algorithms and/or the TDA are altered, changed, modified, or reconfigured. This is accomplished through the use of a datastore that functions to store the original data values of a data set selection, which can represent a known feature. In some embodiments, the original data set is retained as the raw data value set referenced by the raw-data datastore.

The methods and systems as disclosed herein programmatically obtain the raw data values from an original data set(s) or selection(s) therein and store these data values in a raw-data, preferably data-source independent, datastore to satisfy the future needs of the data analysis and feature recognition system. The raw data values are obtained and trained into the raw-data datastore, or any equivalent software or hardware application or engine capable of at least temporarily storing data, using similar training methods such as described by Brinson, et al., in U.S. patent application 2007/0244844 or as accomplished by any methodology, application, or engine intended for use in the same or a similar manner. The use of this raw-data datastore eliminates the need for continued manual retraining of the original data values and patterns, which can be associated with a particular known feature, each time the pluralities of evaluation algorithms and/or the TDA are altered, changed, modified, or reconfigured.

The methods and systems as disclosed herein are capable of efficiently and effectively adapting to changes in the evaluation algorithm selection and/or TDA size, shape, and/or type when an observed, proven, or a prior need for further or better evaluation of the data is perceived by a user of the system or some other acceptable means or method. In one embodiment, the methods and systems of the present invention allow for an algorithm "plug-and-play" capability wherein the evaluation algorithms can be interchanged, added, subtracted, removed, masked, divided, etc., during data set evaluation and raw-data datastore training as frequently as the user of the system or some other acceptable authority deems necessary. This is accomplished by training the raw-data datastore with the programmatically derived raw data values obtained from the original data set. In some embodiments, the methods and systems of the present invention are improved using an automatic process to deductively determine and/or predict the best available pluralities of evaluation algorithms obtainable for evaluation of the data set(s) of interest.

In an alternate embodiment, the methods and systems are configured so as to use a TDA that is detailed, thorough, and/or encompassing enough to allow subset or fractionalized TDAs to be derived from or manipulated within it. Instead of relying on the original TDA used to evaluate the original data set(s) and populate the raw-data datastore, this functionality permits on-the-fly changes to the TDA used to analyze subsequent data sets and/or populate associated algorithm datastores. In yet another embodiment, the data analysis and feature recognition system is automatically retrained using any applicable and available TDA that is compatible with the original data set(s) or selection(s) therein.

In one embodiment, the methods and systems as disclosed herein incorporate a raw-data datastore capable of storing the raw data values, which are analytically obtained from the original data set(s) or selection(s) therein, in a manner so as to allow data confusion to be easily and systematically pinpointed. This raw-data datastore makes the presence of data confusion obvious as soon as raw-data datastore training is complete. In one embodiment, the system displays all locations in the original data set that are involved in any data confusion in accordance with the current training; this is accomplished in an attempt to ensure that the user obtains the best possible starting training base containing a minimum amount of data confusion. In an alternate embodiment, the system is able to isolate, within the original data set(s) or selection(s) therein, the exact data element(s) originally trained as particular entries in the raw-data datastore.

In one embodiment, the methods and systems as disclosed herein incorporate a raw-data datastore capable of storing the raw data values, which are analytically obtained from the original data set(s) or selection(s) therein, in a manner so as to allow algorithm confusion to be easily and systematically pinpointed. When the raw-data datastore is analyzed concurrently with an associated algorithm datastore, which has been previously generated from the given raw-data datastore using pluralities of evaluation algorithms and a single TDA or by any other application or engine intended for use in the same or a similar manner, it is possible for the system to identify the precise sets of raw data values within the trained known feature that are undistinguishable despite having been trained as different known features by the given pluralities of evaluation algorithms and/or TDA, which have been specified for use to solve the data analysis problem at hand.

Since it may be desirable to use the original raw-data datastore to add new training in the future, as well as to generate multiple algorithm datastores for use in other data analysis and feature recognition applications, for example, the abilities to accurately and programmatically analyze and correct the raw-data datastore training, at the point of training as in the case of data confusion or as soon as an analysis process has pinpointed the problem data set and pattern for particular pluralities of algorithms and/or TDA as in the case of algorithm confusion, are of paramount importance to users developing such systems because the quality of the final feature identification datastore is largely determined by the quality of the training base upon which it depends.

BRIEF DESCRIPTION OF THE DRAWINGS

Preferred and alternative examples of the present invention are described in detail below with reference to the following drawings:

FIG. 11 shows an example 20-data element by 20-data element data array of a two-dimensional, grey-scale image selection of two features;

FIG. 12 shows the seven-data element by seven-data element TDA;

FIG. 13 shows the eight radial, three data elements per radial, TDA;

FIG. 14 shows the adjacent-data element TDA;

FIG. 15 shows the adjacent cardinal-data element TDA;

FIG. 16 shows the eight-data element by eight-data element TDA;

FIG. 17 shows the series of concentric squares TDA;

FIG. 18 shows the eight radial, three-data elements per radial TDA (TDA1) with each member-data element labeled with the respective "GetValue" method (labeled "Value1" through "Value25") that is to evaluate it;

FIGS. 19A-19G show an example data table, which is indexed by TDE location for reference purposes, representing one embodiment of the complete data value cache;

FIGS. 20A-20D show an example data table, which is indexed by TDE location for reference purposes, representing one embodiment of the complete raw-data datastore, which is populated with the data sets associated with KF1 and KF2;

FIG. 21 shows an example data table representing the results of the algorithmic evaluation of the raw-data datastore entry corresponding to TDE location reference (4, 4) with ALG1 using TDA1;

FIG. 22 shows an example data table representing the results of the algorithmic evaluation of the raw-data datastore entry corresponding to TDE location reference (4, 4) with ALG2 using TDA1;

FIG. 23 shows an example data table representing one embodiment of AlgDS1 that contains the results of algorithmic evaluation of the raw-data datastore entries with ALG1 and ALG2 using TDA1;

FIG. 24 shows an example data table representing one embodiment of AlgDS2 that contains the results of algorithmic evaluation of the raw-data datastore entries with ALG3 and ALG4 using TDA2;

FIGS. 25A-25B show an example data table representing one embodiment of AlgDS3 that contains the results of algorithmic evaluation of the raw-data datastore entries with ALG5, ALG6, and ALG3 using TDA3;

FIG. 26A shows an example data array, which represents an adjacent-data element TDA with an associated TDE (2, 2), to be used in conjunction with FIG. 26B for illustration of data confusion;

FIG. 26B shows an example data array, which represents an adjacent-data element TDA with an associated TDE (22, 22), to be used in conjunction with FIG. 26A for illustration of data confusion;

FIG. 27A shows an example data array, which represents an adjacent-data element TDA with an associated TDE (5, 5), to be used in conjunction with FIG. 27B for illustration of algorithm confusion;

FIG. 27B shows an example data array, which represents an adjacent-data element TDA with an associated TDE (25, 25), to be used in conjunction with FIG. 27A for illustration of algorithm confusion;

FIG. 28 shows an example data table containing a truncated portion of an example raw-data datastore with an instance of data confusion highlighted;

FIG. 29 shows an example data table containing a truncated portion of an example raw-data datastore with an instance of algorithm confusion highlighted;

DETAILED DESCRIPTION OF THE PREFERRED EMBODIMENT

Figure 1:
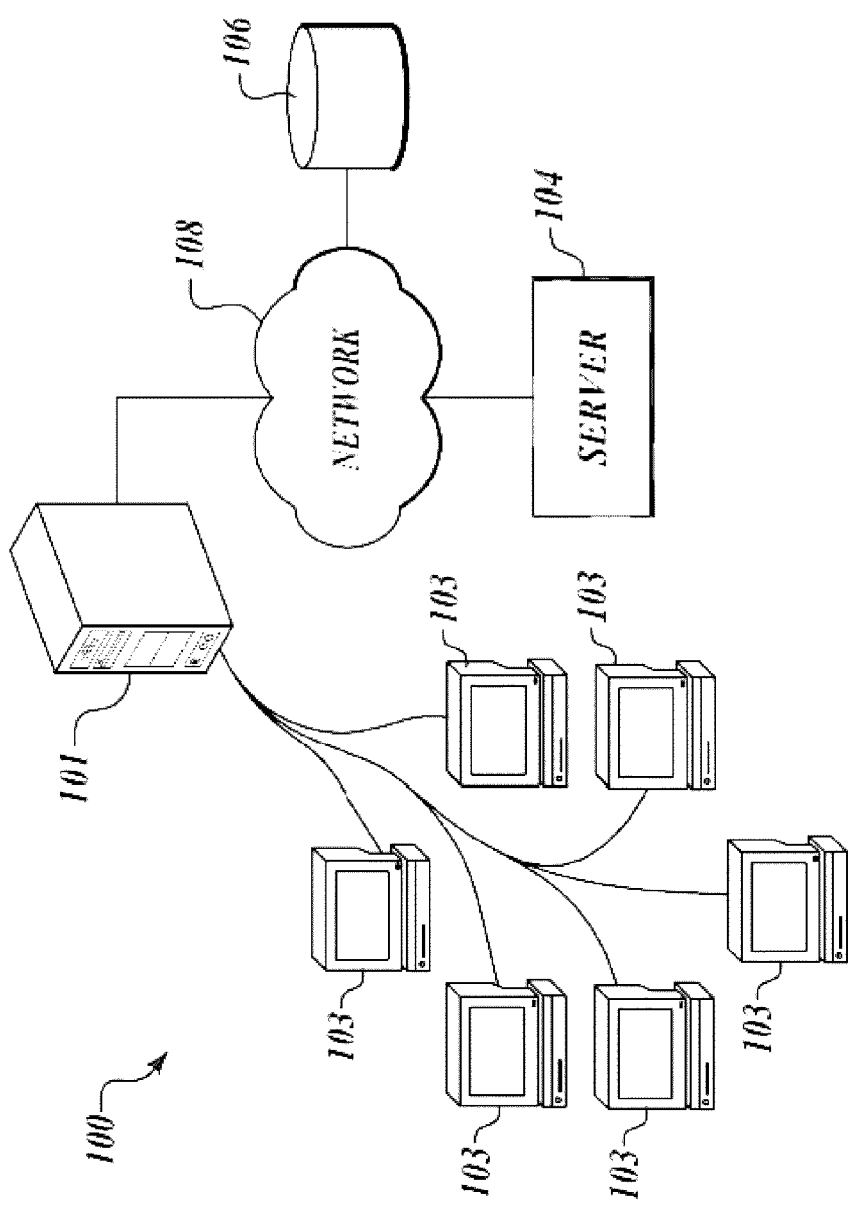
FIG. 1 shows one embodiment of an example data analysis and feature recognition system employed for creation and use of a raw-data datastore.

The methods and systems for creation and use of a raw-data, source-independent datastore as described herein preferably eliminate the aforementioned delinquencies of a typical data analysis and feature recognition system. This raw-data datastore functions to capture the data values and patterns inherent to the original source data set(s) or selection (s) therein using one or pluralities of data capture operations and a broad-scope TDA. Such germane data analysis tactics ensure the preservation of the raw data set, or selection therein, and the ability of the user or system to experiment with varying combinations of TDAs and evaluation algorithms in a concerted effort to determine the best possible solution for evaluation of the subject data and identification of desired features in subsequent, related data sets. Most beneficially, the raw-data datastore provides users the ability to retrain a new algorithm datastore exactly as an original raw-data datastore is trained while using new and/or altered, changed, modified, or reconfigured evaluation algorithms, algorithm settings, and/or a TDA, assuming the new TDA is a subset or portion of the original. Moreover, usage of a raw-data datastore during data analysis ensures the ability to pinpoint occurrences of data and/or algorithm confusion, which often plague training events causing ambiguous feature identification results; in some embodiments, the raw-data datastore provides a reference-guide-like functionality for the user desiring to isolate the exact data element location(s) where data and/or algorithm confusion exist within the data set or selection therein so as to permit immediate correction of the problem; and use of the raw-data datastore permits partial or in some cases complete fabrication of the original data set or selection therein from the previously obtained and stored raw data values if, by chance, the original data set is lost, damaged, corrupted, unpreserved, etc.

A data analysis and feature recognition system (such as disclosed by Brinson, et al., in U.S. patent application 2007/0244844 or as accomplished using any application or engine intended for use in the same or a similar manner) is configured to accept an original source data set containing one or pluralities of known and pre-identified features (e.g., a known pattern, shape, object, or entity). The system is generally configured such that the user can "train" the system by recording data values (or location references) representing the known feature(s). This training is accomplished through execution of algorithmic methods that capture and preserve the data values (or location references) defining the feature (s). These sets of data values (or location references) are then stored in an organizational storage structure (e.g., a raw-data datastore such as described herein; a synaptic web such as described by Brinson, et. al.; a data store; a data array; a data table; any user-specified, preset, automatically determined, and/or industry- or system-acceptable storage structure intended for use in the same or a similar purpose).

Once the raw-data datastore is trained for a known feature (s), the raw data values (or location references), which are innate to the original source data set or selection therein, can be subsequently and repeatedly analyzed via multitudinous combinations of the same or different evaluation algorithms and compatible TDAs. Fundamental to the usefulness of a raw-data datastore is the premise that complex algorithmic calculations are not required in the attainment of the raw data values (or location references) of the original data set or selection. This is because once the raw data values and patterns (or location references) are systematically obtained and trained into the raw-data datastore, all future data analysis and feature recognition training, processing, and/or associated modifications or additions, as well as auto-retraining and/or auto-generation of new algorithm datastores, rely on these raw data values (or location references) instead of the original data set in and of itself. Essentially, the data as stored in the raw-data datastore becomes the source data for subsequent algorithm datastore renderings thereby affording the user and the system significant cost savings, in the form of processing time and temporary storage needs, as efforts are made to achieve the most successful processing results possible. Ultimately, storage of the raw data set or the selected portion(s) therein may not be required for future training and/or analysis needs of subsequent algorithm datastores and may in fact become obsolete. In pluralities of alternate embodiments, the raw data set or selections therein are retrained by the system resulting in a system capable of offering enhanced assistance with data and/or algorithm confusion resolution, and a greater ability to manually or automatically retrain the system using different pluralities of evaluation algorithms and/or different TDAs. In alternate embodiments, further and additional algorithm datastores with values derived from the analysis of the raw-data datastore are also generated.

The methods and systems for creation and use of a raw-data, data-source-independent datastore as described herein are intended to function as measures to reduce the burden of retraining that is required in typical data analysis and feature recognition systems when either the evaluation algorithm(s) or the TDA are altered, changed, modified, or reconfigured between processing runs and also to aid in the resolution of occurrences of data and/or algorithm confusion that can persist from flawed or ambiguous data, TDA and/or algorithm(s) selections, user error, etc. In some embodiments, the methods and systems as described herein improve upon the data analysis and feature recognition methodologies and engine as described by Brinson, et al., while in an alternate embodiment, any processing application or engine intended for use in the same or a similar manner can be referenced.

Although several of the data analysis and feature recognition system embodiments and examples as discussed herein are described with reference to specific data types, modalities, submodalities, etc., such as imagery data sets, the present invention is not limited in scope or breadth to analysis of these data types. The methods and systems as described herein can be used to analyze and/or recognize discrete features in any data set or other collection of information that can be represented in a quantifiable datastore.

As used herein, the term "algorithm datastore" refers to any software or hardware element capable of at least temporarily storing data. In several embodiments, the datastore(s) referred to herein contains pluralities of known features represented by pluralities of characteristic data values and patterns (or location references) generated by one or more evaluation algorithms associated with a particular TDA.

As used herein, the term "raw-data datastore" carries a similar meaning as "algorithm datastore" but more specifically functions to store the raw data values (or location references) that are systematically retrieved from an original data set or selection therein using pluralities of information-reporting operations (e.g., a series of "GetValue" methods that report raw data element values or location references rather than perform some mathematical function on the original data values) and a particular TDA. The raw-data datastore can contain pluralities of known features characterized by pluralities of raw data values and patterns (or location references).

As used herein, the term "target data element" (TDE) refers to a discrete portion of a larger data set in a given data stream or medium that is being evaluated for characteristics using evaluation algorithms and a given TDA. A TDE can be any size appropriate for a particular data type, modality, submodality, etc. For example, in a set of graphical data, a TDE can consist of a single pixel, a localized grouping of pixels, or any other discrete grouping of pixels. In several embodiments and regardless of size, a TDE is a "point" that is evaluated in a single discrete step before processing moves to the next valid TDE in the data set or selection therein.

As used herein, the term "target data area" (TDA) refers to an ordered collection of data elements immediately surrounding a TDE. The size and shape of the TDA vary depending upon the type of data or medium that is evaluated, user specifications, and/or industry- or system-acceptable standards and can define the member-data elements available for inclusion during evaluation or recording of a given TDE.

As used herein, the term "known feature" (KF) refers to an element of data representing an entity, item, object, pattern, or other discretely definable piece of information known to be present in a particular data set during training. At the time of data processing, the system searches a new data set for one or more of the previously defined known features.

As used herein, the term "training (event)" refers to the process of associating pluralities of data values (or location references) from a given data stream to a particular feature by establishing and/or updating the data values (or location references) and/or evaluation pathways as stored in a user-specified, preset, automatically determined, and/or industry- or system-acceptable organizational storage structure, such as a datastore, value cache, synaptic web, data array, data table, etc.

As used herein, the term "positive training value set(s)" refers to the sets of data values (or location references) that are located inside the area of data trained as the user-defined known feature.

As used herein, the term "negative training value set(s)" refers to the sets of data values (or location references) that are located outside the area of data trained as the user-defined known feature.

As used herein, the term "relative adjusted training" refers to a process used during a training event whereby each of the data values (or location references) found in the negative training value set nullifies one matching set of data values (or location references) found inside the positive training value set. The remaining positive training value sets can then be used to generate training entry value sets for the known feature.

As used herein, the term "absolute adjusted training" refers to a process used in a training event whereby each set of data values (or location references) found in a negative training value set nullifies all matching sets of data values (or location references) found in the positive training value set. The remaining positive training value sets can then be used to generate training entry value sets for the known feature.

As used herein, the term "(data) modality" retains its traditional meaning and refers to one of the various forms or formats of digital data that can be processed. For example, image data represents one modality, while sound data represents another. In addition to describing data types that conform to one or more human sensory modalities, the term is also intended to encompass data types and formats that might have little or no relation to the human senses. For example, financial data, demographic data, and literary data also represent modalities within the definition of the term as used herein.

As used herein, the term "(data) submodality" refers to a sub-classification of a data modality. In some embodiments, a submodality refers to one of the applications or sources for the data that can affect how the data is processed. For example, X-ray and satellite photography are submodalities of the imaging modality. Moreover, systems that are manufactured by different vendors (e.g., GENERAL ELECTRIC, SIEMENS) but are used for producing X-ray images can vary enough in their data formats to require separation into different submodalities.

FIG. 1 shows an example system 100 for creation and use of a raw-data datastore by a data analysis and feature recognition system, such as disclosed by Brinson, et al., in U.S. patent application 2007/0244844, or as accomplished using any application or engine intended for use in the same or a similar manner. In one embodiment, the system 100 includes a single computer 101. In an alternate embodiment, the system 100 includes a computer 101 in communication with pluralities of other computers 103. In an alternate embodiment, the computer 101 is connected with pluralities of other computers 103, a server 104, a datastore 106, and/or a network 108, such as an intranet or the Internet. In yet another embodiment, a bank of servers, a wireless device, a cellular telephone, and/or another data capture/entry device(s) can be used in place of the computer 101. In one embodiment, a data storage device 106 stores a data analysis and feature recognition raw-data datastore. The data storage device 106 can be stored locally at the computer 101 or at any remote location while remaining retrievable by the computer 101. In one embodiment, an application program, which creates the raw-data datastore, is run by the server 104 or by the computer 101. Also, the computer 101 or server 104 can include an application program(s) that trains a feature(s) in a digital data stream. In one embodiment, the medium is one or pluralities of image pixels.

Figure 2:
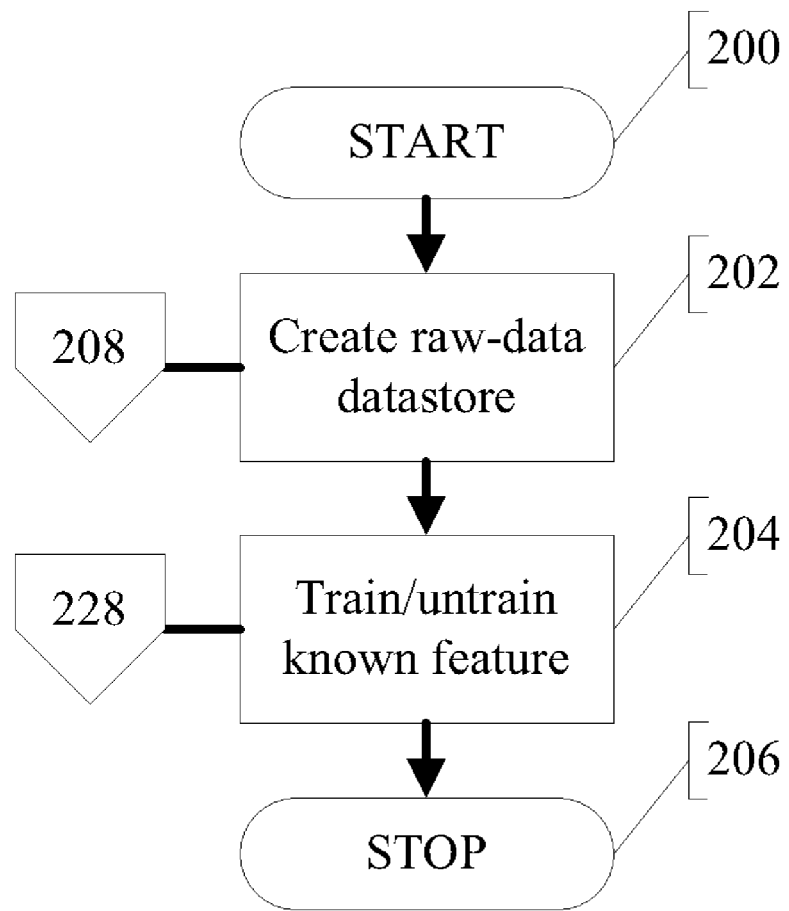
FIG. 2 shows an example method for creating and training a raw-data datastore for use with a data analysis and feature recognition system.

FIG. 2 shows an example method formed in accordance with an embodiment of the present invention. The method initializes at block 200, and at block 202, a raw-data datastore is created; this is described in more detail with reference to FIGS. 3-4. At block 204, a known feature is trained; this is described in more detail with reference to FIGS. 5-10.

Figure 3:
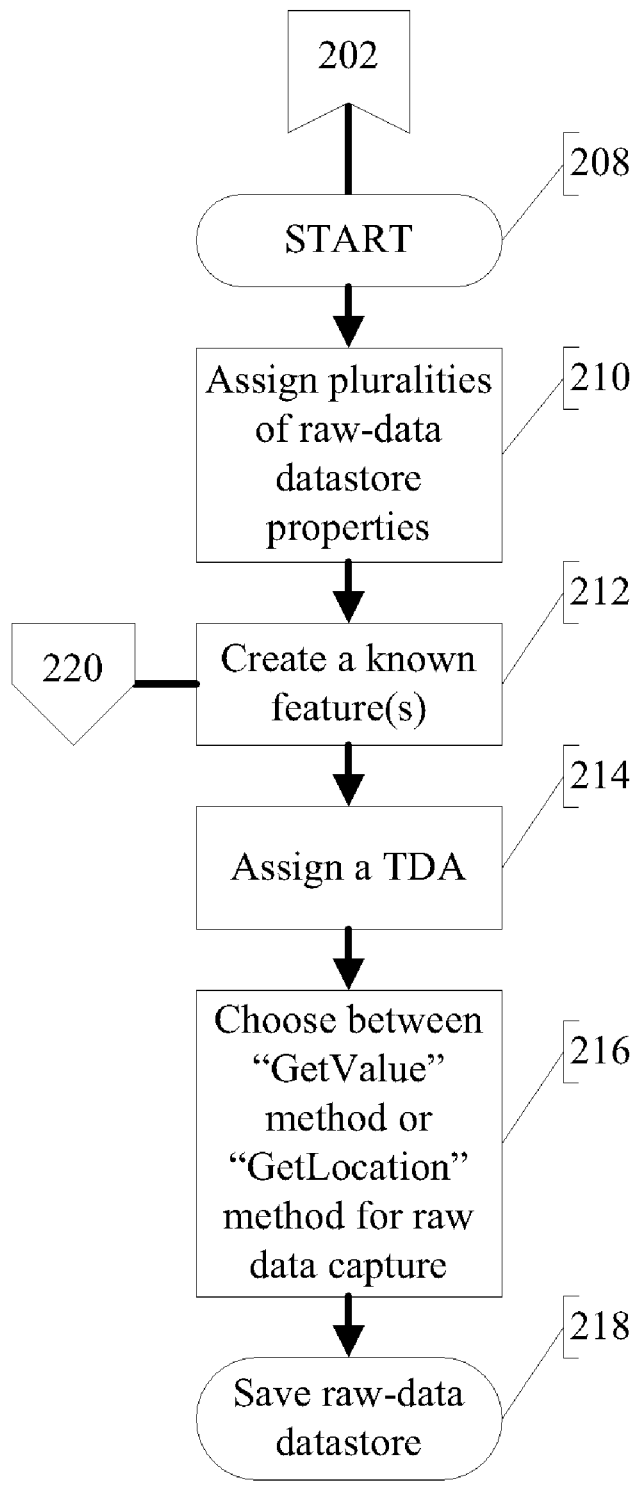
FIG. 3 shows an example method for creating a raw-data datastore.

FIG. 3 shows an example method 202 for creating a raw-data datastore. The method 202 initializes at block 208 and at block 210, pluralities of raw-data datastore properties are assigned. In one embodiment, the datastore properties include, inter alia, declaration of the data set modality and submodality. At block 212, a known feature(s) is created; this is described in more detail with reference to FIG. 4. At block 214, a TDA is assigned. The TDA used for evaluation of the raw data values and patterns (or location references) of the original data set can exist in any applicable geometric configuration, shape, or pattern, can contain any number of applicable dimensions, and can consist of any number of raw data elements. One example TDA is starburst-like in shape wherein the data elements are arranged in a pattern of eight radials with three data elements per radial. Note that the more encompassing the TDA used during raw-data datastore population is, the easier it is to alter, change, manipulate, or reconfigure during subsequent data analysis and feature recognition exercises, such as the creation of ensuing algorithm datastores.

At block 216 of FIG. 3, a selection is made between using the "GetValue" method versus the "GetLocation" method for raw data capture. In one embodiment, a simplistic, information reporting operation, such as the "GetValue" method, which with regard to imagery can return the grey-scale value of the pixel being evaluated or the "GetLocation" method, which in one instance returns the location reference coordinates (e.g., X, Y, Z) of the pixel being evaluated, is used to populate the raw-data datastore with the data values and patterns (or location references) inherent to the original data set. The "GetValue" and "GetLocation" methods can be modified and used to capture the data values and location references, respectively, of any applicable medium or data set type, modality, submodality, etc., and are not limited to evaluation in the imagery embodiment alone. In an alternate embodiment, the information reporting operation can be any method called to report other data element information (e.g., data element demographic information such as data source, brightness, or elevation), characteristics, or relationships. In an alternate embodiment, the method used to populate the raw-data datastore can be any combination of methods and associated calculations, such as the "GetValue" method used in conjunction with a spatial iteration algorithm; such a combination finds applicability in specific industries and genres, such as change detection across multiple frames of data where spatial relationships among data elements are of paramount importance when attempting to recognize feature change. In an alternate embodiment, an automated process can be used to decipher the "best available" method(s) and/or algorithm(s) for use in evaluation of the original data set or selection therein. Here, the "best available" method(s) and/or algorithm(s) possess any of the following characteristics, which are important or relevant to evaluation of the subject data set or selection therein, including increased efficiency, productivity, and/or specificity; reduced cost with regard to time and/or processing requirements; etc. In an alternate embodiment, the method(s) and/or algorithm(s) used are masked, divided, etc., so as to decrease the specificity of the data values and patterns (or location references) returned. In yet another alternate embodiment, selection of a particular TDA at block 214 dictates which method(s) and/or algorithm (s) are to be used to populate the raw-data datastore with the data values (or location references) of the original data set or selection therein.

At block 218 of FIG. 3, the raw-data datastore is saved to the computer 101 or to the network 108. Blocks 212, 214, and 216 can be executed in any order.

Figure 4:
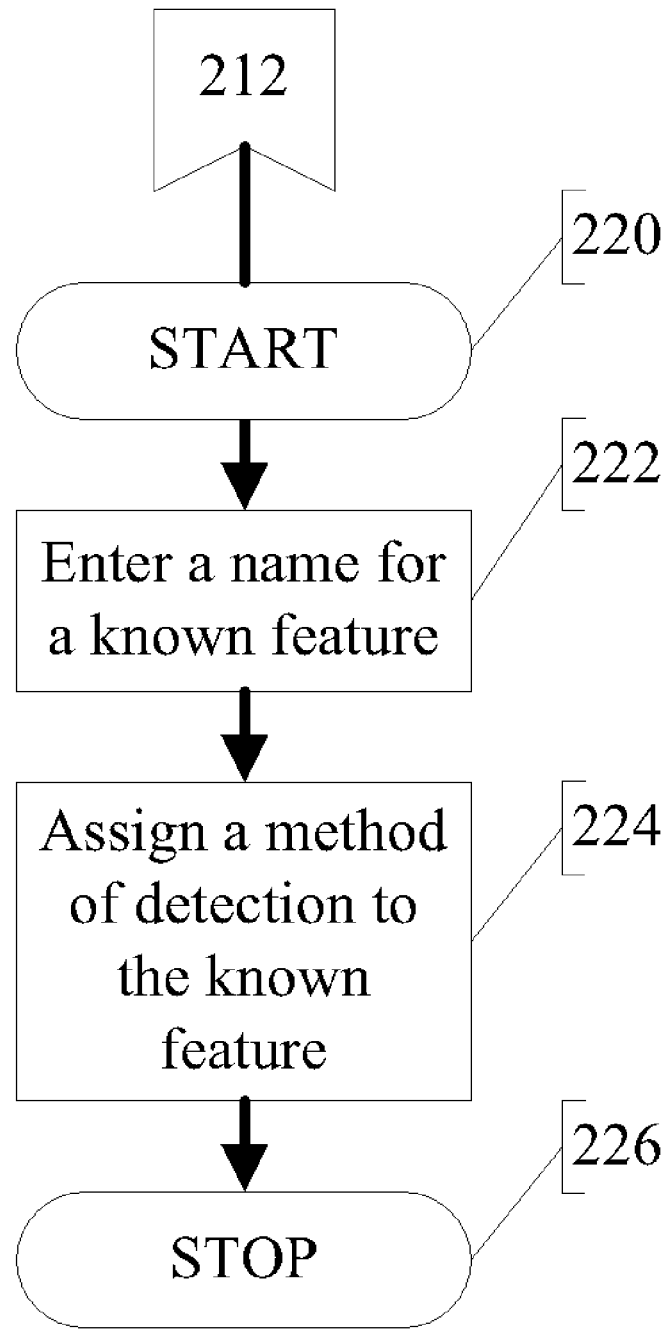
FIG. 4 shows an example method for creating a known feature.

FIG. 4 shows an example method 212 for creating a known feature. The method 212 initializes at block 220, and at block 222, a name for a known feature is entered into the system of the present invention. At block 224, a method of feature detection is assigned to the known feature. In one embodiment, the method of feature detection can be set to hit detection, cluster detection, or threshold detection; in an alternate embodiment, cluster detection and threshold detection can be selected together. At block 226, the method 212 is complete. Blocks 222 and 224 can be executed in any order.

Figure 5:
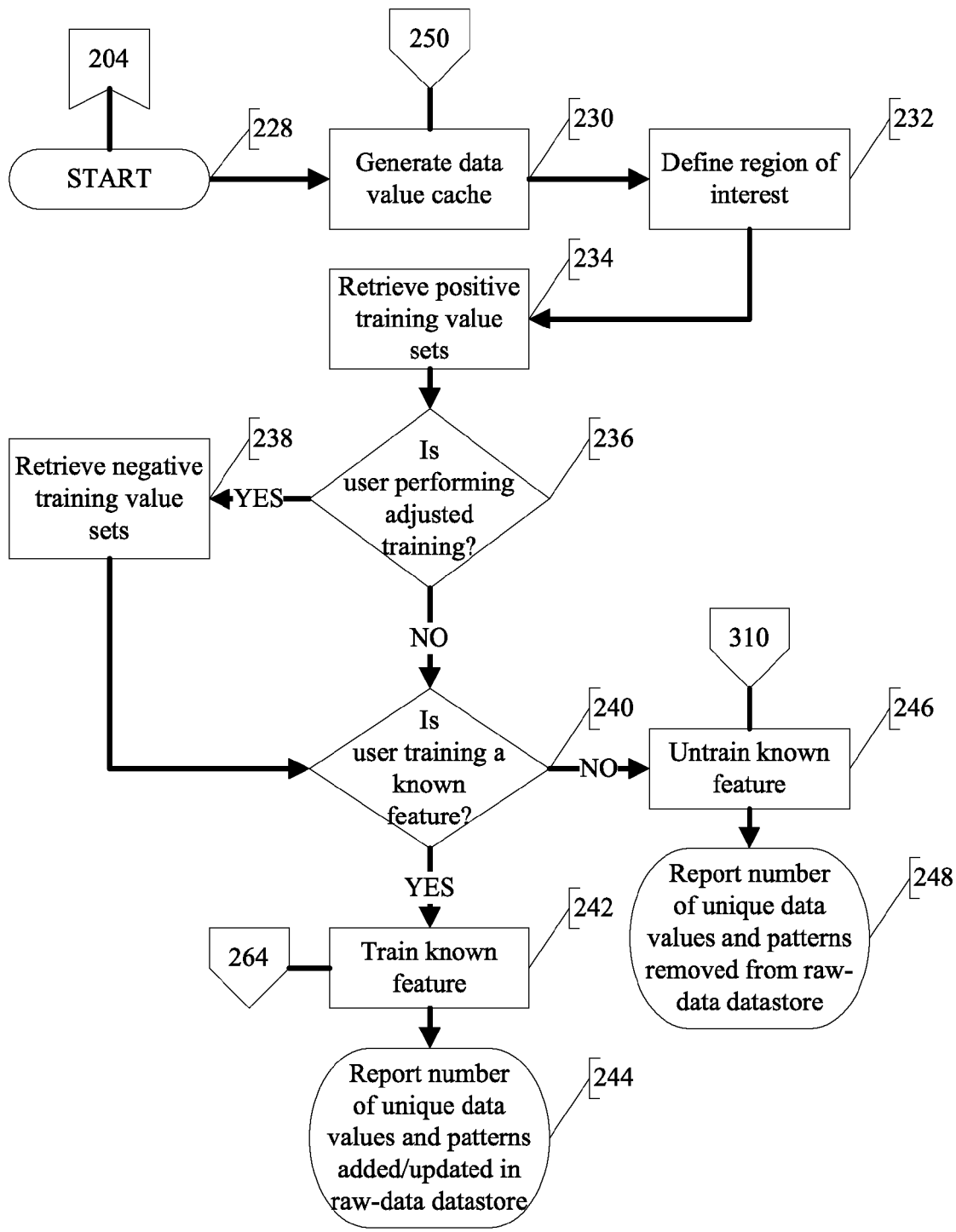
FIG. 5 shows an example method for modifying a raw-data datastore by training or untraining.

FIG. 5 shows an example method 204 for modifying a raw-data datastore by training or untraining. The method 204 initializes at block 228, and at block 230, a data value cache is generated; this is described in more detail with reference to FIG. 6. At block 232, an area of the original data set that is known to contain the feature to be trained (i.e., region of interest) is defined and/or selected by the user. At block 234, the positive training value sets are retrieved. At block 236, a decision is made as to whether the user is performing adjusted training. If YES at block 236, at block 238 the negative training value sets are retrieved, and the method 204 proceeds to block 240. If NO at block 236, at block 240 a decision is made as to whether the user is training a known feature. If YES at block 240, at block 242 a known feature is trained; this is described in more detail with reference to FIGS. 7-9. At block 244, the number of unique data values and patterns (or location references), which are added to and/or updated in the raw-data datastore, are reported, and the method 204 is complete. If NO at block 240, at block 246 a known feature is untrained; this is described in more detail with reference to FIGS. 8 and 10. At block 248, the number of unique data values and patterns (or location references), which are removed from the raw-data datastore, are reported, and the method 204 is complete. In one embodiment, blocks 230 and 232 can be executed in any order. Also in one embodiment, block 234 and the combination of blocks 236 and 238 can be executed in any order.

Figure 6:
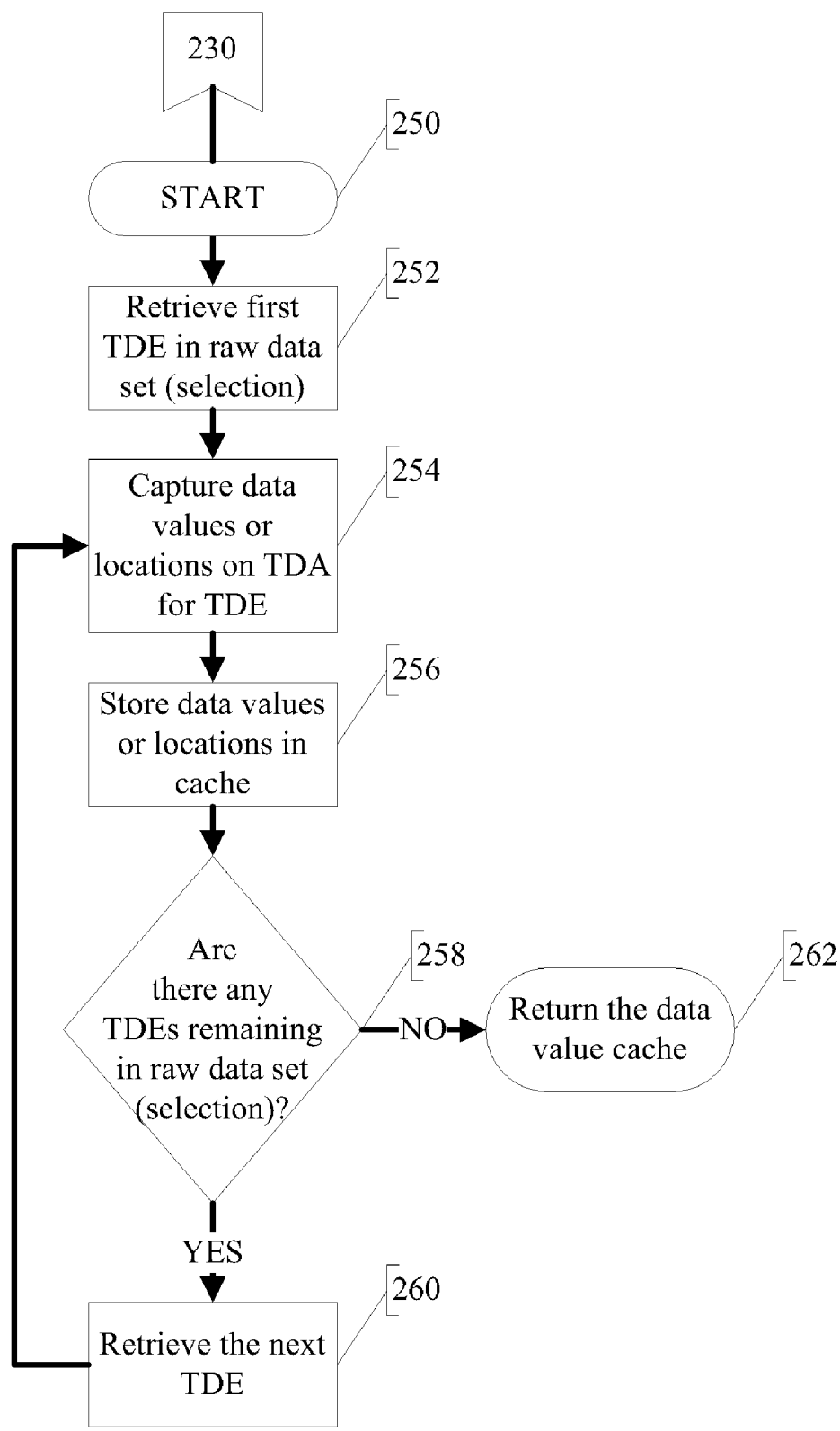
FIG. 6 shows an example method for generating a data value cache.

FIG. 6 shows an example method 230 for generating a data value (or location reference) cache. In one embodiment, a data value (or location reference) cache, which is sized and addressed in the same or similar manner as the raw data set selection, consists of an array to store the results of the data values (or location references) capture processes. The method 230 initializes at block 250, and at block 252 the first valid TDE of the raw data set selection is retrieved. At block 254, the data values (or location references) on the TDA for the given TDE are captured. At block 256, the data values (or location references) are stored in a data value (or location reference) cache at a location corresponding to the given TDE. At block 258, a decision is made as to whether there are any more TDEs remaining in the raw data set selection that are available for capture. If YES at block 258, at block 260 the next TDE is retrieved, and the method 230 returns to block 254. If NO at block 258, at block 262 the completed data value (or location reference) cache is returned, and the method 230 is complete.

Figure 7:
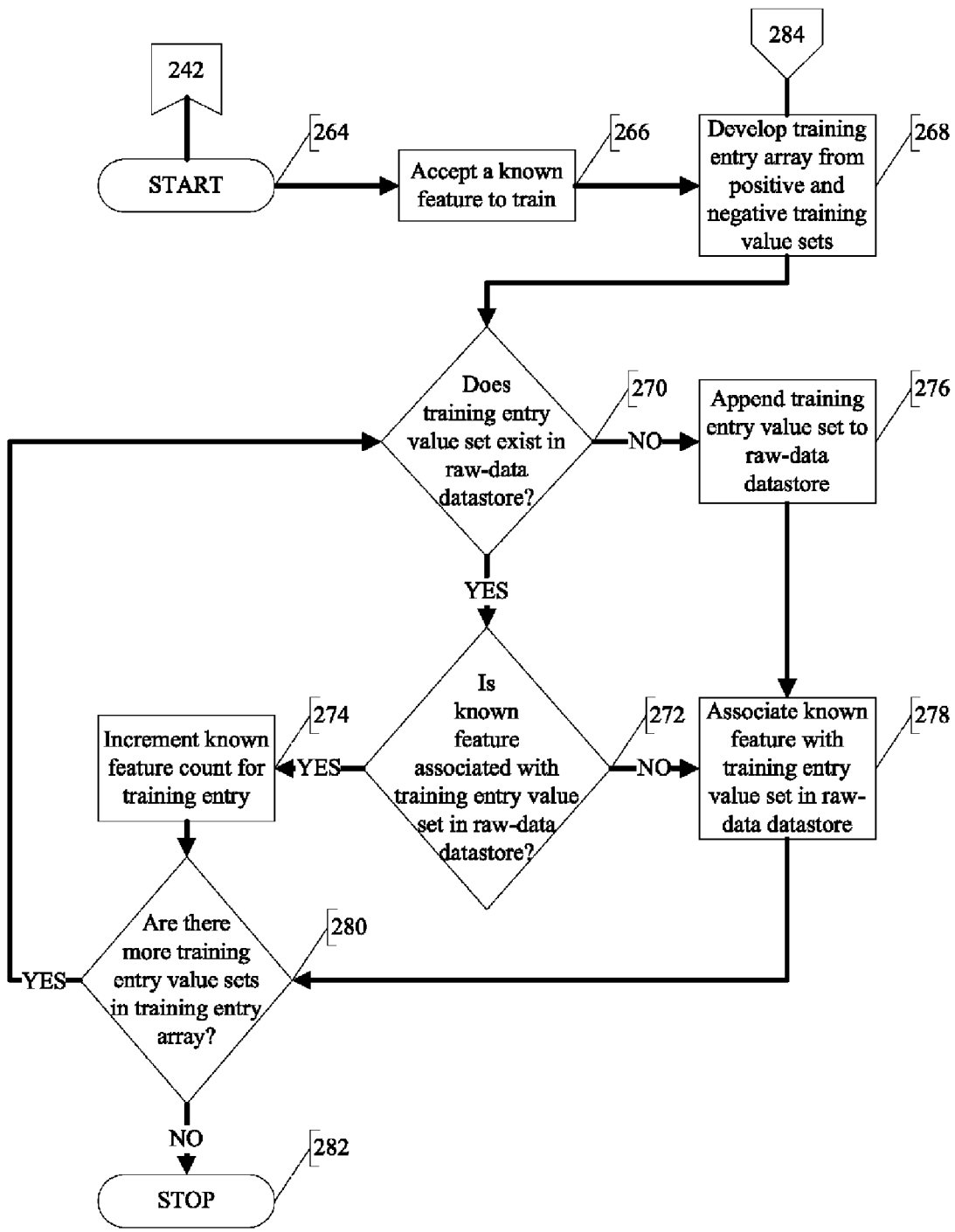
FIG. 7 shows an example method for training a known feature.

FIG. 7 shows an example method 242 for training a known feature. The method 242 initializes at block 264, and at block 266, a known feature is accepted for training from the user. At block 268, a training entry array is developed from the positive and negative training value sets; this is described in more detail with reference to FIGS. 8-9. At block 270, a decision is made as to whether the training entry value set exists in the raw-data datastore. If YES at block 270, the method 242 proceeds to block 272; if NO at block 270, the method 242 proceeds to block 276.

At block 272 of FIG. 7, a decision is made as to whether the known feature is associated with the training entry value set in the raw-data datastore. If YES at block 272, at block 274 the known feature count for the training entry is incremented, and the method 242 proceeds to block 280. If NO at block 272, the method 242 proceeds to block 278.

At block 276 of FIG. 7, the training entry value set is appended to the raw-data datastore. At block 278, the known feature is associated with the training entry value set in the raw-data datastore, and the method 242 proceeds to block 280.

At block 280 of FIG. 7, a decision is made as to whether there are any more training entry value sets in the training entry array. If YES at block 280, the method 242 returns to block 270; if NO at block 280, at block 282 the method 242 for training a known feature is complete.

Figure 8:
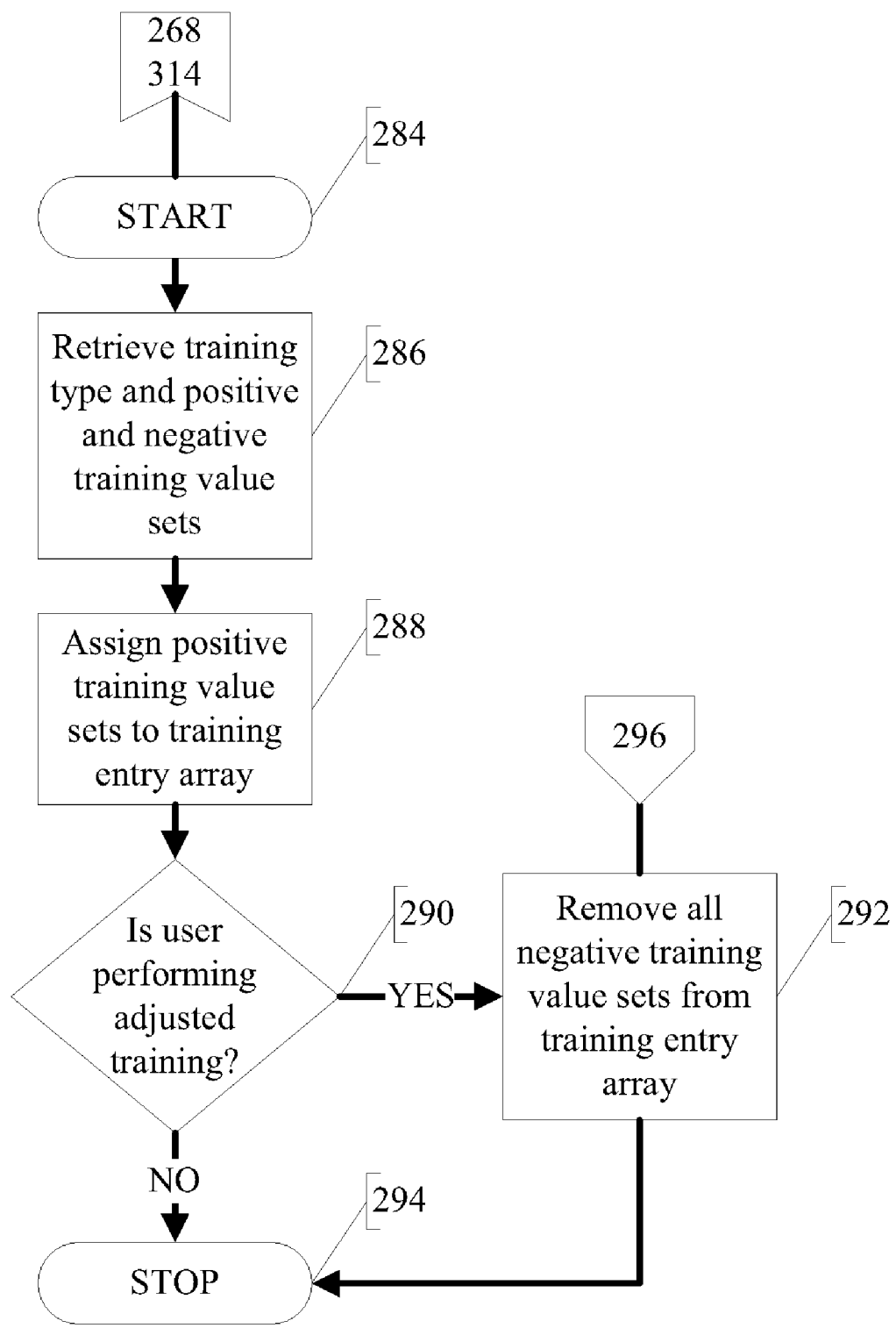
FIG. 8 shows an example method for developing a training entry array from positive and negative training value sets.

FIG. 8 shows an example method 268/314 for developing a training entry array from positive and negative training value sets. The method 268/314 initializes at block 284, and at block 286, a training type and the positive and negative training value sets are retrieved. At block 288, the positive training value sets are assigned to the training entry array. At block 290, a decision is made as to whether the user is performing adjusted training. If YES at block 290, at block 292 all the negative training value sets are removed from the training entry array; this is described in more detail with reference to FIG. 9. The method 268/314 then proceeds to block 294. If NO at block 290, at block 294 the method 268/314 for developing a training entry array is complete.

Figure 9:
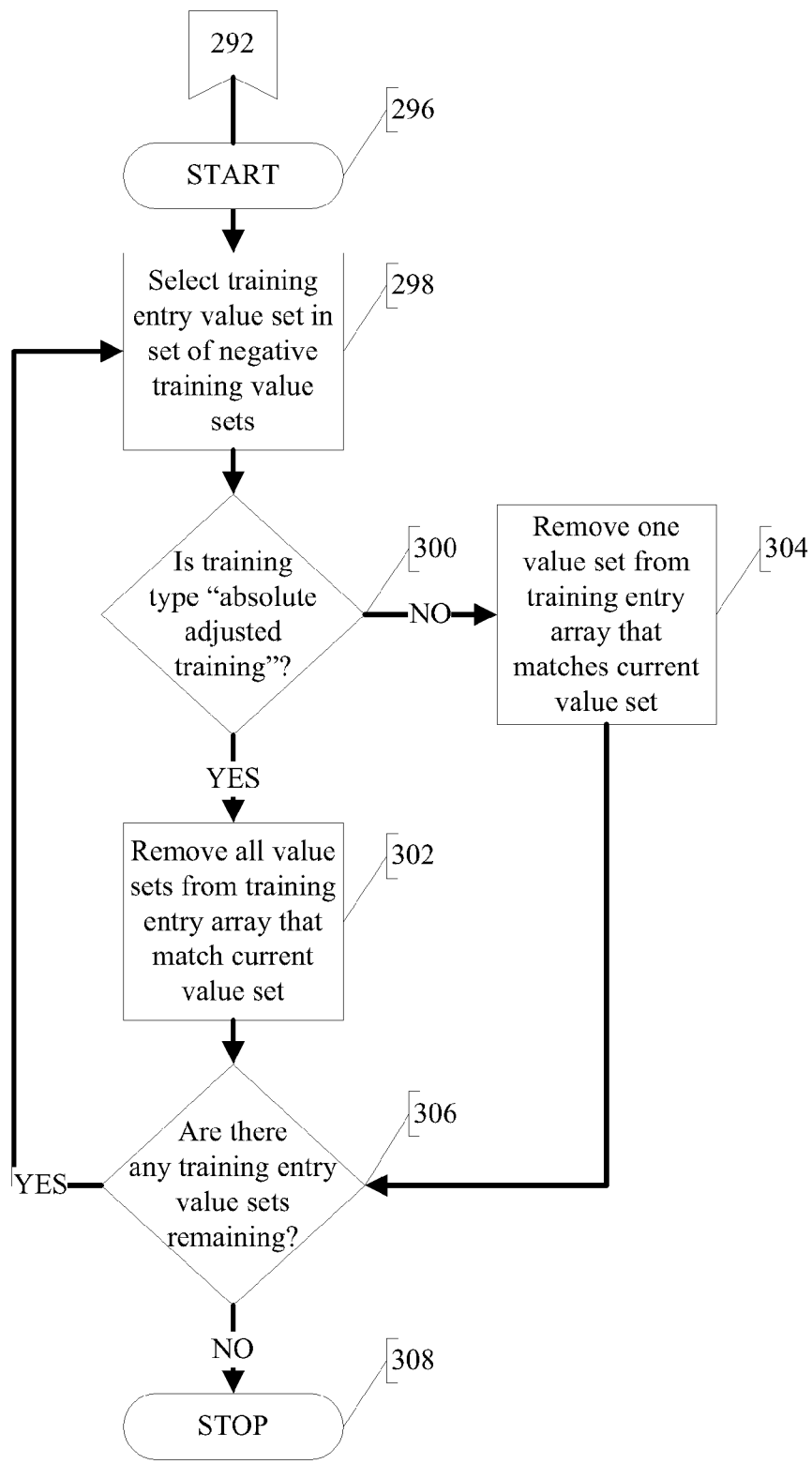
FIG. 9 shows an example method for performing adjusted training by removing negative training value sets from the collection.

FIG. 9 shows an example method 292 for performing adjusted training. In one embodiment, relative and/or adjusted training are available. The method 292 initializes at block 296, and at block 298, a training entry value set is selected from a set of negative training value sets. At block 300, a decision is made as to whether the training type is set to absolute adjusted training. If YES at block 300, at block 302 all value sets matching the current value set are removed from the training entry array, and the method 292 proceeds to block 306. If NO at block 300, at block 304 one value set matching the current value set is removed from the training entry array, and the method 292 proceeds to block 306.

At block 306 of FIG. 9, a decision is made as to whether there are any training entry value sets remaining in the set of negative training value sets. If YES at block 306, the method 292 returns to block 298. If NO at block 306, at block 308 the method 292 for performing adjusted training is complete.

Figure 10:
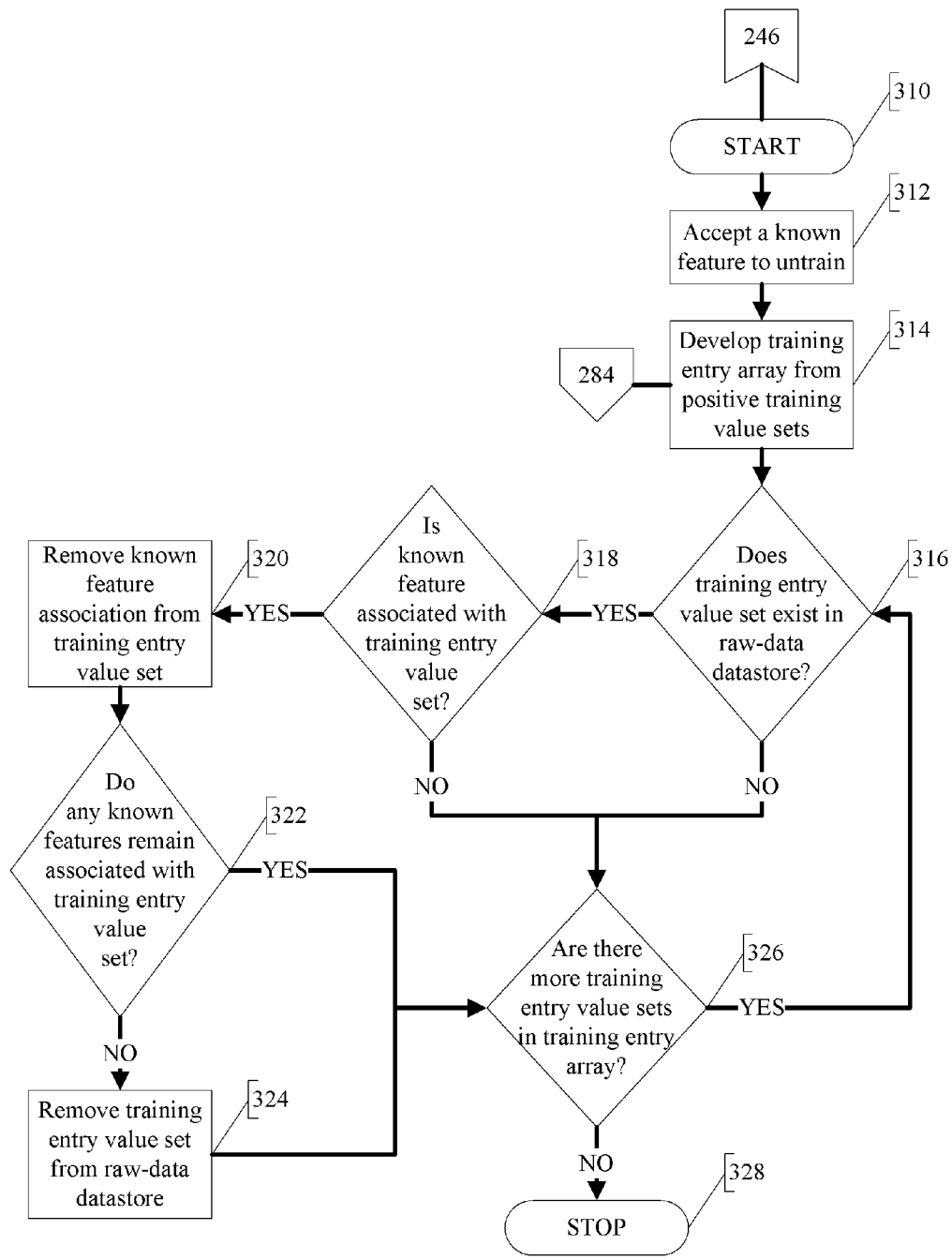
FIG. 10 shows an example method for untraining a known feature.

FIG. 10 shows an example method 246 for untraining a known feature. The method 246 initializes at block 310, and at block 312, a known feature is accepted from the user for untraining. At block 314, a training entry array is developed from the positive training value sets; this is described in more detail with reference to FIGS. 8-9. At block 316, a decision is made as to whether the training entry value set exists in the raw-data datastore. If YES at block 316, the method 246 proceeds to block 318; if NO at block 316, the method 246 proceeds to block 326.

At block 318 of FIG. 10, a decision is made as to whether the known feature is associated with the training entry value set. If YES at block 318, the method 246 proceeds to block 320; if NO at block 318, the method 246 proceeds to block 326. At block 320, the known feature association is removed from the training entry value set. At block 322, a decision is made as to whether any of the known features remain associated with the training entry value set. If YES at block 322, the method 246 proceeds to block 326. If NO at block 322, at block 324 the training entry value set is removed from the raw-data datastore, and the method 246 proceeds to block 326.

At block 326 of FIG. 10, a decision is made as to whether there are any more training entry value sets in the training entry array. If YES at block 326, the method 246 returns to block 316. If NO at block 326, at block 328 the method 246 for known feature untraining is complete.

For illustrative purposes, the creation and use of a raw-data datastore as disclosed herein is exemplified with reference to the imagery example as shown in FIGS. 11-25.

FIG. 11 is an example data array representing a two-dimensional, grey-scale, 20-data element (i.e., pixel) by 20-data element image selection of two features; the first feature exists in the upper left quadrant of the FIG. 11 data array, and the second feature exists in the lower right quadrant. The X-location coordinate for each data element of the data array is indicated by the corresponding label in the column header, and the Y-location coordinate for each data element is indicated by the corresponding label in the row header. This image selection of two features, which can represent separate and discretely definable items, objects, patterns, or entities or can exist as image background or "noise," has a total of 400 data elements. In this instance, the numbers shown within the data array are the grey-scale pixel values of the original image selection, while in an alternate instance the numbers represent some other quantifiable characteristic (e.g., data source, location reference, brightness, resolution, elevation) of the data elements. Ultimately, the data element values (or location references) depicted in the FIG. 11 data array are captured, analyzed, and stored in a raw-data datastore during data analysis using pre-selected evaluation algorithms or methods and a pre-determined TDA.

The user-specified, preset, or automatically determined TDA, which is used to capture the data values (or location references) inherent to the corresponding data elements of the FIG. 11 data array, can exist in any geometric configuration and can capture the data values (or location references) of any number of data elements in any applicable order or fashion. Several examples of TDAs, not all of which necessarily represent the preferred TDA embodiment in all data types, modalities, submodalities, etc., are presented forthwith.

Figures 14, 15, 16:
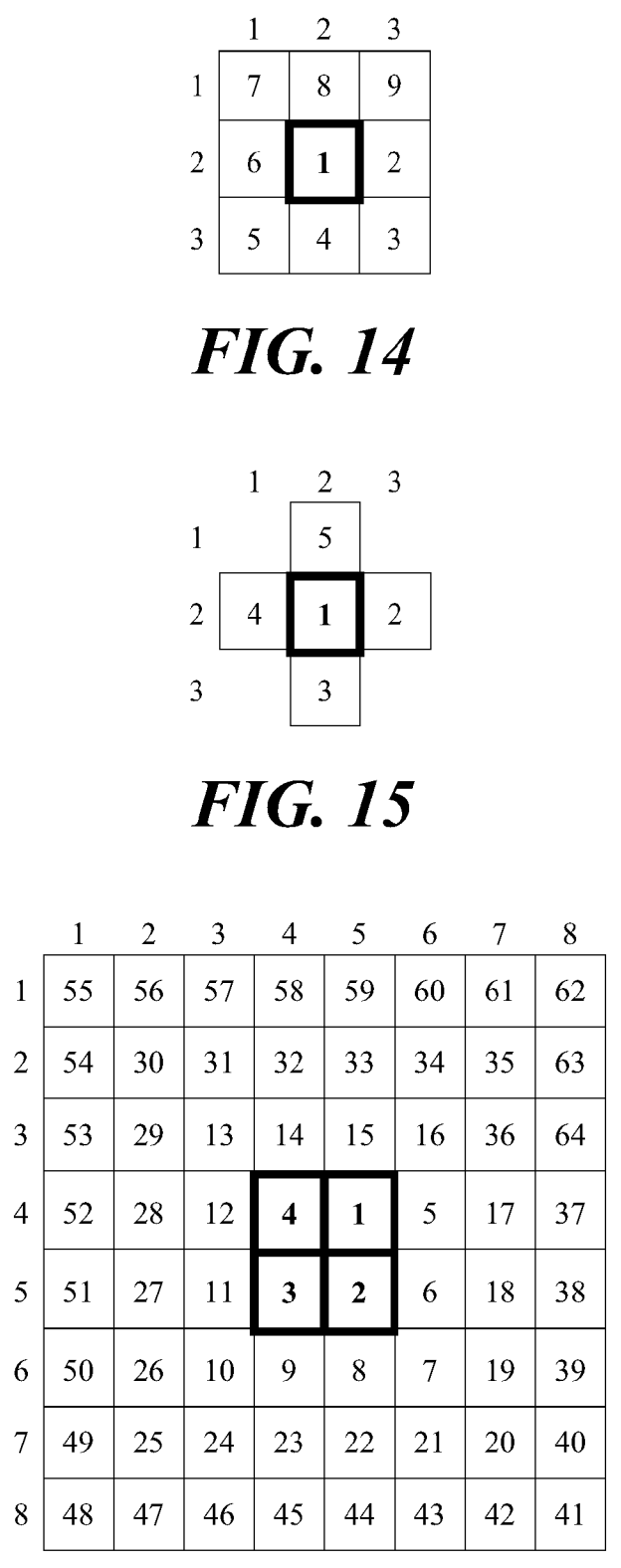

In one such example, the TDA can exist as any odd-numbered, perfect square of data (e.g., a three-data element by three-data element, seven-data element by seven-data element, or any odd-number N-data element by odd-number N-data element area of data) surrounding a single, centralized TDE. FIG. 12 shows a seven-pixel by seven-pixel TDA (hereafter "7×7 TDA") with a single, centralized TDE. In one embodiment, the data values (or location references) inherent to the corresponding data elements of the original data set of FIG. 11 are captured in any applicable order or fashion using the 7×7 TDA and subsequently function to populate the raw-data datastore. In one embodiment and following raw-data datastore training and subsequent data analysis and feature recognition exercises, such as use of the previously trained raw-data datastore as the source data for generation of an associated algorithm datastore, the 7×7 TDA of FIG. 12 can be altered, changed, modified, or reconfigured to become any subset or portion thereof such as the eight-radial, three-data elements-per-radial, TDA (hereafter "8×3 TDA") as shown in FIG. 13, the adjacent-data element TDA as shown in FIG. 14, or the adjacent cardinal-data element TDA as shown in FIG. 15.

In another such example, the TDA can exist as any even-numbered, perfect square of data (e.g., a four-data element by four-data element, eight-data element by eight-data element, or any even-number N-data element by even-number N-data element area of data) absent a single, centralized TDE but instead surrounding a centralized TDE comprised of pluralities of data elements. FIG. 16 shows an eight-data element by eight-data element TDA (hereafter "8×8 TDA") with a TDE comprised of a localized grouping of four central data elements. In one embodiment, the data values (or location references) inherent to the corresponding data elements of the original data set of FIG. 11, are captured in any applicable order or fashion using the 8×8 TDA and subsequently function to populate the raw-data datastore. In one embodiment and following raw-data datastore training and subsequent data analysis and feature recognition exercises, the 8×8 TDA of FIG. 16 can be altered, changed, modified, or reconfigured to become any subset or portion thereof, such as a series of concentric squares surrounding a grouping of centralized data elements functioning as the TDE as shown in FIG. 17.

For this example, the 8×3 TDA of FIG. 13, which exists as a localized grouping of 24 data elements arranged in a starburst-like pattern around a single, centralized TDE (hereafter "TDA1"), is selected for use in the generation of a raw-data datastore. As shown in FIG. 11, the first and last three rows and columns of data element values are highlighted because the data elements contained therein do not abut the requisite adjacent data elements as required for complete analysis in accordance with TDA1; as such, these data elements are not considered "valid" during processing. Use of TDA1, which represents the preferred TDA embodiment in this case but not necessarily the preferred TDA embodiment in all data types, modalities, submodalities, etc., ensures that at some point during generation of the subsequent data value cache and ultimately the raw-data datastore, the data value of every data element in the original data set selection is considered. Once the raw-data datastore is populated with the data values as stored in the data value cache, the user is able to generate algorithm datastores using varying pluralities of evaluation algorithms and/or subsets or portions of the original TDA1 so as to evaluate the performance and efficacy of each.

For this example, the 8×3 TDA of FIG. 13, which exists as a localized

In this example, a series of 25 consecutively executed "GetValue" routines (i.e., methods, processes, algorithms) (hereafter "Value1" through "Value25"), each corresponding to a particular member-data element of TDA1 for a given TDE and each returning a single member-data element value, are used to capture the data values of the original data set of FIG. 11. FIG. 18 shows TDA1 with each member-data element labeled with the relevant "GetValue" routine that is to evaluate it. The member-data elements of TDA1 are respectively evaluated by any of the 24 serially executed "GetValue" routines, assuming each "GetValue" routine assesses only one member-data element of TDA1. Also, the "GetValue" routine that evaluates a particular member-data element of TDA1 for a given TDE must operate on the same positional member-data element of all subsequent TDA1s.

Referencing the flowchart of FIG. 6, data value capture of the original data set of FIG. 11 begins with generation of a data value cache, which is initialized as an organizational storage structure used to amass the data value capture results from each TDA for each valid TDE; the data value cache is indexed by TDE location for reference purposes only. Alternatively, the data value cache stores only selections of the original data set.

In one embodiment, data capture of the original data of FIG. 11 begins at any valid, user-specified, preset, or automatically determined data element. In one instance, processing with the first "GetValue" routine (i.e., Value1) using TDA1 initializes at TDE (4, 4) and returns a value of 159. In one embodiment, the resultant value 159 is stored in the data value cache at the corresponding TDE location (i.e., TDE location (4, 4)). In an alternate embodiment, the resultant value 159 is stored in any user-specified, preset, or automatically determined storage structure or temporary storage device that is sized and addressed in the same manner as the original data set.

In one instance, the data values of the remaining member-data elements of TDA1 for TDE (4, 4) are then captured with the other 24 serially ordered and executed "GetValue" routines (i.e., Value2 through Value 24) in accordance with the schematic of FIG. 18.

Following the data capture method of the member-data elements of TDA1 for TDE (4, 4), capture proceeds to the next valid TDE (i.e., data element (5, 4)) and then continues until the collection of valid TDEs in the original data set of FIG. 11 is exhausted. In an alternate embodiment, data capture moves to any unprocessed, valid TDE in the original data set.

FIGS. 19A-19G show an example data table for one embodiment of the complete data value cache, which is initialized as an organizational structure to store the captured data values resulting from processing each valid TDE of the original data set of FIG. 11 with the series of consecutively ordered GetValue methods using TDA1; the data value cache is indexed by TDE location for reference purposes only.

Once population of the data value cache is complete, the cache is returned to the raw-data datastore processing engine. Referencing FIG. 5, one or pluralities of selections, or regions of interest, as sourced from the original data set of FIG. 11 and that are to be trained (or untrained) into the raw-data datastore as a particular known feature(s), are defined by the user. In this example, a region of interest, which is synonymous with selection of the entire upper left quadrant (i.e., data element locations in the rectangular area with corners at (1, 1) through (10, 10)) of the original data set, is selected for training into the raw-data datastore as known feature 1 (hereafter "KF1"). Accordingly, the positive training value sets, which are those data value sets existing within the selection for KF1, are retrieved from the data value cache of FIGS. 19A-19G. If the user has selected adjusted training, the negative training value sets, which are those data value sets that do not exist within the selection for KF1, are retrieved from the data value cache as well. For this example, assume the user is not performing adjusted training. In accordance with FIG. 7, which describes the process for training a given known feature into a raw-data datastore, an intermediary training entry array, which functions to append the raw-data datastore with the value sets associated with KF1 as stored in the data value cache, is developed from the applicable positive training value sets. Also in this example, the user trains a second region of interest, which is synonymous with selection of the entire lower right quadrant (i.e., data element locations in the rectangular area with corners at (11, 11) through (20, 20) of the original data set of FIG. 11, into the raw-data datastore as known feature 2 (hereafter "KF2").

FIGS. 20A-20D show an example data table representing one embodiment of the complete raw-data datastore. For illustrative purposes, FIGS. 20A-20D also show an additional reference column, which is labeled "TDE Loc Ref," listing an index of the TDE locations from which the raw-data datastore entries are sourced. Preferably, the raw-data datastore does not store these TDE location references and indeed doing so is ambiguous without retaining the data source information in any application where multiple data sources, or data set selections, are used to create a raw-data datastore. The TDE location references are provided in FIGS. 20A-20D simply for clarity with regard to the later examples and are useful for illustrating a single traversal of the raw-data datastore during creation of subsequent algorithm datastores. Moreover, the TDE location reference indices are included in the resulting algorithm datastores so that the examples can be followed from the original data set through to the final results. Any traversal method that processes each raw-data datastore entry exactly once will yield the correct results. In alternate embodiments, the raw-data datastore can exist in any format, such as a synaptic web as disclosed by Brinson, et al, in U.S. patent application 2007/0244844.

Continuing the same example, an algorithm datastore is trained using the previously created and populated raw-data datastore (shown in FIGS. 20A-20D) as the source data instead of having to be manually trained using the original data set of FIG. 11. The creation and population of an algorithm datastore proceeds in a manner such as disclosed by Brinson, et al., in U.S. patent application 2007/0244844, while in an alternate embodiment algorithm datastore generation and population is accomplished using any methodology, application, or engine intended for use in the same or a similar manner. Likewise, any applicable storage device, such as a data array, database, alternative datastore, etc., can be used in place of the algorithm datastore for the purpose of storing the data processing results. For illustrative purposes, training of subsequent algorithm datastores from the previously generated raw-data datastore is discussed succinctly forthwith.

In this example, TDA1 (as shown in FIG. 13) and the TDA evaluation algorithms "Sum of Radial Distribution" (hereafter "ALG1") and "Sum of First Non-zero Deviation" (hereafter "ALG2") are selected for use in training and populating an algorithm datastore (hereafter "AlgDS1") with the data values and patterns inherent to the raw-data datastore entries.

As described herein, ALG1 is calculated as a predefined value for each radial of TDA1. The "radial distribution" is dependent upon whether the data element values of a given radial are different from the TDE value; if so, the distance between the first-different data element value and the TDE value is determined. In one embodiment, radial distribution values of 16, 8, and 4 are used, while in an alternate embodiment any user-specified, preset, or automatically determined radial distribution values are used. For a given TDA radial: if the data element nearest in location to the TDE has a value different than the TDE value, then the radial distribution for that radial is assigned a value of 16; if the data element nearest in location to the TDE has the same value but the data element second-nearest in location to the TDE has a value different than the TDE value, then the radial distribution for that radial is assigned a value of 8; if the data elements nearest and second-nearest in location to the TDE have the same value but the data element third-nearest in location to the TDE has a value different than the TDE value, then the radial distribution for that radial is assigned a value of 4; otherwise, the radial distribution is assigned a value of 0. With reference to TDA1, since the maximum radial distribution value for each radial is 16 and there are eight total radials, the resultant value range of ALG1 is 0 to 128. A higher resultant sum suggests a higher data element value variance closer to the TDE, while a lower resultant sum indicates more data element homogeneity surrounding the TDE.

As described herein, ALG2 is calculated for each radial of TDA1. The "first non-zero deviation" of a given TDA radial is surmised through the identification of the data element first-nearest in location to the TDE with a value that is different from the value of the TDE; the absolute difference between this data element value and the TDE value is then calculated. With reference to TDA1, since the maximum first non-zero deviation value for each radial is 255 and there are eight total radials, the resultant value range of ALG2 is 0 to 2,040. A higher resultant sum suggests greater difference between the data element values, taken as a whole and comprising the TDA, and the TDE value.

Training of AlgDS1 begins at any user-specified, preset, or automatically determined entry in the raw-data datastore. For this example, training initializes at the raw-data datastore entry corresponding with TDE location reference (4, 4) as shown in FIG. 20A and returns a value of 128, count 1, per the following calculations. Referencing the TDA1 schematic of FIG. 13, the radial distribution of Radial 1 is assigned a value of 16 as the data element (i.e., data element (5, 4)) nearest in location to the TDE has a different value (i.e., data element value 164 versus TDE value 159). For Radial 2, the radial distribution is assigned a value of 16 as the data element (i.e., data element (5, 5)) nearest in location to the TDE has a different value (i.e., data element value 155 versus TDE value 159). Processing continues until each radial of TDA1 for TDE location reference (4, 4) is algorithmically evaluated and temporarily stored. The complete calculations corresponding to algorithmic evaluation of TDE location reference (4, 4) with ALG1 using TDA1 are shown in FIG. 21. The resultant radial distribution values (i.e., 16, 16, 16, 16, 16, 16, 16, 16) for each of the eight radials of TDA1 for TDE location reference (4, 4) are then summed to yield a resultant data value of 128, and this resultant summation is stored in AlgDS1.

In one instance, the raw-data datastore entry corresponding to TDE reference location (4, 4) is then evaluated with ALG2 using TDA1. Referencing the TDA1 schematic of FIG. 13, the first non-zero deviation of Radial 1 is assigned an absolute difference value of 5 as the data element (i.e., data element (5, 4)) nearest in location to the TDE (i.e., location reference (4, 4)) has a different value (i.e., data element value 164 versus TDE value 159). For Radial 2, the first non-zero deviation is assigned an absolute difference value of 4 as the data element (i.e., data element (5, 5)) nearest in location to the TDE has a different value (i.e., data element value 155 versus TDE value 159). Processing continues until each radial of TDA1 for TDE location reference (4, 4) is algorithmically evaluated and temporarily stored. The complete calculations corresponding to algorithmic evaluation of TDE location reference (4, 4) with ALG2 using TDA1 are shown in FIG. 22. The resultant first-non-zero-deviation values (i.e., 5, 4, 17, 47, 15, 8, 14, 14) for each of the eight radials of TDA1 for TDE location reference (4, 4) are then summed to yield a resultant value of 124, and this final summation is stored in AlgDS1.

Following the processing of the raw-data datastore entry corresponding to TDE location reference (4, 4) with ALG1 and ALG2 using TDA1, training of A1gDS1 steps to the next raw-data datastore entry of FIGS. 20A-20D and then continues until the collection of raw-data datastore entries is exhausted. In an alternate embodiment, all valid raw-data datastore entries are processed with a single evaluation algorithm using TDA1 prior to initialization of processing with any subsequent evaluation algorithms.

FIG. 23 shows an example data table for one embodiment of the complete AlgDS1, which is initialized as an organizational structure to store the algorithm values resulting from processing each raw-data datastore entry with ALG1 and ALG2 using TDA1; AlgDS1 is indexed by TDE location for reference purposes only.

As a second aspect of this example, the adjacent-data element TDA of FIG. 14 (hereafter "TDA2"), which is a derivative of TDA1 and exists as a localized grouping of eight adjacent data elements surrounding a single, centralized TDE, and the evaluation algorithms "Mean Value" (hereafter "ALG3"), as defined by EQUATION 1, and "Low Value Spread" (hereafter "ALG4"), as defined by EQUATION 2, are selected for use in training and populating another algorithm datastore (hereafter "AlgDS2") with the data values and patterns inherent to the raw-data datastore entries.

$$\bar{x} = \frac{\sum_{i=1}^{n} x_i}{n} \quad \text{EQUATION 1}$$

Where $\bar{x}$ is the mean value,
$x_i$ is the data element value at each TDE location,
and n is the data set sample size (i.e., the number of member data-elements that are to be evaluated in the TDA for a given TDE).

$$S = x_{i_{max}} - x_{i_{min}}; \text{ if } S>16, \text{ return } 0; \text{ if } S \leq 16, \text{ return } S \quad \text{EQUATION 2}$$

Where S is the value spread,
$x_{i_{max}}$ is the maximum data element value of the TDA,
and $x_{i_{min}}$ the minimum data element value of the TDA.
and $x_{i_{min}}$ is the minimum data element value of the TDA.

In one embodiment, training of AlgDS2 begins at any user-specified, preset, or automatically determined, entry in the raw-data datastore. In one instance, training with ALG3 using TDA2 initializes at the raw-data datastore entry corresponding to TDE location reference (4, 4) (as shown in FIG. 20A) and returns a value of 167, count 1, per the following calculations.

1. Sum the member-data element values of TDA2 for the raw-data datastore entry corresponding to TDE location reference (4, 4); in this instance, exclude the TDE value from the calculations.

$$\sum_{i=1}^{n} x_i = (164 + 155 + 176 + 206 + 174 + 167 + 145 + 145)$$

$$\sum_{i=1}^{n} x_i = (1,332)$$

2. Divide the sum from Step 1 by the total number of member-data elements of TDA2 for TDE location reference (4, 4); exclude the TDE from the count.

$$\bar{x} = \frac{1,332}{8}$$

-continued $$\bar{x} = 166.5$$

3. Round the result of Step 2 to the nearest whole number.

$$\bar{x} \cong 167$$

In one embodiment, the resultant value 167 is stored in AlgDS2.

In one instance, the raw-data datastore entry corresponding to TDE location reference (4, 4) is then processed with ALG4 using TDA2; a resultant value of 0, count 1, is returned per the following calculations.

1. Determine the member-data element of TDA2 for TDE location reference (4, 4) with the highest value; in this instance, exclude the TDE value from the calculations.
TDA2 member-data element values: 164, 155, 176, 206, 174, 167, 145, 145

$$x_{i_{max}} = 206$$

2. Determine the member-data element of TDA2 for TDE location reference (4, 4) with the lowest value; exclude the TDE value from the calculations.

$$x_{i_{min}} = 145$$

Calculate the spread of values by subtracting the member-data element with the lowest value, as determined in Step 2, from the member-data element with the highest value, as determined in Step 1.

$$S = x_{i_{max}} - x_{i_{min}}$$

$$S = 206 - 145$$

$$S = 61$$

4. Determine if the spread of values, which is calculated in Step 3, is greater than 16. If YES, return 0; if NO, return the spread of values as calculated in Step 3.

61>16

Return 0.

In one embodiment, the resultant value 0 is stored in AlgDS2.

Following the processing of the raw-data datastore entry corresponding to TDE location reference (4, 4) with ALG3 and ALG4 using TDA2, processing steps to the next raw-data datastore entry, which in one instance corresponds to TDE location reference (5, 4), and then continues until the collection of raw-data datastore entries is exhausted. In an alternate embodiment, all raw-data datastore entries are processed with a single evaluation algorithm using TDA2 prior to initialization of processing with any subsequent evaluation algorithms.

FIG. 24 shows an example data table for one embodiment of the complete AlgDS2, which is initialized as an organizational structure to store the algorithm values resulting from processing each raw-data datastore entry with ALG3 and ALG4 using TDA2; AlgDS2 is indexed by TDE location for reference purposes only.

As a third aspect of this example, the adjacent cardinal-data elements TDA of FIG. 15 (hereafter "TDA3"), which is a derivative of TDA1 and exists as a localized grouping of four cardinally-positioned data elements surrounding a single, centralized TDE, and the evaluation algorithms "Absolute Deviation" (hereafter "ALG5"), as defined by EQUATION 3, "Spread of Deviations" (hereafter "ALG6"), as defined by EQUATION 4, and ALG3, as previously defined by EQUATION 1, are selected for use in training and populating another algorithm datastore (hereafter "AlgDS3") with the data values and patterns inherent to the raw-data datastore entries.

$$|D| = \frac{\sum_{i=1}^{n} |x_i - \bar{x}|}{n} \quad \text{EQUATION 3}$$

Where |D| is the mean absolute deviation,
$x_i$ is the member-data element value,
$\bar{x}$ is the mean value,
and n is the data set sample size (i.e., the number of member-data elements that are to be evaluated in the TDA for a given TDE).

$$S = (x_i - x_{TDE})_{max} - (x_i - x_{TDE})_{min} \quad \text{EQUATION 4}$$

Where S is the spread of deviations,
$x_i$ is the member-data element value,
and $x_{TDE}$ is the TDE value.

In one embodiment, training of AlgDS3 begins at any user-specified, preset, or automatically determined entry in the raw-data datastore. In one instance, training with ALG5 using TDA3 initializes at the raw-data datastore entry corresponding to TDE location reference (4, 4) as shown in FIG. 20A and returns a value of 10, count 1, per the following calculations.

1. Calculate the mean value of the member-data element values of TDA3 for the raw-data datastore entry corresponding to TDE location reference (4, 4); in this instance, exclude the TDE value from the calculations.

$$\bar{x} = \frac{164 + 176 + 174 + 145}{4}$$

$$\bar{x} = \frac{649}{4}$$

$$\bar{x} = 164.75$$

$$\bar{x} \cong 165$$

2. Sum the absolute differences between each member-data element value in TDA3 for TDE location reference (4, 4) and the mean value, as derived in Step 1; exclude the TDE value.

$$\sum_{i=1}^{n} |x_i - \bar{x}| =$$

$$(|164 - 165| + |176 - 165| + |174 - 165| + |145 - 165|)$$

$$\sum_{i=1}^{n} |x_i - \bar{x}| = (|-1| + |11| + |9| + |-20|)$$

$$\sum_{i=1}^{n} |x_i - \bar{x}| = (1 + 11 + 9 + 20)$$

$$\sum_{i=1}^{n} |x_i - \bar{x}| = (41)$$

3. Divide the sum from derived Step 2 by the total number of member-data elements of TDA3 for TDE location reference (4, 4); exclude the TDE from the count.

$$|D| = \frac{41}{4}$$

$$|D| = 10.25$$

$$|D| \cong 10$$

In one embodiment, the resultant value 10 is stored in AlgDS3.

In one instance, the raw-data datastore entry corresponding to TDE location reference (4, 4) is then processed with ALG6 using TDA3; a resultant value of 31, count 1, is returned per the following calculations.

1. Determine the member-data element of TDE3 for TDE location reference (4, 4) with the highest deviation value from the TDE location reference (4, 4) data value of 159.

$$D_{(4,4)} = 159$$

$$D_{(5,4)} = 164$$

$$D_{(5,4)} - D_{(4,4)} = 164 - 159 = 5$$

$$D_{(4,5)} = 176$$

$$D_{(4,5)} - D_{(4,4)} = 176 - 159 = 17$$

$$D_{(3,4)} = 174$$

$$D_{(3,4)} - D_{(4,4)} = 174 - 159 = 15$$

$$D_{(4,8)} = 145$$

$$D_{(4,8)} - D_{(4,4)} = 145 - 159 = -14$$

$$D_{max} = (x_i - x_{TDE})_{max} = 17$$

2. Determine the member-data element of TDE3 for TDE location reference (4, 4) with the lowest deviation value from the TDE location reference (4, 4) data value of 159.

$$D_{(5,4)} - D_{(4,4)} = 164 - 159 = 5$$

$$D_{(4,5)} - D_{(4,4)} = 176 - 159 = 17$$

$$D_{(3,4)} - D_{(4,4)} = 174 - 159 = 15$$

$$D_{(4,8)} - D_{(4,4)} = 145 - 159 = -14$$

$$D_{min} = (x_i - x_{TDE})_{min} = -14$$

3. Calculate the difference, or spread of values, between $D_{max}$ and $D_{min}$, which are respectively derived in Steps 1 and 2.

$$S = D_{max} - D_{min}$$

$$S = 17 - (-14)$$

$$S = 31$$

In one embodiment, the resultant value 31 is stored in AlgDS3.

In one instance, the raw-data datastore entry corresponding to TDE location reference (4, 4) is then evaluated with ALG3 using TDA3 a resultant value of 165, count 1, is returned per the following calculations.

1. Sum the member-data element values of TDA3 for the raw-data datastore entry corresponding to TDE location reference (4, 4); in this instance, exclude the TDE value from the calculations.

$$\sum_{i=1}^{n} x_i = (164 + 176 + 174 + 145)$$

$$\sum_{i=1}^{n} x_i = (659)$$

2. Divide the sum from Step 1 by the total number of member-data elements of TDA3 for TDE location reference (4, 4); exclude the TDE from the count.

$$\bar{x} = \frac{659}{4}$$

$$\bar{x} = 164.75$$

3. Round the result of Step 2 to the nearest whole number.

$$\bar{x} \cong 165$$

In one embodiment, the resultant value 165 is stored in AlgDS3.

Following the processing of the raw-data datastore entry corresponding to TDE location reference (4, 4) with ALG5, ALG6, and ALG3 using TDA3, training of AlgDS3 steps to the next raw-data datastore entry and then continues until the collection of raw-data datastore entries is exhausted. In an alternate embodiment, all valid raw data-datastore entries are processed with a single evaluation algorithm using TDA3 prior to initialization of processing with any subsequent evaluation algorithms.

FIGS. 25A-25B show an example data table for one embodiment of the complete AlgDS3, which is initialized as an organizational structure to store the algorithm values resulting from processing each raw-data datastore entry with ALG5, ALG6, and ALG3 using TDA3; AlgDS3 is indexed by TDE location for reference purposes only.

In pluralities of alternate embodiments, any applicable TDA, which exists as a subset or portion of the original TDA (i.e., TDA1) used to capture data values to be stored in the raw-data datastore, and any pluralities of applicable evaluation algorithms are used to train the algorithm datastore(s).

Use of a Raw-Data Datastore in the Resolution of "Confusion"

The ideal candidate solution (i.e., evaluation algorithm set) for resolution of a given data analysis and feature recognition problem is one that uses a minimum number of evaluation algorithms to most thoroughly and aptly distinguish features. However, occasionally during data analysis exercises, the evaluation algorithms used to identify and discriminate features fail to differentiate two data elements; this failure is termed "confusion," and it can manifest itself in two common ways. First, the original data values and patterns within selections of a data set can be exceedingly ambiguous to the point of being identical thereby preventing differentiation between two (or more) data elements; this is commonly termed "data confusion." Second, the evaluation algorithms used during algorithm datastore training, for example, can fail to differentiate between the distinct data values and patterns of two (or more) features that the user knows to be different; this is commonly termed "algorithm confusion." Additionally, an inherent complication to the occurrence of confusion is that in most cases, the user is unable to determine whether the original data set or selection therein and/or the data processing method, using a specifically selected combination of evaluation algorithms, are to blame for the failure.

In one case of data confusion, inadequate sensor sensitivity and/or poor data resolution can be the culprits, while in an alternate case, data confusion results from the user inadvertently and/or unknowingly including a single (or pluralities of) data element(s) in two (or more) different data set selections; subsequently, a single, discrete data element is trained into a datastore as two (or more) different known features. This latter possibility is illustrated with the simplistic data arrays of FIGS. 26A and 26B, which each represent an adjacent-data element TDA associated with a particular TDE (located at data element locations (2, 2) and (22, 22), respectively). Examination of the data values and patterns of the original data sets of FIGS. 26A and 26B confirms that data analysis results, obtained using any series of evaluation algorithms, should be the same for both data sets. However, the data set of FIG. 26A is recorded as an identification of KF1, while the data set of FIG. 26B is recorded as an identification of KF2. This is a classic example of data confusion wherein the data values and patterns inherent to the original data set selections are identical for two or more different features.

In the case of algorithm confusion, the evaluation algorithms selected for feature training into a datastore fail to distinguish between the unique data values and patterns inherent to two (or more) known features (e.g., KF3 and KF4) that are known by the user to be different. This possibility is illustrated with the simplistic data arrays of FIGS. 27A and 27B, which each represent an adjacent-data element TDA associated with a particular TDE (located at data element locations (5, 5) and (25, 25), respectively).

The data sets of FIGS. 27A and 27B are evaluated using the "Mean Value" algorithm, as previously shown in EQUATION 1, and the "Median" algorithm, as shown in EQUATION 6.

EQUATION 6: For an odd number of values in a given data set, the median ($\tilde{x}$) is the middle value in the set. For an even number of values, the median is computed as the arithmetic mean of the middle two values.

The arithmetic mean value of the member-data element values of the TDA for TDE (5, 5) of FIG. 27A is 3 per the following calculations.

1. Sum the member-data element values of the TDA for TDE (5, 5); in this instance, exclude the TDE value from the calculations.

$$\sum_{i=1}^{n} x_i = (4+2+5+3+3+4+2+1)$$

$$\sum_{i=1}^{n} x_i = (24)$$

2. Divide the sum from Step 1 by the total number of member-data elements of the TDA for TDE (5, 5); exclude the TDE from the count.

$$\bar{x} = \frac{24}{8}$$

$$\bar{x} = 3$$

The median value of the member-data element values of the TDA for TDE (5, 5) of FIG. 27A is 3 per the following calculations.

1. List the member-data element values of the TDA for TDE (5, 5); in this instance, exclude the TDE value. {4,2,5,3,3,4,2, 1}

2. Since there is an even number of data element values, calculate the arithmetic mean value of the middle two data element values; this is the median value.

$$\bar{x} = \frac{(3+3)}{2}$$

$$\bar{x} = 3$$

$$\bar{x} = 3$$

Similarly, the arithmetic mean value of the member-data elements of the TDA for TDE (25, 25) of FIG. 27B is 3 per the following calculations.

1. $$\sum_{i=1}^{n} x_i = (3+3+3+3+3+3+3+3)$$

$$\sum_{i=1}^{n} x_i = (24)$$

2. $$\bar{x} = \frac{24}{8}$$

$$\bar{x} = 3$$

Also, the median value of the member-data elements of the TDA for TDE (25, 25) of FIG. 27B is 3 per the following calculations.

1. {3, 3, 3, 3, 3, 3, 3, 3}

2. $$\bar{x} = \frac{(3+3)}{2}$$

$$\bar{x} = 3$$

$$\bar{x} = 3$$

Upon comparison of the algorithmically ascertained results for the different data sets of FIGS. 27A and 27B, it is obvious that the mean value and median value algorithms fail to distinguish the uniqueness of the data values and patterns inherent to the different data sets; here, identical algorithm results are attained from evaluation of different data value sets, which ultimately represent different known features.

The resolution of data and/or algorithm confusion, both of which are described in detail above, is simplified and benefits from the use of a raw-data datastore. With regard to a typical algorithm datastore, it can be difficult for a user to specifically identify the problematic data element location(s) because there is no system functionality allowing such delineation. Ineffectual training events, which can manifest as false-positive feature identifications, for example, may ultimately result in the user opting to retrain the entire data set into the algorithm datastore using different data set selections, evaluation algorithms, and/or TDAs; this is a time consuming and tedious process. In contrast, if data analysis of a given data set(s) begins with the training of a raw-data datastore using an information-capturing algorithm (e.g., "GetValue" or "GetLocation"), for example, the identification of confusion is a straightforward endeavor accomplished via the selection of one or pluralities of additional or substitute evaluation algorithms that result in differentiation between the data sets.

In one case, data confusion can arise when a single data element(s) is included in two (or more) different data set selections and is therefore trained as two (or more) different known features. The following is an example of data confusion resolution using a raw-data datastore.

FIG. 28 shows an example of a truncated selection of entries from a raw-data datastore; here, each of the TDE reference locations are sourced from Data Set 1 and are evaluated using a series of 25, consecutively ordered "GetValue" routines and TDA1. In this example, TDE location references "V," "W," "X," "Y," and "Z" are trained into the raw-data datastore as KF5, while TDE location references "Z," "A," "B," "C," and "D," are trained as KF6. Note the two raw-data datastore entries associated with TDE location reference "Z" are highlighted because these are associated with the same raw-data datastore entries thus suggesting an instance of data confusion possibly resulting from the user inadvertently and unknowingly training the same TDE location reference, "Z," as two different known features (i.e., KF5 and KF6).

In another case, data confusion can result when a given data element is not unique within the data set source. This can occur when the same patterns of data elements exist in two different locations within the data set source. In yet another case, data confusion can result from the capture of low-resolution data and/or inadequate sensor sensitivity.

In one embodiment, the user can be notified as to the occurrence of data confusion within a particular training exercise via a mechanism akin to "hit count." In one embodiment, the system notifies the user of the presence of data confusion by displaying an actual count of the incidences or a percentage of occurrences relative to the presence of positive feature identifications. In an alternate embodiment, any user-specified, preset, automatically determined, and/or industry- or system-acceptable methodology or mechanism intended for use in the same or a similar manner can be employed for data confusion notification; this can include a system alarm, a visual representation that paints the confused data element(s) a pre-selected color, etc. Further, following identification of data confusion, the original feature training entries, as stored in the raw-data datastore, can be improved via any suitable method including, inter alia, sequence untraining and retraining with improved data selection(s), use of modified TDAs, and/or direct editing of the raw-data datastore's training entries so as to remove or correct erroneous entries.

In another example of confusion, algorithm confusion exists when the algorithm processing results for different data sets yields the same algorithm value sets for feature identification. The following example of algorithm confusion resolution assumes prior training of a raw-data datastore with the original data values and patterns inherent to the source data set(s).

FIG. 29 shows a truncated selection of entries from a raw-data datastore. TDE location references "Q," "R," "S," "T," and "U," as sourced from Data Set 2, are evaluated using a user-specified selection of evaluation algorithms (i.e., "ALGA," "ALGB," "ALGC," "ALGD," and "ALGE") and TDA1; the resultant data values and patterns are subsequently trained into the algorithm datastore as KF7. Moreover, TDE location references "E," "F," "G," "H," and "I," as sourced from Data Set 3, are evaluated using the same series of evaluation algorithms and TDA1; the resultant data values and patterns are trained into the same algorithm datastore as KF8. Note the two algorithm datastore entries associated with TDE location references "U" and "E" are highlighted because these different data elements, sourced from different data sets (i.e., different selections of data values as stored in a raw-data datastore) but trained into the same algorithm datastore, are associated with the same data values but are trained as two different known features (i.e., KF7 and KF8) thus suggesting an instance of algorithm confusion wherein the selected evaluation algorithms are incapable of differentiating the data elements.

In one embodiment, the use of a raw-data datastore benefits resolution of algorithm confusion in that the raw-data datastore is able to provide a listing of each set of data values and patterns (i.e., each raw-data datastore entry) for which a given candidate-solution of evaluation algorithms is inadequate thereby making the task of modifying or adding evaluation algorithms to the existing candidate-solution, where the objective is to improve the ability to discriminate to an arbitrary degree, relatively simple. As previously explained, this is because the premise behind a raw-data datastore is the allowance for an evaluation algorithm "plug-and-play" capability wherein different evaluation algorithms and combinations thereof can be used to evaluate a given data set selection (s) once the original data values and patterns of the raw data set(s) are trained into an associated raw-data datastore.

Figure 30:
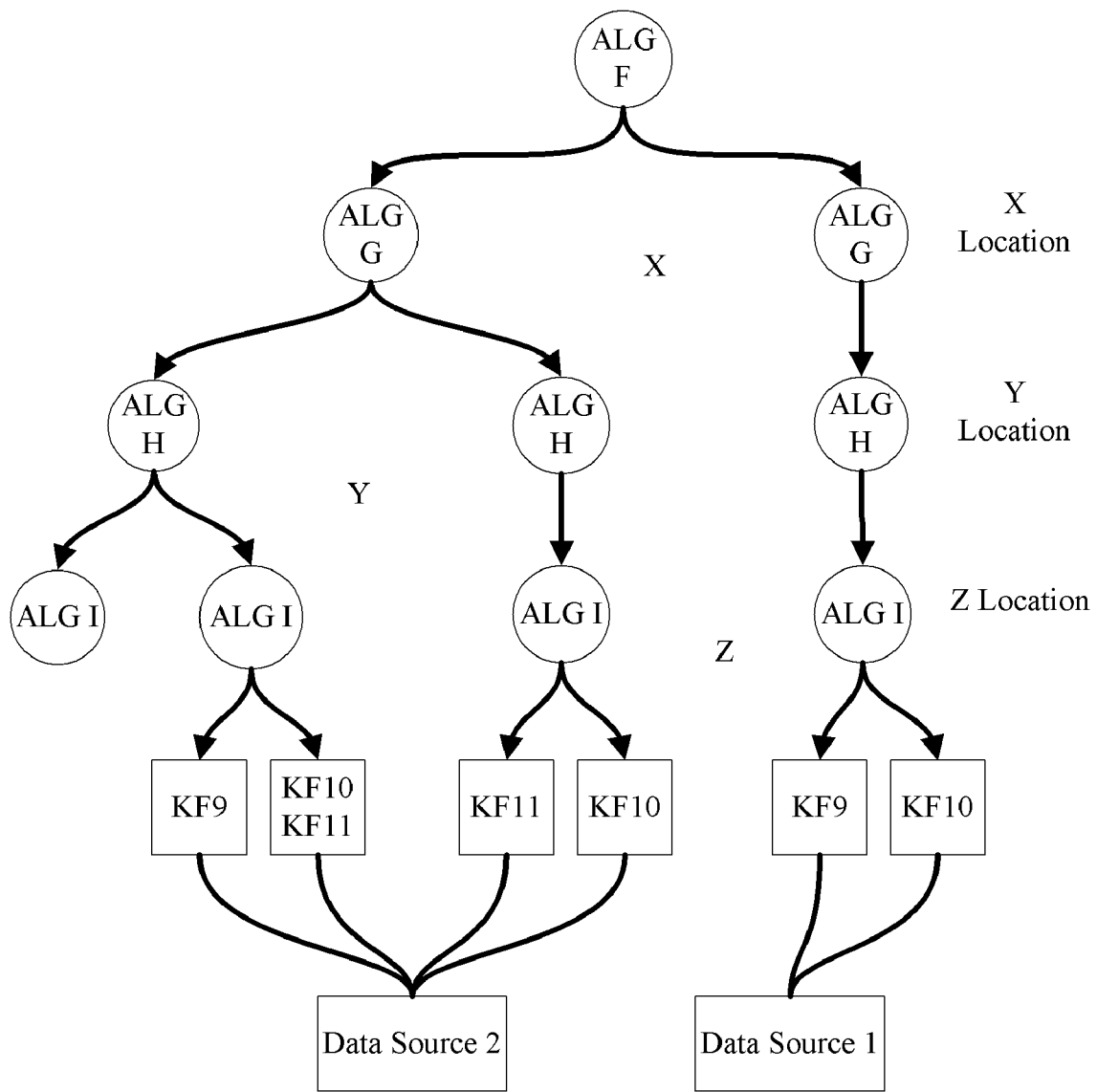
FIG. 30 shows an alternate embodiment of an example raw-data datastore wherein a three-dimensional data set is trained.

FIG. 30 shows an example of a three-dimensional data set as it is trained into a raw-data datastore. The data sources, as well as the actual locations for each training entry in the system, are preserved in this version; as such, the actual data value sets are accessible from the source data sets. In this example, note that data confusion, resulting from overlapping training, is immediately apparent at the position where KF10 and KF11 are trained at the same data point. This can be compared to the full listing of data confused training entries to provide the user with additional separation by cause. In one embodiment, an automated display of the actual data source location(s) of any training entry can be generated for user reference thereby facilitating the resolution of data confusion issues. Moreover, the system allows automated retraining of a new datastore using any compatible sample data area available.

Figure 31:
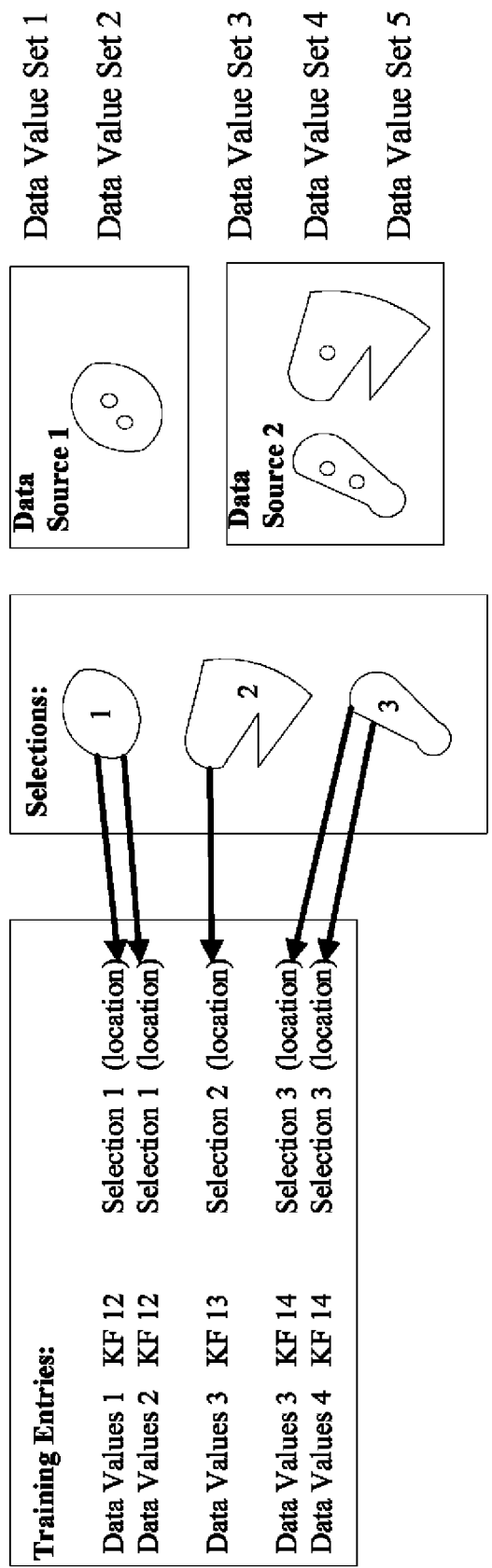
FIG. 31 shows an alternate embodiment of an example raw-data datastore wherein both selections and the original data sets' data values are retained.

FIG. 31 shows one embodiment of the present invention wherein both the original selections and data sets are retained as part of the raw-data datastore. The training entries reference the data sources and their locations within the data sources thereby allowing training locations to be displayed to the user for any entry in situations where locations within selections are retained. Note that data confusion is indicated where "Data Values 3" is trained as both KF13 and KF14 in separate data selections. Again, if the locations are retained, all information is present and the same capabilities exist as are presented in FIG. 30.

In an alternate embodiment, the raw-data datastore training entries do not retain the selection locations; in such a case, less exact information about the location of each training entry is displayed, but at least the possible locations within the actual selections are available. An embodiment that saves only the data values for the selections and discards the original data source(s) also allows for most of these capabilities but fails in the provisions to automatically retrain using non-subset TDAs and to identify the exact cause of any data confusion, such as selection overlay or ambiguous data, that is present.

While the preferred embodiment of the present invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention, in which exclusive property or privilege is claimed, are defined as follows:

1. A system for creation and use of a raw data datastore, comprising:

a computer having a processor and a memory, the memory containing a database of raw data, the memory further containing stored programming instructions operable by the processor to:

create the raw data datastore and store the raw data datastore in memory, the raw data datastore containing references to the database of raw data that are associated with known features within the database of raw data and defects associated with the database of raw data;

wherein the defects associated with the database of raw data comprise one or more instances of data confusion present in the database of raw data; and further wherein the one or more instances of data confusion comprise a plurality of locations within the database of raw data in which different data elements produce the same results upon operation by a common algorithm, and further wherein such instances of data confusion are identified within the database of raw data and are stored within the raw data datastore.

2. The system of claim 1, further comprising a display associated with the computer, and wherein the stored programming instructions further enable the processor to present on the display a representation of the instances of data confusion.

3. The system of claim 2, wherein the representation of the instances of data confusion comprises an indication of the actual count of the instances of data confusion.

4. The system of claim 1, wherein the stored programming instructions further enable the processor to modify a trained association between one or more known features and the data elements within the raw data database that are associated with instances of data confusion.

5. The system of claim 4, wherein the modification of the trained association further comprises one or both of modifying a target data area related to the data elements or eliminating the data element as being associated with the known feature.

6. The system of claim 1, wherein the defects associated with the database of raw data further comprise one or more instances of algorithm confusion present in the database of raw data.

7. The system of claim 6 wherein the one or more instances of algorithm confusion comprise a plurality of target data areas that are substantially indistinguishable from one another upon operation by plurality of different algorithms.

8. The system of claim 7, further comprising a display associated with the computer, and wherein the stored programming instructions further enable the processor to present on the display a representation of the instances of algorithm confusion.

9. The system of claim 8, wherein the representation of the instances of algorithm confusion comprises an indication of the actual count of the instances of algorithm confusion.

10. The system of claim 9, wherein the stored programming instructions further enable the processor to modify a trained association between one or more known features and the data areas within the raw data database that are associated with instances of algorithm confusion.

11. The system of claim 10, wherein the modification of the trained association further comprises one or both of modifying the target data area related to the instance of algorithm confusion or eliminating the data area as being associated with the known feature.

12. The system of claim 1, wherein the references to the database of raw data comprise pointers to locations within the database of raw data.

13. The system of claim 1, wherein the references to the database of raw data comprise a subset of values from the database of raw data.

14. The system of claim 1, wherein the raw data datastore is created by training the database of raw data using one or more algorithms operating on a plurality of target data areas within the database of raw data.

15. The system of claim 1, wherein the raw data datastore further comprises an association between one or more algorithms and a plurality of specified portions of the database of raw data upon which the one or more algorithms are operated in order to produce the associations between the database of raw data and at least one of the known features or the defects.

16. The system of claim 15, wherein the stored programming instructions further cause the processor to modify the association of known features by processing an additional algorithm on at least one of the target data areas indicated within the raw data datastore to be associated with the known feature.

17. The system of claim 16, wherein the stored programming instructions further cause the processor to update the raw data datastore with at least one additional association between the additional algorithm and the known feature.

* * * * *